US007355748B2

(12) United States Patent
Arai et al.

(10) Patent No.: US 7,355,748 B2
(45) Date of Patent: Apr. 8, 2008

(54) COLOR MATCHING SERVER, COLOR MATCHING CLIENT, PRINT CONTROL SERVER, PRINT CONTROL CLIENT, PRINT CONTROL SYSTEM, PRINT CONTROL PROCESS, MEDIUM ON WHICH PRINT CONTROL PROGRAM IS STORED PROFILE PROVIDING SERVER AND PROFILE DEMANDING CLIENT

(75) Inventors: Yoshifumi Arai, Nagano (JP); Susumu Murayama, Nagano (JP)

(73) Assignee: Seiko Epson Corporation, Tokyo (JP)

(*) Notice: Subject to any disclaimer, the term of this patent is extended or adjusted under 35 U.S.C. 154(b) by 961 days.

(21) Appl. No.: 10/085,240

(22) Filed: Feb. 26, 2002

(65) Prior Publication Data
US 2002/0159083 A1    Oct. 31, 2002

(30) Foreign Application Priority Data
Feb. 27, 2001  (JP) ............................ 2001-052553
Aug. 23, 2001  (JP) ............................ 2001-252637

(51) Int. Cl.
*B41J 1/00*  (2006.01)
*G06F 15/00* (2006.01)
*G01J 3/46*  (2006.01)

(52) U.S. Cl. .................. 358/1.9; 358/504; 358/518; 358/1.15; 356/402

(58) Field of Classification Search ............... 358/1.9, 358/1.6, 1.1, 1.13, 1.2, 523–524, 504, 406, 358/1.15, 1.8; 345/593, 589, 600, 603, 595; 382/167, 162; 713/153, 178; 400/120.09, 400/74; 399/9, 53–60; 347/5–19; 340/500–508, 340/456–457
See application file for complete search history.

(56) References Cited

U.S. PATENT DOCUMENTS

| 6,342,952 B1 * | 1/2002 | Chan ........................... 358/1.9 |
| 6,788,305 B1 * | 9/2004 | Ohga .......................... 345/589 |
| 6,885,474 B2 * | 4/2005 | Kimura ....................... 358/1.9 |
| 6,950,197 B1 * | 9/2005 | Nakajima .................... 358/1.1 |
| 2001/0012396 A1 * | 8/2001 | Kumada ...................... 382/162 |

FOREIGN PATENT DOCUMENTS

| JP | 6-189121 | 7/1994 |
| JP | 07-221988 | 8/1995 |
| JP | 07-254988 | 10/1995 |
| JP | 10-175318 | 6/1998 |
| JP | 10-276294 | 10/1998 |
| JP | 11-194686 | 7/1999 |
| JP | 11-326056 | 11/1999 |
| JP | 2000-20681 | 1/2000 |
| JP | 2000-50072 | 2/2000 |
| JP | 2001-225488 | 8/2001 |

* cited by examiner

*Primary Examiner*—Kimberly Williams
*Assistant Examiner*—Charlotte M. Baker
(74) *Attorney, Agent, or Firm*—Beyer Weaver LLP

(57) ABSTRACT

A client controls printing of color chips (images for colorimetry) with a plurality of tones for individual color inks (printing colorants). The client acquires from a server a tone value correction table (color matching information) to match standard colors. The server can acquire the lightness data of color chips for individual inks and create the tone value correction table based on the lightness data of color chips of individual color inks and the lightness data of standard colors corresponding to the color inks, and subsequently send the color matching information to the client. As a result, it is easier to produce colors that match standard colors.

8 Claims, 50 Drawing Sheets

Tone value correction table for cyan — T1

| Before correction | After correction |
|---|---|
| 0 | 0 |
| 1 | 1 |
| 2 | 2 |
| ⋮ | ⋮ |
| 128 | 110 |
| ⋮ | ⋮ |
| 255 | 230 |

Tone value correction table for magenta

| Before correction | After correction |
|---|---|
| 0 | 0 |
| 1 | 1 |
| 2 | 2 |
| ⋮ | ⋮ |
| 128 | 145 |
| ⋮ | ⋮ |
| 255 | 255 |

Standard printer

T11

| Tone value | Lightness data (%) |
|---|---|
| 0 | 94.2 |
| 1 | ⋮ |
| 2 | ⋮ |
| ⋮ | ⋮ |
| 110 | 42.0 |
| ⋮ | ⋮ |
| 128 | 40.0 |
| ⋮ | ⋮ |
| 255 | 26.8 |

User's printer

T12

| Tone value (before correction) | Lightness data (%) |
|---|---|
| 0 | 94.2 |
| 16 | ⋮ |
| 32 | ⋮ |
| ⋮ | ⋮ |
| 128 | 42.0 |
| ⋮ | ⋮ |
| 255 | 28.1 |

T13

| Tone value (before correction) | Tone value (after correction) |
|---|---|
| 0 | 0 |
| 16 | ⋮ |
| 32 | ⋮ |
| ⋮ | ⋮ |
| 128 | 110 |
| ⋮ | ⋮ |
| 255 | 230 |

FIG.9

Scanner ICC profile D

Printer ICC profile K

ICC profile demanding screen

- Offers ICC profile simply by taking output patch from scanner

- Printer name: PM - 880C

- Medium: Glossy film

- Print quality: Super fine

- Prints patch; Please set A4 paper

- Place printed color chart on copy board

○ Input form

Your name

Your address

Method of payment

☐ Scanner ICC profile

☐ Printer ICC profile

| PM-880C |
  |---|

| Glossy film |
  |---|

| Superfine |
  |---|

Total: ¥ ...

| Apply |
  |---|

FIG.43

COLOR MATCHING SERVER, COLOR MATCHING CLIENT, PRINT CONTROL SERVER, PRINT CONTROL CLIENT, PRINT CONTROL SYSTEM, PRINT CONTROL PROCESS, MEDIUM ON WHICH PRINT CONTROL PROGRAM IS STORED PROFILE PROVIDING SERVER AND PROFILE DEMANDING CLIENT

BACKGROUND OF THE INVENTION

1. Field of the Invention

The present invention relates to a color matching server, a color matching client, a print control server, a print control client, a print control system, a print control method, a medium on which is stored said print control program, a profile providing server, and a profile demanding client.

2. Description of the Prior Art

Variation in color reproduction is inevitable because the ink ejecting system differs from one printer to another. One conventional way to address this problem is to correct the multi-tone color data for cyan, magenta, and yellow by means of the tone correct table so that the reproduced color matches with the standard color printed by the standard printer installed at the maker. The tone correct table is created by printing color chips for 500–1000 colors and comparing them with standard colors for hue and saturation and other items. It is common practice to renew the tone correct table periodically in consideration of the change with time of color reproduction.

Unfortunately, the above-mentioned conventional technology poses the following problems.

The user has to purchase an expensive colorimeter.

There is a need to print a large number of color chips for measurement of their hue, saturation, etc. Such colorimetry involves time-consuming work to create the tone correcting table.

If the tone correcting table is to be renewed periodically, the user remote from the place where the standard printer is installed has to print a large number of color chips and then obtain the renewed tone correcting table. This involves a time-consuming work.

Preparation of a tone correcting table imposes a large operation load.

Incidentally, the term "colorant" used hereinafter denotes any material such as color ink and color toner, which is used for printing.

SUMMARY OF THE INVENTION

It is an object of the present invention to provide a color matching server, a color matching client, a print control server, a print control client, a print control system, a print control method, a medium on which is stored said print control program, a profile providing server, and a profile demanding client, all of which are intended to reduce the work for color matching and to facilitate the acquisition of data necessary to reproduce standard colors. (Color matching is a procedure to match reproduced colors of printing colorants with standard colors.)

The present invention achieves the above-mentioned object as follows. The print control client has a means to control the printing of images for colorimetry. With the help of this means, the print control client prints images for colorimetry with each of the printing colorants. Then, the print control client receives the lightness data of images for colorimetry and sends them to the print control server with the help of the lightness data sending means.

With the help of the lightness data receiving means, the print control server receives lightness data from the print control client. Then, the print control server creates color matching information with the help of the means to create color matching information, based on the lightness data and the lightness data stored in the region in which is stored the standard color lightness data. The resulting color matching information is sent to the print control client with the help of the color matching information output means.

As the result, the print control client acquires the color matching information from the print control server with the help of the color matching information receiving means. Subsequently, the print control client converts the print data into the color data according to the color matching information.

Upon printing, each printing colorant gives an image for colorimetry which has a plurality of tone. Therefore, such an image has gradation for each printing colorant (not mixed with any other colorants). In other words, the image changes very little in hue and saturation but greatly changes in lightness for hue and saturation. Consequently, if the lightness of the color reproduced for each printing colorant is allowed to coincide with the lightness of the standard color, then the reproduced color almost matches with the standard color. Thus, if the lightness data of the image for colorimetry with each printing colorant is measured and the color matching information is received from the print control server, it is possible to carry out the work to match the color reproduced from printing colorants with the standard color. Therefore, there is no need to perform colorimetry on many color images formed from a combination of printing colorants and there is no need to measure hue, saturation, etc., unlike the conventional technology. This reduces the work for color matching. In addition, even if the user of the print control client is remote from the place where the standard printer is installed, the user can easily obtain the color matching information from the print control server which permits two-way communications with the print control client. This facilitates the acquisition of data for reproduction of the standard color. For example, in the case where the printer needs the periodic renewal of color matching information, the user easily carry out the renewal operation.

The print control server and the print control client may be any computer. They may be interchangeable according to need. There may be one or more print control clients and there may be one or more print control servers.

The printing colorant used to print images for colorimetry may include color inks for ink jet printers or color toners for laser printers.

The lightness data receiving means of the print control server is not specifically restricted so long as it is capable of receiving the lightness data of images for colorimetry with each printing colorant. It is constructed as follows, for example. The print control client is provided with a lightness data sending means which receives the input of lightness data of images for colorimetry and sends to the print control server. The print control sever is provided with a lightness data receiving means which receives the lightness data of images for colorimetry from the print control client. In this way it is possible to measure the lightness data of images for colorimetry and send the results to the print control server with the help of communication means. This serves convenience.

An alternative construction may be such that the print control servers receives the images for colorimetry and acquires the lightness data. In this case, the images for colorimetry are printed by the print control client and sent to the user who possesses the print control server. In this way it is possible for the user to measure the lightness data of the images for colorimetry and enter the result into the print control server.

The print control client is provided with an image data sending means, which obtains an image data and sends it to the print control servers. (The image data is obtained from an image capturing machine to capture image data of an image for colorimetry.) The print control server has a means to acquire the lightness data, so that it converts the image data entered from the print control client into the lightness data. In this way it is also possible to acquire the lightness data of the image for colorimetry. In other words, the use of an image capturing machine obviates the necessity of measuring the lightness data for each tone of the image for colorimetry. This leads to a reduction in work to measure the lightness data.

An example of the image capturing machine is a scanner. Other image capturing machines than scanner may also be used as a matter of course.

There is an alternative in which an instrument capable of measuring not only hue and saturation but also lightness is used so that the lightness data is measured directly from the image for colorimetry. In this case, it is not necessary to convert the measured data into the lightness data, as a matter of course.

The color matching information should be any information for reproduction of standard colors prescribed. An example of the color matching information is a tone value correcting table which matches the tone value of the color data (which has been converted from the print data) with the tone value necessary for the printing colorant corresponding to the color data to reproduce the color which matches with the standard color. In other words, referencing the tone value correcting table makes it possible to acquire the tone value for color reproduction corresponding to the standard color from the tone value of the color data which is not yet corrected. Thus it is possible to easily correct the tone value of the color data. The tone value correcting table may be created from the lightness data of standard color and the lightness data of the image for colorimetry.

Incidentally, the color data converted from the print data may have any number of tones. For example, it may have a value of 256 (with 8 bits) or 100 (which is not 2 to the power of n).

The foregoing is a mere example of the way of correcting the tone value of color data by using the tone value correcting table. It is also possible to correct the tone value of color data by using calculating formulas.

Also, the color matching information may be provided in the form of color conversion table in which correspondence between input and output is corrected. In other words, the print control client acquires a corrected color conversion table from the print control server and references the corrected color conversion table, so that color conversion is possible from the print data into the color data for color reproduction matching the standard color. In this way it is possible to easily correct the tone value of the color data. Also, by using the corrected color conversion table, it is possible to complete conversion from the print data into the color data in a single step.

Incidentally, in the case where there exist a plurality of print control clients, it is possible to permit any one of them to print the standard color. In the case where the print control client consists of a first print control client and a second print control client, the first print control client has the standard color lightness data sending means which accepts the input of the lightness data of standard color and sends the entered lightness data of standard color to the print control server. Then, the standard color lightness data storing means in the print control server stores the lightness data of standard color entered from the first print control client in the standard color lightness data storing region. Also, the color matching information output means in the print control server outputs to the second print control client the color matching information created based on the lightness data of standard color entered from the first print control client. In other words, the lightness data of standard color is entered from the print control client and stored in the print control server, and the color matching information created based on the lightness data of standard color is acquired by the other print control client. This permits color matching to be performed between print control clients for the color to be reproduced.

The procedure in this case is as follows. The standard color lightness data storing means of the print control server stores the lightness data of standard color entered from a plurality of first print control clients for each of the first print control clients, and the list output means of the print control server creates a list of the first print control clients which entered the lightness data of the same standard color and outputs it to the second print control client. Also, the second print control client selects a specific one among from the first print control clients based on the list from which the selection input reception means is output and the selection result output means sends the selected and inputted first print control client to the print control server. And, the color matching information preparing means of the print control server specifies the lightness data of standard color based on the selected and inputted first print control client and creates the color matching information corresponding to the lightness data of the second print control client. In this way, the color matching information is output to the second print control client by the color matching information output means. Therefore, this permits the second print control client to select the first print control client to perform color matching, thereby acquiring the color matching information. This contributes to convenience.

Since there are several kinds of devices to reproduce colors with a plurality of printing colorants, it is desirable to create the color matching information for each of such device. So, the following alternative may be possible. The print control client is provided with an identification information sending means which acquires the identification information of the device to reproduce color with a plurality of printing colorants and sends it to the print control server. The print control server is provided with a color matching information preparing means which creates the color matching information based on the lightness data of the standard color corresponding to the identification information entered from the print control client. In other words, the lightness data of standard color is selected automatically and the color matching information is created according to the identification information of the device which reproduces colors with a plurality of printing colorants. This contributes to convenience.

In the example mentioned above, the print control client receives the input of the lightness data from the lightness data sending means and sends it to the print control server. However, since there are several ways for the print control server to acquire and store the lightness data, the print control system may be realized without such constitution, as a matter of course. In other words, the constitution may be a print control system consisting of a print control client and a print control server. The print control client converts print data received into color data corresponding to a plurality of printing colorants in such a way that the prescribed standard color is reproduced after conversion based on the prescribed color matching information. The print control server creates color matching information based on the colorimetry data of the standard color and sends it to the print control client connected thereto for two-way communications. The print control client has a means to control printing images for colorimetry (this means controls the printing of images for colorimetry, said images having a plurality of tones for each of a plurality of printing colorants) and also has a color matching information acquisition means which acquires the color matching information from the print control server. The print control server has a standard color lightness data storing region which stores the lightness data of the standard color, a lightness data acquisition means to acquire the lightness data of the image for colorimetry for each of the printing colorants to be printed by the print control client, a color matching information preparing means to create the color matching information based on the lightness data of the standard color corresponding to the printing colorants, and a color matching information output means to send to the print control server the color matching information created by the color matching information preparing means.

In this case, too, it is possible to reduce the work to match the color reproduced with printing colorants with the standard color and to acquire easily the data necessary to reproduce the standard color.

The print control system consists of the print control server and the print control client which are connected for two-way communication. However, it will be easily understood that the system may consists of such components separately.

The procedure mentioned above is constructed such that the print control client prints the image for colorimetry and acquires the color matching information and the print control server creates the color matching information and sends it to the print control client. This procedure is not necessarily limited to tangible systems or device; the procedure is apparently based on the present invention. Consequently, the present invention may also be applied to a method.

The present invention may be put to practice by operating the print control system or print control device according to a prescribed program.

The print control program may be the one which is executed by a computer connected to a printer or the one which is executed within a printer. It can be executed by various device.

The present invention may be put to practice in such a way that the print control server or the print control client reads the program from a recording medium in which is stored the program.

The recording medium may be a magnetic recording medium or a magneto-optical recording medium. It embraces any kind of recording medium which will be developed in the future. The present invention may be applied to the case in which the program is partly in the form of software and partly in the form of hardware. The program may be partly stored on a recording medium and read in according to need. The program may be in the form of copies of any stage.

The color matching system of the present invention may be modified such that the color matching information is not created in the client but created in the server. In other words, what is done in the client is conversion of color data based on the prescribed color matching information for reproduction of standard color. And the server communicatably connected to the client creates the color matching information based on the colorimetry data corresponding to the standard color and sends it to the client. The client has a means to send to the server the data relating to the actual color in the environment of the client and a means to acquire the color matching information from the server. The server has a storage region in which is stored the data of standard color, a means to acquire data relating to the actual color sent from the client, a means to create the color matching information based on the acquired date and the data of the standard color, and a means to send to the client the thus created color matching information.

In the present invention constructed as mentioned above, the client sends to the server the data relating to the actual color and the server creates the color matching information based on the data from the client and the stored data and sends it to the client. Then, the client acquires the color matching information from the server and converts the color data according to the color matching information.

In this case, too, the color matching system may be constructed of the server for color matching and the client for color matching which as separated from each other.

The color matching system employs the ICC profile as one kind of color matching information. Some problems involved in the ICC profile are discussed below.

There is an increasing tendency toward device capable of color management to prevent the display or output of different colors across different machines when colors are handled by color image input device or color printing device. Therefore, the standard of ICC (International Color Consortium) is gaining general acceptance. Printing device involve many factors to affect color development in color management for ink and medium. Adequate use of the ICC profile requires the user to create an ICC profile for each printing device.

One conventional way to create the ICC profile is to read color charts printed by a printing device by using a calorimeter and then create the ICC profile by using a special software for profile preparation. Another way is to read color charts printed by a printing device (for images acquired by an image input device such as scanner possessed by the user) and create the ICC profile for the printing device by using software for profile preparation according to the data which has been read.

The above-mentioned conventional method for profile preparation involves the following problems. The first method for profile preparation is supposed to use a colorimeter. Unfortunately, a colorimeter is very expensive and is intended to accurately measure colors in printed matter. Therefore, most consumers cannot use this instrument and hence cannot obtain the ICC process by the method mentioned above.

The second method for profile preparation employs a scanner to read color charts; however, no accurate color management is accomplished by a scanner. In addition, reading errors are accumulated by difference between individual scanners. Therefore, the reading of color charts is not accomplished with an enough accuracy for the ICC profile. Both of the two methods employ a special software for profile preparation; however, this software is very expensive at the present time.

Therefore, the following deals with a profile providing server (which permits the ordinary user to obtain a highly accurate ICC profile easily and very economically), an image input device, a profile demanding client, a profile providing server for the image input device, and a printing device.

The first constitution: A profile providing server which comprises a communicating means capable of transmission and reception of data through a communication line, a read color data acquisition means to acquire through said communication line the read color data obtained by reading with a prescribed image input device the color charts printed by a specific printing device based on prescribed print color data, a color character description data acquisition means to acquire through a prescribed interface the color character description data to match the read color data of the image input device with the prescribed standard color space coordinate values, a profile creating means to create the profile data defining correspondence between the printed color data and the prescribed standard color space coordinate values by matching the read color data with the standard color space coordinate value with reference to the color character description data, and a profile data output means to output through the communication line the thus created profile data.

This profile providing server provides a profile for the printing device. The profile created is output through the communication line. In addition, this profile providing server acquires through a prescribed interface the color character description data to match the read color data of the image input device with the prescribed standard color space coordinate values, so that it makes it possible to match the read color data obtained by the read color data acquisition means with the standard color space coordinate values with reference to the color character description data. Since the read color data correspond one to one with the printed color data of the printing device, this correspondence makes it possible to match the printed color data with the standard color space coordinate values. As the result, it is possible to create the profile data in the course of profile data generation.

The thus created profile data is output by the profile providing server. Thus it is possible to obtain the profile data by an external computer which the user operates through a communication line. Therefore, this user does not need to has any special software for profile generation. In addition, the user can obtain the profile data easily without the necessity for reading by a calorimeter. The communication line is not specifically restricted so long as it is capable of data transmission and reception.

The above-mentioned read color data acquisition means should be able to acquire through a communication line the read color data which has been read by the image input device. The image input device should be able to read color. It may be a calorimeter or a general-purpose scanner. (The latter is desirable for easy use by most consumers.) The read color data is matched with the standard color space coordinate values by the color character description data. Therefore, it is not necessary that scription data. Therefore, it is not necessary that color management be carried out by the scanner itself.

The color character describing data may be any data which matches the read color data of the image input device with the prescribed standard color space coordinate value. It may be a matching table for the read color data and the standard color space coordinate value or a profile of the image input device.

The profile data creating means may be one which creates the profile data of the printing device by reference to the color character describing data. It is possible to adopt various methods such as interpolation operation, color prediction, and gamut mapping. And, the profile to be created should preferably be that of ICC standard from the standpoint of general-purpose usage. It may also be a profile which creates only a partial table to reduce the profile size and to perform interpolation operation for the remainder. Since this profile creates upon reading the printing results of the printing device, it can adequately correspond with the kind of the printing medium used by the printing device. It is possible to use an accurate profile if it creates and acquires a saturation profile when change with time occurs.

Also, as an example of the constitution to acquire a more accurate profile, a constitution is permissible in which the above-mentioned color character description data acquisition means acquires the color character description data measured for the individual unit of the image input device.

That is, even though the read color data handled by the image input device is in a certain format, there is an instance in which the characteristics subtly varies for the individual device. Therefore, if the color character description data measured for the individual device is used, it becomes possible to perform accurate conversion regardless of difference among devices at the time of conversion of the read color data into the standard color space coordinate value, and it becomes possible to create an accurate profile for the printing device.

Moreover, the above-mentioned profile data creating means may be constructed such that the prescribed print color data (mentioned above) is acquired through a prescribed interface.

That is, it is possible to readily create the profile by matching the standard color space coordinate value with the data acquired by the profile data creating means upon acquisition of the print color data. Here, it suffices to acquire the print color data through a prescribed interface. There are a variety of modes for acquisition through a communication line (such as internet) or through a bus from the storage device of the profile providing server itself. If the print color data is acquired for profile data generation, it is possible to create a profile based on an arbitrary color chart printed by the printing device, and this increases the degree of freedom for the user.

At the time of profile generation, usually all the colors in the gamut are referenced almost uniformly, it is desirable to obtain a color chart in which all colors are printed uniformly by the printing device. In the case where the user uses a specific color frequently, it is also possible to print many color charts for a color close to that color, thereby obtaining a highly accurate profile for the neighbor of the color.

As a concrete example data to be obtained by the color character description data acquisition means, it may be constructed such that the above-mentioned color character description data acquisition means obtains through the above-mentioned communication line the read color data obtained by reading the prescribed standard color chart by the above-mentioned image input device and obtains the standard color space coordinate value of each patch of the above-mentioned standard color chart from the data base which has previously been established.

In other words, the standard color chart is a common commercial color chart with color management, and the standard color space coordinate value of each patch of the color chart is previously known. Therefore, it is possible to specify the relation between them by acquiring the standard color space coordinate value of each patch of the standard color chart from the previously constructed data base and comparing it with the read color data of the above-mentioned standard color chart.

Although it is necessary to previously create the data base of the standard color space coordinate value of each color patch of the standard color chart, it is not necessary to make data base for individual image input device because the standard color space coordinate value is previously known for the standard color chart, and it is possible to use one kind of data for all the image input device. And, although the read color data of the standard color chart is obtained through a communication line, it is desirable to store this data previously in the image input device (as mentioned later). It is desirable that this operation be stored in EEPROM or ROM in the stage of production of the image input device.

Moreover, as a concrete example of the data to be acquired by the color character description data acquisition means, the above-mentioned color character description data acquisition means may be constructed such that a table data is obtained through the above-mentioned communication line, said table data matching the read color data obtained by reading the prescribed color chart using the above-mentioned image input device with the standard color space coordinate vale of each patch of the standard color chart.

In other words, by referencing this correspondence table it becomes possible to match arbitrary read color data of the image input device with the standard color space coordinate value, and it becomes possible to grasp the standard color space coordinate vale of each color patch of the color chart which has been printed by the above-mentioned printing device. If it is constructed such that the correspondence table is obtained, it is possible to reduce processing to create the correspondence table in the profile providing server.

Also, it is possible to easily match the read color data obtained by reading the standard color chart using the above-mentioned image input device by the above-mentioned color character description data with the standard color space coordinate value of each patch of the standard color chart. As a concrete example of a desirable construction that utilizes this correspondence, the above-mentioned profile data creating means may be constructed such that it references the above-mentioned color character description data and creates the profile data of the image input device based on the read color data by the above-mentioned image input device of the above-mentioned prescribed standard color charge and the standard color space coordinate value of the standard color chart.

In other words, if the profile data of the image input device is created, it becomes possible to easily convert arbitrary read color data of the image input device into the standard color space coordinate value by referencing this profile data afterward. And, if the profile data is output through a communication line, it is possible to readily provide the profile data of the image input device as well as the printing device.

As a concrete example of the data to be obtained by the above-mentioned color character data acquisition means, the above-mentioned color description data acquisition means may be constructed such that the profile data of the image input device is obtained from either or both of the above-mentioned communication means and the previously formed data base.

In other words, it becomes possible to easily convert the arbitrary read color data of the image input device into the standard color space coordinate value by referencing the profile data of the image input device. Although this profile data can be obtained from the communication line and the previously formed data base, it is possible to reduce the capacity of the data base of the profile providing server in the case of acquisition through the communication line, and it is also possible to reduce the storage capacity to store the color character description data of the input image device in the case of acquisition from the data base. Here, as a profile, a profile of ICC is desirable from the standpoint of general-purpose usage. It may also be a prescribed lookup table, and it is possible to adopt a variety of profiles.

In this way it is possible to easily convert arbitrary read color data of the image input device into the standard color space coordinate value.

In order to improve the accuracy of the created profile in the present invention, the color character description data measured for individual image input device is referenced as mentioned above. As an example of a desirable construction to adequately grasp the body of the image input device, the above-mentioned profile data creating means is constructed such that the serial number of the image input device which has read the above-mentioned read color data is obtained through the communication line.

In other words, it is possible to univocally grasp the body of the image input device which has read the above-mentioned printed color chart by obtaining through the communication line the serial number which is assigned to each image input device. In the case where part of the color character description data is stored in the data base of the profile providing server, it is possible to easily extract the data of the object image input device from the data base. Using the serial number is desirable in that it is possible to specify the body of the image input device very easily. A construction in which the body is specified by any other method can also be adopted as the matter of course.

As mentioned above, service to provide the profile by the server which creates the profile will be materialized as business. As a concrete example of the construction, the above-mentioned communication means obtains the customer identification information to identify the customer which has demanded the profile preparation and the above-mentioned profile data generation means identifies the customer which has demanded the profile preparation based on the customer identification information obtained referencing the previously provided customer data base and charges the customer.

In other words, it is necessary to identify the customer for charging, and it is necessary to charge the customer which has been provided with the profile by acquisition of the customer identification through the communication line.

Here, there are many possible embodiments of construction for charging the customer by letting the customer to send the customer number. In the present invention, there is a foreseeable embodiment in which the body of the image input device is identified individually; a construction to make common the information to individually identity the body and the information to identity the customer is desirable from the standpoint of processing efficiency. In other words, if the serial number of the above-mentioned image input device or the address and name which the customer previously registers are obtained through the communication line and the data base is referenced, then it is possible to identify the customer based on such information. Moreover, it is possible to adopt various embodiments for charging process; if a system is constructed such that the account number and other information are output through a communication line at the bank which the user previously appoints for his payment, then it is possible to let the bank's server to perform payment process. In this case, the user can responds charging for communication charge without the necessity of his paying action. It is also possible to adopt an embodiment in which charging process is carried out such that the bill is printed together with the user's address and the bill is dispatched to the user, as a matter of course.

And, an image input device is used to receive the profile from the profile providing server of the present invention. A preferred construction for the image input device is given below.

The second construction: Image input device

An image input device which comprises a color data reading means which represents an image in terms of pixels in a dot matrix form and acquires the read color data of color representing in tone for each pixel in the prescribed element color resulting from color separation, a read color data output means to output through a prescribed interface the read color data acquired by said color data reading means, a color character description data storing means to store the data measured for the individual device, said data being the color character description data to match the read color data acquired by said color data reading means with the prescribed standard color space coordinate value, and a color character description data output means to output through a prescribed interface the color character description data stored in said color character description data storing means.

That is, it is so constructed as to acquire the read color data of color and to store data measured for the individual devices, said data being the color character description data to match the read color data acquired by said color data reading means with the prescribed standard color space coordinate value for the color character description data. And, the thus constructed color character description data can be output through a prescribed interface.

As mentioned above, since the color character description data to match the read color data with the prescribed standard color space coordinate value and the data measured for the individual device are stored in the image input device itself, it is possible to known the standard color space coordinate value of the read color data easily by referencing the color character description data at the destination of output of such color character description data.

In this way, it is possible to provide the image input device to be used to create an accurate profile regardless of difference between the devices.

Needless to say, it is easy to create the ICC profile according to the color character description data. Since it is necessary that this color character description data be measured for the individual image input devices and stored in the color character description data storing means, it is desirable that it be stored in the manufacturing stage at the plant of the image input device from the standpoint of reducing work to be done by the user. Also, since it is common practice to produce the image input device on a prescribed line in an ordinary factory, it is desirable to store it in the factory from the standpoint of ease of processing.

In the above-mentioned color data reading means, it suffice to acquire the read color data of a color and a variety of constructions can be adopted. For example, it may be an image pickup device (such as CCD) or an external device (such as digital still camera, digital movie camera, and scanner). It is not specifically restricted.

A variety of embodiments may be assumed for the color character description data to be stored. As an example, the above-mentioned color character description data storing means may be constructed such that it stores the read color data of the standard color chart acquired by the above-mentioned color data reading means.

That is, it becomes possible to output the read color data of the standard color chart from the image input device, and it is possible to provide an image input device corresponding to the above-mentioned profile providing server.

Moreover, as another example of the embodiment of the color character description data, the above-mentioned color character description data storing means may be constructed such that it stores the table data to matches the read color data of the prescribed standard color chart acquired by the above-mentioned color data reading means with the standard color space coordinate values of each patch of the standard color chart. In this way it is possible to output the table data from the image input device.

Moreover, as another concrete example of the embodiment of the color character description data, the abovementioned color character description data storing means may be constructed such that it stores the profile data of the image input device. In this way it is possible to output the profile data from the image input device.

Moreover, as another concrete example of the embodiment of the color character description data, the above-mentioned color character description data storing means may be constructed such that it stores the serial number of the image input device.

Further, the following explains the construction of the terminal to receive the profile according to the present invention.

The third construction: Profile demanding client

A profile demanding client to connect and control a printing device and an image input device and to demand a profile of the printing device for an external server, which comprises a color chart print demand receiving means to receive a demand to print a prescribed color chart by said printing device, a printing control means to control print execution by said printing device based on a prescribed printing color data in compliance with the printing demand from said color chart print demand receiving means, a color chart reading demand receiving means to receive a demand to read by said image input device the color chart printed according to control from said print control means, an image input device control means to control said image input device in compliance with the read demand from said color chart read demand receiving means and acquires the read color data of said color chart, a color character description data acquisition means to control said image input device and acquire the color character description data previously stored in said image input device, said data matching the read color data with the prescribed standard color space coordinate value and being measured for the individual input image devices, a communication means capable of transmission and reception of data through a communication line, a data output means to output said printing color data, said read color data, and said color character description data through said communication means, and a profile data acquisition means to acquire the profile data of the printing device through said communication means.

The profile demanding client capable of controlling the printing device and the image input device receives the print demand of color chart and lets the printing device to print the color chart according to the prescribed printing color data. After printing the color chart, it also receives the reading demand and reads the color chart by means of the image input device. It further acquires the color character description data previously stored in the image input device, and it outputs said print color data, said read color data, and said color character description data through the communication line. It causes the external profile creating server to create the profile of the printing device according to the data, and it receives the profile of the printing device by the profile data acquisition means.

That is, it is possible for the user to easily obtain the profile data without the necessity for special software for profile preparation and without the necessity for reading operation with a calorimeter. In addition, since the color character description data stored in the image input device is the data measured for the individual image input devices, it is possible to create the profile without affection by difference between the image input device even if there exists difference. This permits one to obtain an accurate profile.

Needless to say, it is possible to construct as a series of systems by combination of such profile demanding client and profile providing server. In other words, it demands the generation of a profile in the profile demanding client, creates the profile by the external profile providing server of the profile demanding client, and provides the profile of the printing device to said profile demanding client. For profile preparation, it prints the color chart by the printing device and reads it by the image input device.

In addition, the method of creating the profile data based on the read color data and the color character description data acquired through a communication line is not necessarily limited to a tangible system. It is easily understood that it functions as a method.

As an example of the embodiment of the idea of the present invention, it may be software for the profile providing system.

The technical idea that the standard color space coordinate values of the color data for which the profile is created based on the color character description data of a specific device is grasped and the profile is created for the object for which the profile is created, is useful even though the object for preparation is other device than the printing device.

The fourth construction: Profile providing server for the image input device.

A profile providing server which comprises a communicating means capable of transmission and reception of data through a communication line, a read color data acquisition means to acquire through said communication line the read color data obtained by reading with a prescribed image input device the color charts printed by a specific printing device based on prescribed print color data, a color character description data acquisition means to acquire through a prescribed interface the color character description data to match the print color data of the image input device with the prescribed standard color space coordinate values, a profile data creating means to create the profile data defining correspondence between the printed color data and the prescribed standard color space coordinate values by matching the read color data with the standard color space coordinate value with reference to the color character description data, and a profile data output means to output through the communication line the thus created profile data.

In other words, according to the color character description data of the printing device, it becomes possible to make arbitrary print color data to corresponds to the standard color space coordinate value. Therefore, if the color chart printed by prescribed print color data is read by the image input device to obtain the read color data, it is possible to grasp the relationship between the read color data and the standard color space coordinate vale from the correspondence between the print color data and the standard color space coordinate value, and it is possible to create the profile of the image input device.

The following deals with the printing device suitable for profile generation of the image input device.

The fifth construction: Printing device

A printing device which comprises a head having nozzles to eject ink toward a printing medium, a primary scanning part to move said head back and forth in a prescribed direction relative to said printing medium, a head driving part to drive said head in accordance with the prescribed print color data and cause the ink to adhere the ejecting surface of the printing medium, a color character description data storing means to store the data measured for individual devices, said data being the color character description data to make the prescribed print color data to correspond to the prescribed standard color space coordinate value, and a color character description data output means to output through a prescribed interface the color character description data stored in the color character description data storing means.

In other words, the printing device is so constructed as to store the color character description data measured for individual devices. By reading this color character description data, it is possible to create an accurate profile for the image input device.

Moreover, the present invention may be embodied in the form of a system to provide the profile by connecting the profile providing server and the profile demanding client through a communication line. This method is not necessarily limited to a tangible system; it is easily understood that it functions as its method. The present invention covers the software for such a system as a matter of course.

BRIEF DESCRIPTION OF THE DRAWINGS

FIG. 7 is a diagram showing one example of the structure of the tone value correcting table.

FIG. 9 a schematic diagram showing how to create the tone value correspondence table from the standard lightness table and the lightness table.

FIG. 42 is a diagram showing the property screen at the time of ICC profile demanding.

FIG. 43 is a diagram showing the property screen at the time of ICC profile demanding.

DESCRIPTION OF THE PREFERRED EMBODIMENTS

Figure 1:
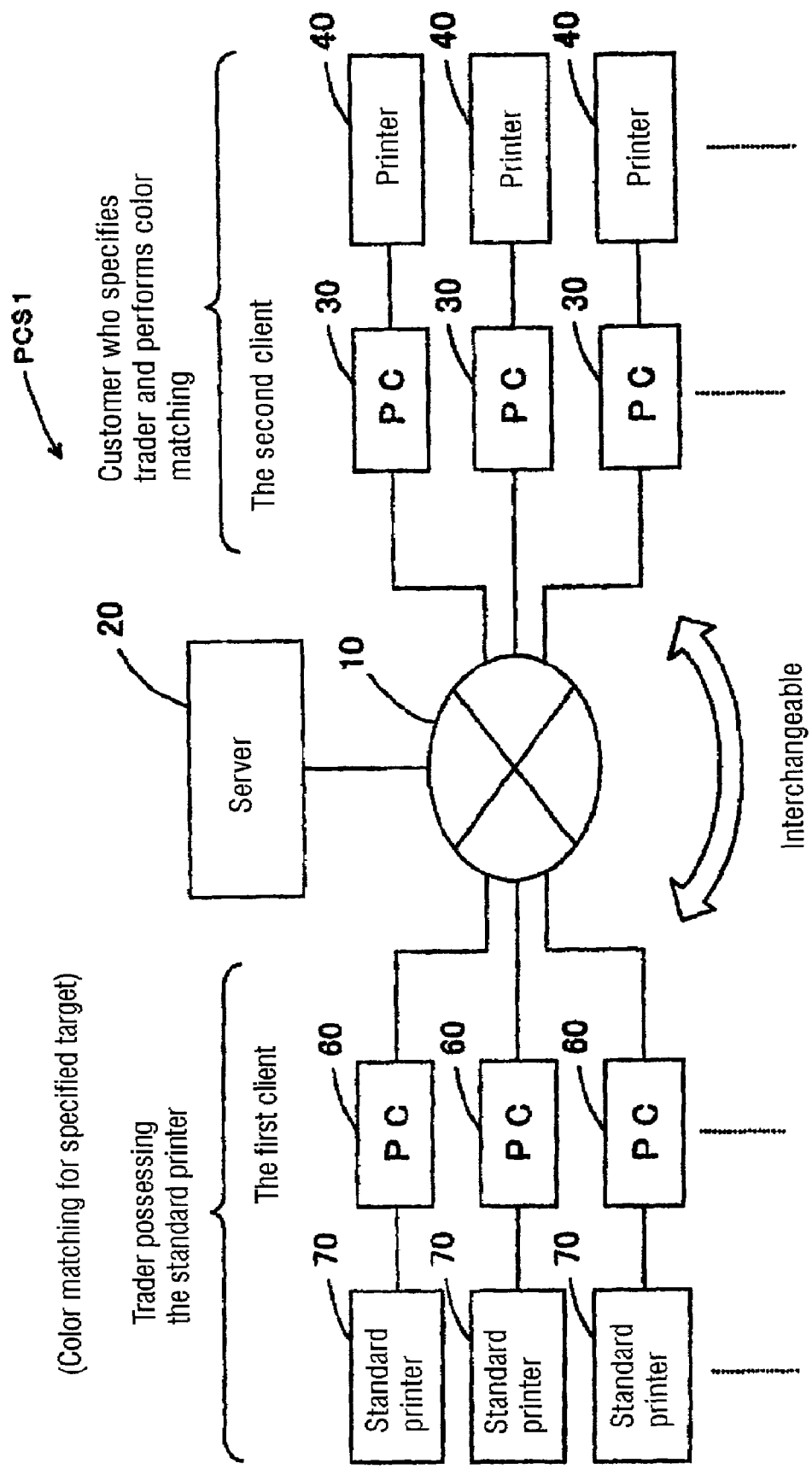
FIG. 1 is a schematic diagram showing the printing control system pertaining to the first embodiment of the present invention.

A detailed description is given below of the embodiments of the present invention in the following order.

I. The First Embodiment
(1) Hardware construction of the print control system
(2) Construction of various means of the print control system
(3) Action of the print control system: Main example
(4) The first modified embodiment
(5) The second modified embodiment
(6) The third modified embodiment
(7) Other modified embodiments II. The Second Embodiment
(8) Outline of the profile providing system
(9) Construction of the profile providing system
(10) Process for generation of the character description data
(11) Profile creating process
(12) Action of the profile providing system: Main example
(13) The first modified embodiment
(14) The second modified embodiment
(15) Other modified embodiments I. The First Embodiment (1) Hardware Construction of the Print Control System:

FIG. 1 is a diagram showing the outline of the print control system PCS1 pertaining to the first embodiment of the present invention.

In this figure, a server 20 and a plurality of personal computers (PC) 30 and 60 (which are clients) are connected to the internet 20. That is, the server 20 and the PCs 30 and 60 are connected to each other through the network 10 which permits two-way communications. To each of the PCs 30 and 60 are connected a printer 40 (capable of color printing) and a standard printer 70.

The user of this print control system PCS1 includes traders who possess the standard printer and customers who perform the color matching for their own printers in reference to the standard printer possessed by the trader. In other words, this system PCS1 is a system designed to perform color matching while the customer decides the partner (trader) for whom color matching is performed. And, the trader uses PC 60 as the first client, thereby to register himself as the trader possessing the standard printer 70, and sends to the server 20 for storage the lightness data of the standard color printed by the standard printer. On the other hand, the customer uses PC 30 as the second client, thereby to acquire from the server 20 the tone value correction table to reproduce the standard color at the time of printing with the printer 40.

Here, the trader may be a maker of printers or printer drivers or a vender for them or a printer. This system PCS1 is a system which permits the standard color to be reproduced by the remote standard printer or a system which realizes the remote proof.

Incidentally, sine the printer 40 and the standard printer 70 differ from each other only in whether their owner is the customer or the trader, it is possible to change the standard printer 70 into the printer 40 for color matching with the other standard printer 70, or it is also possible to change the printer 40 into the standard printer 70 for color matching with the other standard printer 70. Therefore, there is a possible mode in which the standard printer 70 and the printer 40 (for color matching with the standard printer) are interchanged adequately.

Figure 2:
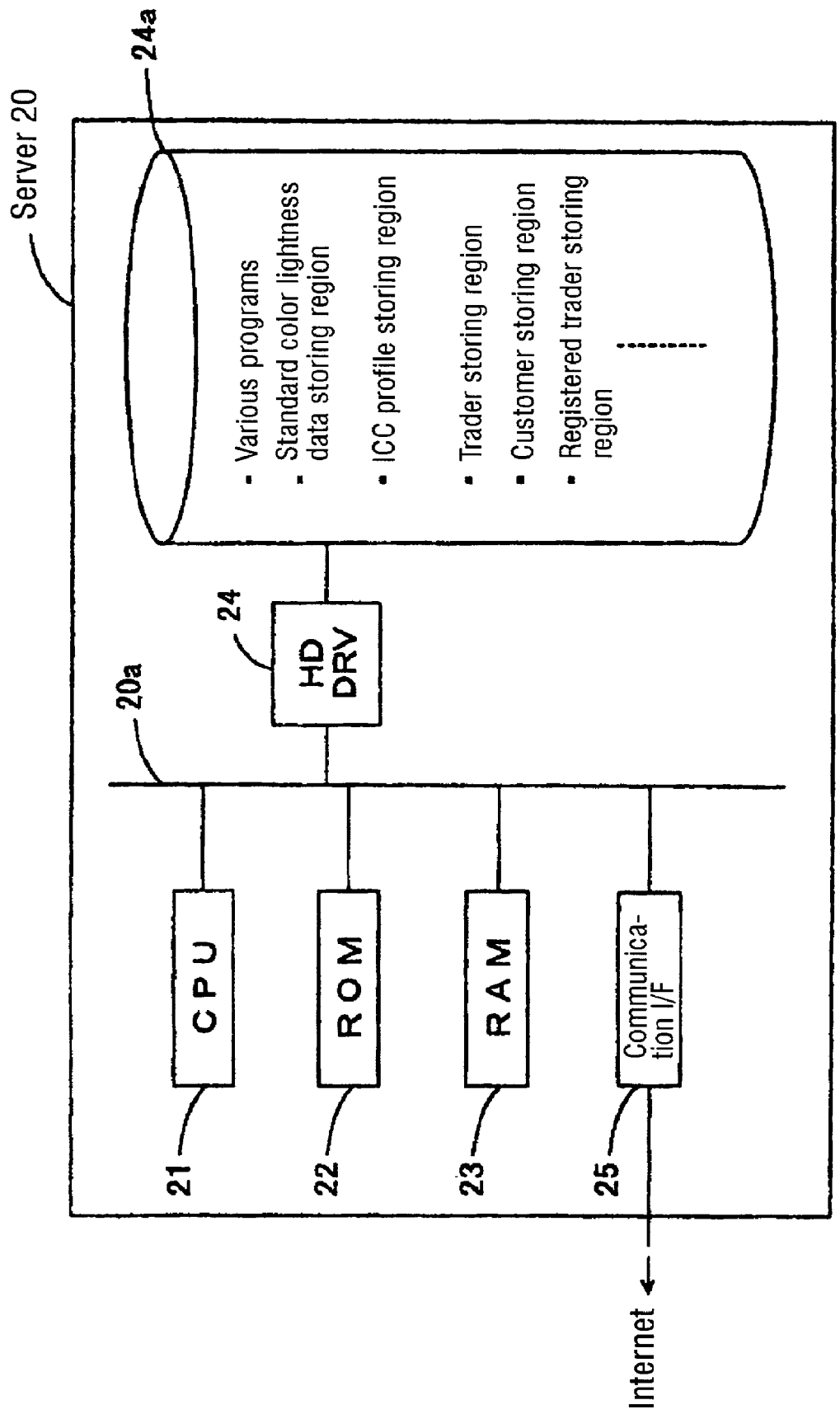
FIG. 2 is a schematic diagram showing the hardware structure of the server.

FIG. 2 is a diagram showing the outline of the hardware construction of the server 20. In this figure, the server 20 is provided with the CPU 21 which is vital to arithmetic operation. This CPU 21 controls the server 20 entirely through the system bus 20*a*. To the system bus 20*a* are connected a ROM 22, a RAM 23, a hard disk drive 24, and a communication interface (communication I/F) 25. To the hard disk drive 24 is connected a hard disk 24*a*. In this hard disk 24*a* are stored programs (such as CGI program to realize various functions of the present invention in cooperation with the PCs 30 and 60) and various data such as the lightness data of the standard color. The communication I/F 25 is connected to the internet 10, so that it is possible to acquire various data (such as lightness data) from PCs 30 and 60 and to output various data (such as color matching information) through the communication I/F 25. In other words, the server 20 constitutes the print control device of the present invention.

Figure 3:
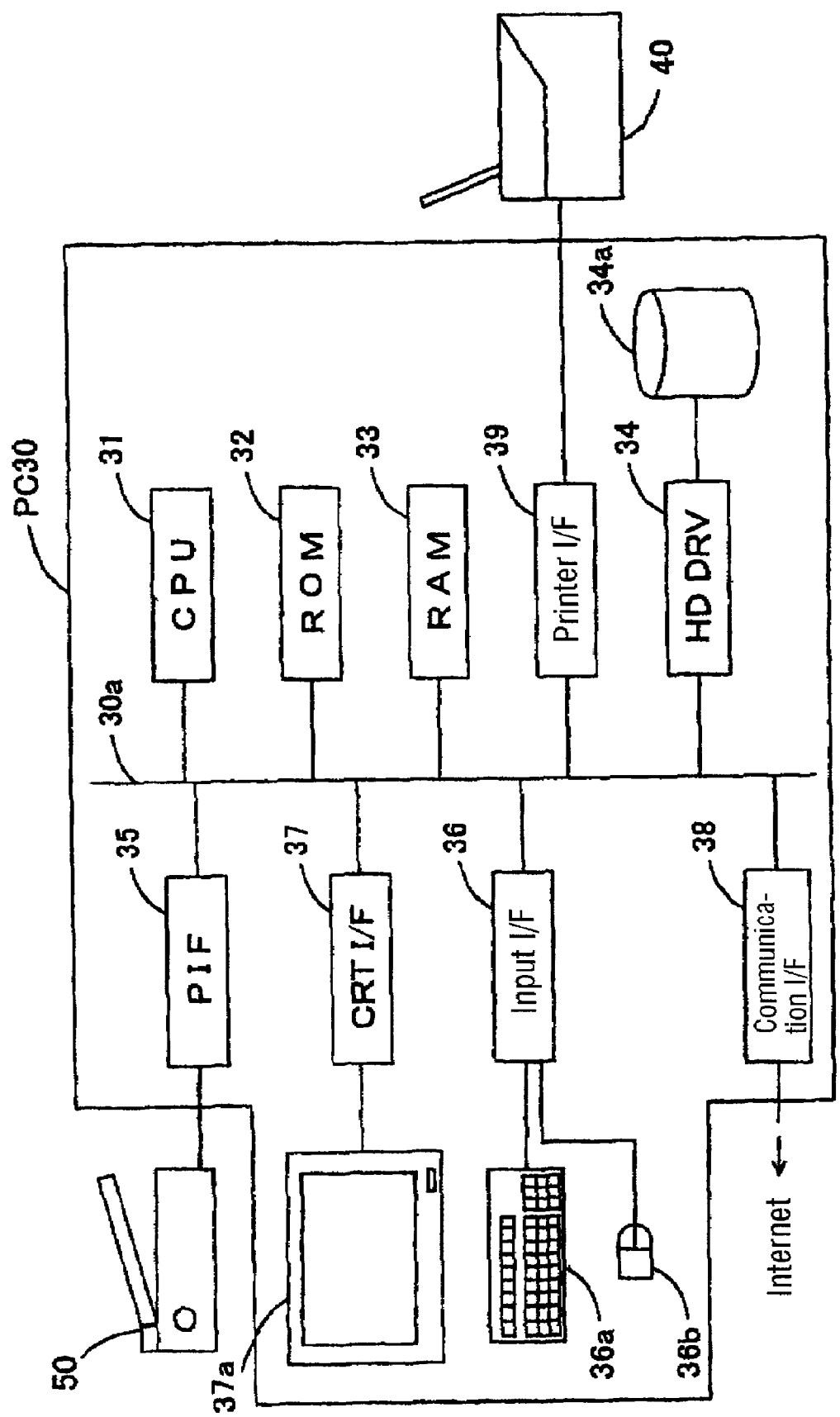
FIG. 3 is a schematic diagram showing the hardware structure of the PC.

FIG. 3 is a diagram showing the outline of the hardware construction of PC 30. Incidentally, although PC 60 is not shown, difference between PC 30 and PC 60 is only their owner. Therefore, explanation is made only for PC 30.

In this figure, PC 30 is provided with CPU 31 which is vital to arithmetic operation, and this CPU 31 controls CPU 30 entirely through the system bus 30*a*. To the system 30*a* are connected ROM 32, RAM 33, hard disk drive 34, peripheral interface (PIF) 35, input interface (input I/F) 36, CRT interface (CRT I/F) 37, communication interface (communication I/F) 38, and printer interface (printer I/F) 39.

The PC 30 in this embodiment is a so-called desk-top type PC, and its construction is simplified for explanation. Needless to say, PC 30 may be any computer having a general construction; it may be a note-type one or a mobile one. Also, the computer applicable to the print control system of the present invention is not limited to a PC.

In the hard disk 34*a* connected to the hard disk drive 34 are stored software such as operating system (OS) and application programs (APL) capable of producing document information and image information. This software is transferred to RAM 33 by CPU 31 at the time of execution. And, CPU 31 executes various programs by accessing RAM 33 as a temporary work area. A browser as one of APL is installed, so that it is possible to download the HTML file from the server 20 through the communication I/F and view it on the display 37*a*. It is also possible to receive the operation input by using the keyboard 36*a* and mouse 36*b* and to send the input data to the server 20.

To the PIF 35 is connected a color scanner 50 or a digital camera (not shown). To the input I/F are connected the keyboard 36*a* and the mouse 36*b* as input devices. To the CRT I/F 37 is connected the display 37*a*. In addition, to the printer I/F 39 is connected the printer 40 through a parallel interface cable. The interface for connection with the printer 40 is not limited to parallel interface; it includes serial interface, SCSI, USB, etc. The same holds true for any mode of connection which will be developed in the future.

The recording medium to store the above-mentioned software is not limited to the hard disk; it may include, for example, CR-Rom and flexible disk. The software recorded in these recording media is read by a CD-ROM drive or flexible disk drive (not shown) and then installed in the hard disk 34*a*. It is eventually read into RAM 33 by CPU 31 for execution of various processing. The recording medium is not limited to those listed above; it may include a magneto-optical disk and a non-volatile memory (which is a semiconductor device). Moreover, it is also possible to access the server 20 through the communication I/F 38 (such as modem) connected to the internet 10 and to download various programs.

It is not necessary to use a special specification to construct the above-mentioned network hardware made up of the server and the client. It is possible to realize by using the ordinary hardware. Also, PC 30 may be replaced by a LAN (local area network) in which a plurality of PCs are function as the local server. In this case, it is possible to access the internet 10 from a plurality of PCs in the same LAN.

The printers 40 and 70 used in this embodiment are ink jet printers. For the sake of plain explanation, it is assumed that the printer employs four color inks—cyan (C), magenta (M), yellow (Y), and black (K) at the time of color printing. These color inks are the print colorants which are referred in the present invention. In the specification and drawings, the colors of the ink are simply referred to as C, M, Y, and K.

Figure 4:
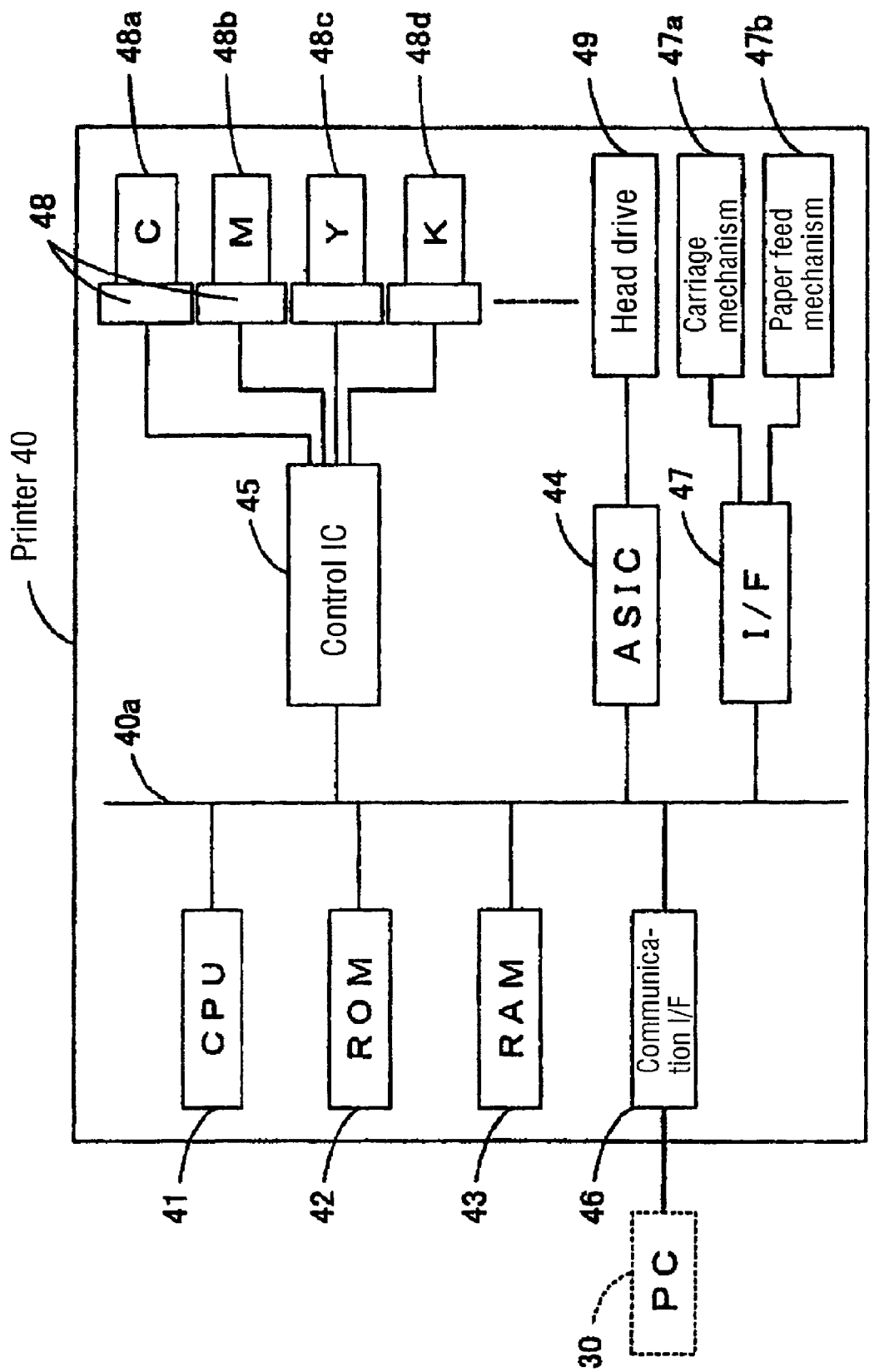
FIG. 4 is a block diagram showing the structure of the printer and PC.

FIG. 4 is a block diagram showing the construction of the printer 40 and PC 30. Incidentally, the standard printer 70 is not shown; but the following explanation is limited to the printer 40 because only difference between the printer 40 and the printer 70 is their owner. Also, the following description deals with the construction of a comparatively large printer; but it is possible to adopt a small-sized one as the printer 40 or 70, as a matter of course.

To the bus 40*a* in the printer 40 are connected CPU 41, ROM 42, RAM 43, ASIC 44, control IC 45, communication I/O 46, and interface (I/F) to send image date and drive signals. CPU 41 uses RAM 43 as a work area to control each part according to the programs written in ROM 42.

The printer 40 in this embodiment is an ink jet printer that employs four color inks. It is possible to use a printer which employs six or seven color inks or it is also possible to use a laser printer that employs a plurality of color toners. The ink jet printer that employs a plurality of color inks may range in grade from low to high. For identification of printer grade, ROM 42 stores information for grade identification in its specific region.

ASIC 44 is an IC which is customized to drive the print head (not shown). It sends to and receives from CPU 41 signals for processing to drive the print head. It sends voltage data to the head drive 49.

The head drive 49 is a circuit consisting of a dedicated IC, a drive transistor, a heat radiator, etc. The head drive creates a voltage pattern for the piezoelectric element in the print head according to the voltage data entered from ASIC 44. The print head is connected to the cartridge holder 48 through tubes for individual color inks. The cartridge holder 48 holds ink cartridges 48*a*–48*b* which are filled respectively with four kinds of color inks. Thus, the print head is supplied with color inks. Ink is ejected by the piezoelectric element which is driven in the inc chamber which runs from the tube to the ejecting hole.

The print head has the ink ejecting surface, in which there are four nozzle rows for ejection of four color inks. The nozzle rows are arranged in the direction of primary scanning. Each nozzle row has a plurality of nozzles (say, 48 nozzles) which are linearly arranged at constant intervals in the direction of secondary scanning.

The cartridge holder 48 is provided with an ink supply needle. The ink supply needle comes into contact with the ink inlet (not shown) attached to the ink cartridges 48a–48b, so as to form the in supply passage, which permits the color ink in the ink cartridge to be fed to the print head.

The control IC 45 is an IC which is mounted to control the cartridge memory (which is a non-volatile memory mounted on each of the ink cartridges 48a–48d). As the cartridge holder 48 is loaded with the ink cartridge, the cartridge memory is electrically connected to the control IC 45. The CPU 41 sends and receives signals to and from the control IC 45 so as to renew information about the ink residual quantity recorded in the cartridge memory.

The communication I/O 46 is connected to the printer I/F 39 of the PC 30, and the printer 40 receives data (converted into CMYK) and print job (page description language) from the PC 30 through the communication I/O 46. Upon receiving various demands from the PC 30, the communication I/O sends to the PC 30 the identification information stored in the ROM 42 and the information about the ink residual quantity from the control IC 45.

To the I/F 47 are connected to the carriage mechanism 47a and the paper feed mechanism 47b. The paper feed mechanism 47b is made up of a paper feed motor and a paper feed roller, and it delivers printing paper (or any other print recording medium) and performs secondary scanning. The carriage mechanism 47a is made up of a carriage to support the print head and a carriage motor to run this carriage by means of a timing belt, and it causes the print head to perform primary scanning. The print head with a plurality of nozzles arranged in the direction of secondary scanning has the piezoelectric elements driven by the drive signals which the head drive 49 issues based on the head data consisting of bit rows, so that ink drops for each dot are ejected from each nozzle.

Incidentally, BIOS in PC 30 is executed for the above-mentioned hardware, and OS and APL are executed in its upper layer. Basically, OS accesses the hardware directly or through BIOS, and APL exchanges data with the hardware through OS. OS has a variety of drivers to control the hardware of PC30, and they execute controls as a part of OS. These drivers include the display driver to control the CRT I/F 37 and the printer driver to control the printer I/F 39.

The printer driver is composed of a plurality of modules; it realizes prescribed functions according to control by the function control module and creates the print job by coordinated operation. The printer driver works when the print function of APL is executed, and it performs two-way communication with the printer 40 through the printer I/F 39. The printer driver receives print data from APL through OS and creates the print job and sends it to the printer 40. It also sends demand for information about color ink to the printer 40 through the printer I/F 39 and acquires corresponding information from the printer 40. Therefore, OS has GDI (graphics device interface) and port driver. The GDI realizes the graphic user interface between APL and OS regarding graphics such as rendition image information and document information. The port driver stores the print data acquired from APL in the form of intermediate file in a certain region of the hard disk 34a and performs prescribed processing on this intermediate file to create the print jot and sends it to the printer 40.

This embodiment is designed such that an intermediate file is created from the print data so that other programs can be executed while printing is being executed by the printer 40. There is an alternative in which no intermediate file is created but the color data is created directly from the print data.

Figure 5:
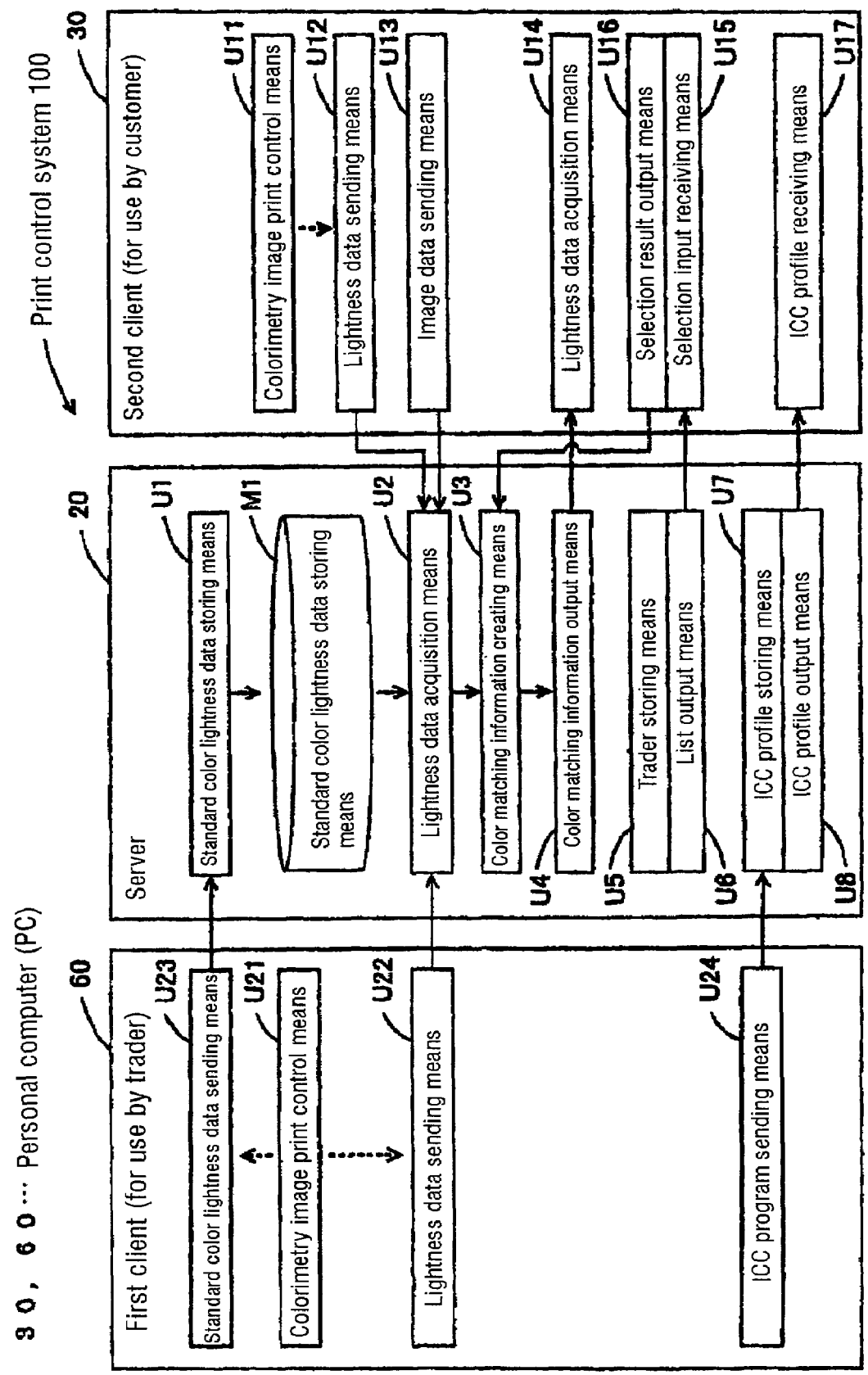
FIG. 5 is a block diagram showing the outline of the major means to constitute the print control system.

(2) Construction of Various Means of the Print Control System:

As mentioned above, the print control program (as defined in the present invention) is stored in the hard disk of the server 20 and the hard disk of the PC 30 and PC 60, so that the print control program permits the server 20 and the PC 30 and PC 60 to realize the various means (as defined in the present invention). FIG. 5 is a schematic block diagram showing the major means constituting this system PCS1.

In FIG. 5, the server 20 is provided with the means U1–U8. The PC 60 (as the first client) is provided with the means U11–U17. The PC 30 (as the second client) is provided with the means U21–U24. The hard disk 24a of the server has the storage area M1 for the standard color lightness data, the storage area for the ICC profile, the storage area for the trader, the storage area for the customer, and the storage area for the registered trader.

The outline of the functions of these various means are as follows.

The colorimetric image print control means U11 and U21 of the clients perform control to print color chips (which are calorimetric images having a plurality of tones for each of a plurality of color inks). The lightness data acquisition means U2 of the server acquires the lightness data of the color chips of individual color inks printed by the client. In the standard lightness data storage area M1 is stored a prescribed standard color corresponding to said color ink (that is, the lightness data of the standard color to be printed by the standard printer). The color matching information preparing means U3 creates the tone value correction table (which is color matching information) according to the lightness data of the color chips for individual color inks to be printed by the client and the lightness data of the standard color stored in the standard color lightness data storage area M1. And the color matching information output means U4 outputs the thus created tone value correction table to the client.

In the second client, the color matching information acquisition means U14 acquires the tone value correction table. Then, it is possible to make the printer 40 to reproduce the standard color according to the tone value correction table, as mentioned later.

Here, the lightness data acquisition means U2 can acquire the lightness data of the color chips printed by the second client from the first or second client through the internet 10. The client is provided with the lightness data sending means U12 and U22, so that it can receive the input of the lightness data of the color chip and send it to the server. The lightness data acquisition means U2 can also acquire the image data of the color scanner from the client and acquires the lightness data of the color chips by conversion into lightness data. The image data sending means U13 of the client can acquire the image data from the scanner (which is an image acquisition machine to acquire the image data of the color chips) and send it to the server.

Also, the trader storage means U5 stores the list of traders in the trader storage area (not shown), and the list output means U6 acquires the stored list of traders and outputs it to the second client. In the second client, the selection input receiving means U15 accepts the selection and input of traders from the list of traders entered from the server, and the selection result output means U16 sends the trader selected and entered to the server. Thus, color matching for the printer is performed for the trader who has been selected and entered.

Moreover, the first client with the standard printer connected thereto has the standard color lightness data sending means U23 which acquires the lightness data of color chips of standard color and sends it to the server 20. In this embodiment, the ICC profile is imparted to the print data to be delivered to the printer driver so that the color to be reproduced by the standard printer meets the prescribed color specification. Thus, the ICC profile for the standard printer can also be sent to the server 20 by the ICC profile sending means U24.

The server 20 has the standard color lightness data storing means U1 which stores the lightness data of standard color as input in the standard color lightness data storing region M1, and it also has the ICC profile storing means U7 which stores the ICC profile for the standard printer as input in the ICC profile storing region. The ICC profile for the standard printer can be sent to the second client by the ICC profile output means U8. The second client has the ICC profile acquiring means U17 which acquires said ICC profile.

Figure 6:
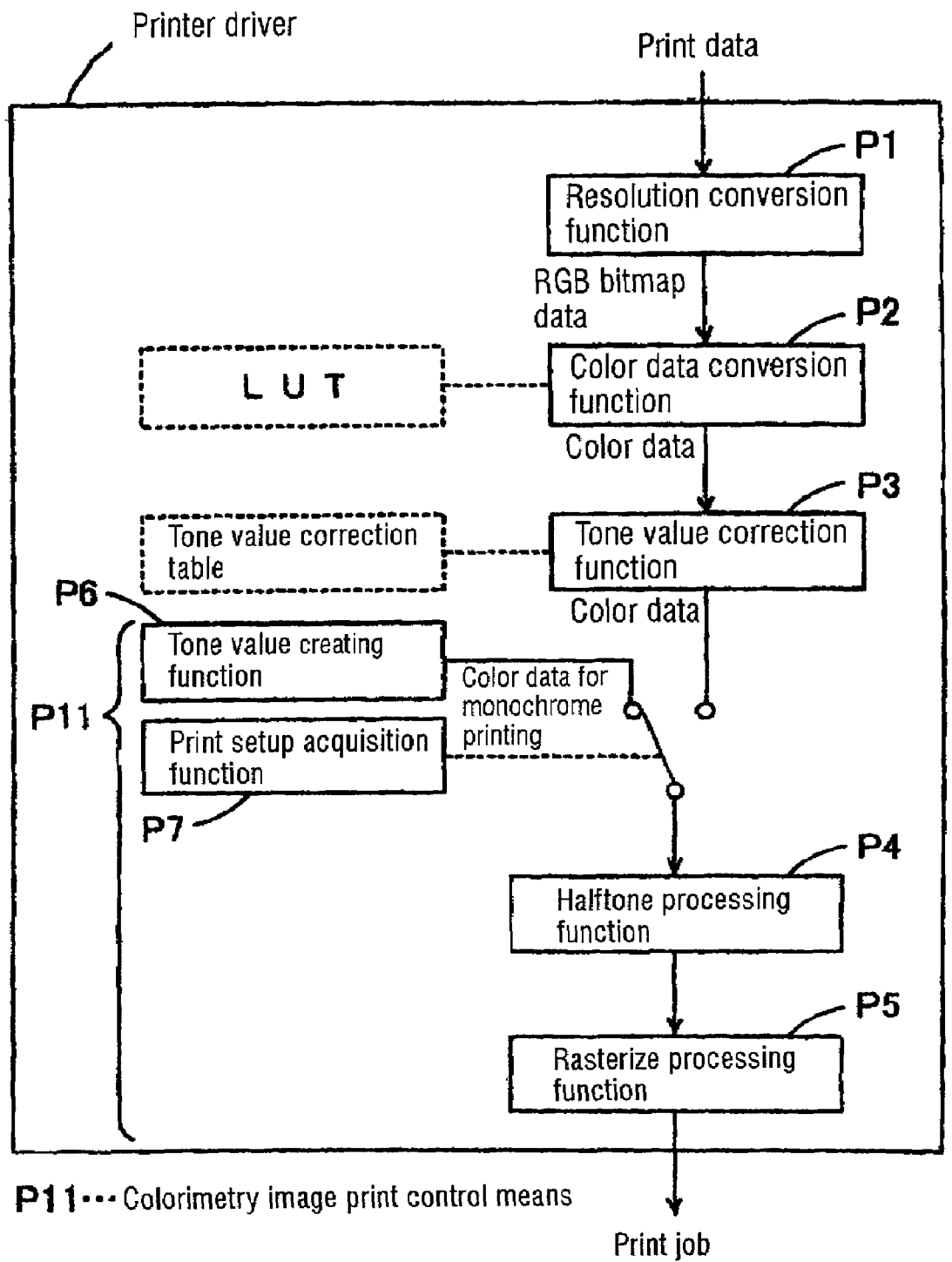
FIG. 6 is a schematic diagram showing the outline of the structure of the PC's printer driver.

It is the printer driver in PC 30 and PC 60 that controls the printers 40 and 70 for their printing. FIG. 6 is a schematic diagram showing the printer driver in PC 30 as the second client. The printer driver performs print control while reproducing the standard color by the various functions shown and also performs control for color chip printing. Incidentally, although the structure of the printer driver in PC 60 as the first client is not shown, it is identical with that of the printer driver of PC 30 except that it does not use the tone value correcting function by the prescribed print setup.

In FIG. 6, the print setup acquiring function P7 functions as a switch to deliver the color data from the tone value correcting function P3 to the halftone processing function P4 or to deliver the color data for monochrome printing from the tone value preparing function P6 to the halftone processing function P4. Said print setup acquiring function P7 has the color chip print instruction acquiring function. The instruction acquired by this color chip print instruction acquiring function accomplishes this switching.

For ordinary printing, the print setup acquiring function P7 is switched to the tone value correcting function P3. In this case, the printer driver works in the following manner.

First, the printer driver acquires print data (such as color image data). Then, the resolution converting function P1 converts the print data into bit map data of 256 tones in which 8 bits are allocated to each of RGB. The RGB bit map data may have other various tones than this, as a matter of course.

Subsequently, the color data converting function P2 acquires the print data which has been converted into the RGB bit map data and then converts it into the color data corresponding to each of the CMYK color inks. This conversion into the color data is accomplished by referencing the color converting table called look up table (LUT). This LUT is a table which makes the RGB bit map data for 256 tones to correspond to the color data of 256 tones for each of CMYK. It has data corresponding to the lattice point of, say, 17×17×17, assuming interpolation operation.

Incidentally, in this embodiment, the number of tones of color data is 256 tones with allocation of each 8 bits, but other various tones than this are possible as a matter of course.

Further, the tone value correcting function P3 references the tone value correcting table and corrects the tone value of color data. In the case of a printer which performs printing by ejecting color inks, in order to eliminate variation of color reproduction from one printer to another due to variation of the ink ejecting mechanism, the color data of multiple tones consisting of CMYK etc. is corrected according to the tone value correcting table so that the color to be reproduced matches the prescribed standard color to be printed by the standard printer. Consequently, this color tone value correcting table is a table to match the color to be reproduced by the printer 40 with the standard color. Incidentally, as mentioned later, the color tone value correcting table is a table to match the lightness data of color reproduced by the standard printer with the lightness data of color reproduced by the user printer used by the customer.

As shown in FIG. 7, the tone value correcting table stores the tone value of color data converted into the color data converting function P2 for each ink and the tone value to be reproduced in agreement with the standard color with the color ink corresponding to said color data, the former corresponding to the latter. Therefore, there will be an instance in which the tone value correcting table differs for the same kind of printer.

After that, the halftone processing function P4 performs halftone processing by random dither method or the like and converts the corrected color data into two tones corresponding to the print dot of the printer 40. And the rasterizing processing function P5 performs rasterizing process for rearranging the bit data of color data which has been made two tones according to the scanning width of the print head of the printer 40, and adds the page description language to make the print job.

As the result, the printer 40 acquires the print job and performs printing by ejection of color inks of CMYK. Here, the tone value of the color data is corrected by the tone value correcting function P3 so that the color reproduced by individual inks matches the standard color, and hence the printer 40 reproduces the standard color.

In the meantime, in order to create the tone value interpolating table, it is necessary to select a color from the color space formed by a plurality of color inks and print color chips, measure the color chips as well as the standard color, and create the corresponding table so that the measured data of the user printer matches with the measured data of the standard printer. In the past, the tone value correcting table was created by measuring color chips composed of about 500–1000 colors for several items such as hue and saturation. Therefore, there was a problem that the work to create the tone value correcting table requires much labor. Especially, in the case where the tone value correcting table is to be corrected periodically in consideration of change with time of color reproduction, it is necessary that the customer remote from the place where the standard printer is installed print a large amount of color chips and then acquire the renewed tone value correcting table, and this work was very troublesome.

So, this color matching work is alleviated by printing color chips of plural tones with each color ink and measuring only the lightness data of each tone of the color chips. Here, the color chip of plural tones printed with each ink is a color having light and shade for each ink without a mixture of plurality color inks. Therefore, the hue and saturation change very little but the lightness greatly changes for hue and saturation. Thus, when the lightness of the color reproduced for individual colors is matched with the lightness of the standard color, the reproduced color nearly matches the standard color. In other words, it is only necessary to measure the lightness data for the color chips of individual colors, it is possible to alleviates the color-matching work, and it is possible to easily acquire the tone value correcting table from the server 20.

In the case of printing the color chips, the switch by the print setup acquiring function P7 is at the side of the tone value correcting function P3. And, part of said function P7 and functions P6, P4, and P5 constitute the image print control function P11 mentioned in the present invention. In this case, the outline of action of the printer drive is as follows.

That is, the tone value preparing function P6 creates the color data for monochrome printing to be reproduced individually in plural tones in correspondence to each of the CMYK inks. In this embodiment, the tone number of the color data for monochrome printing is the same 256 tones as the color data, but it may be the tone number different from the color data. Here, if each tone value of CMYK of a certain point at the color data for monochrome printing is represented by (C, M, Y, K), for example, in the case of color reproduction of color ink of C, the color data for monochrome printing becomes (n, 0, 0, 0), where n is an integer greater than 0 and smaller than 255. Also, in the case of color reproduction for color ink of M, the color data for monochrome printing becomes (0, n, 0, 0).

Here, the color data for monochrome printing may take a varied number of tones. It may be data of tone (say, 17 tones) less than the tone number (256 tones) of the color data, or it may be the same 256 tones as the tone number of the color data. And, the intervals of the tones of the color data for monochrome printing may be properly determined according to the characteristic properties of color ink and the like.

After that, the halftone processing function P4 performs halftone processing and converts the color data for monochrome data into two tones corresponding to the print dot. And, the rasterize processing function P5 performs rasterize processing and creates the print job. The printer 40 acquires the print job and prints color chips which are images for colorimetry as the color of plural tones using the color inks of CMYK individually. In the example shown in the figure, they are color chips with color inks of C, M, Y, K, from top to bottom. Each color chip has the gradation of 17 tones for each color ink, and the value of tone of color component of the corresponding color data increases in going to the right side. Incidentally, it is possible to print color chips of 256 tones (the same number of tones in the color data) in considering that the printer is the standard printer 70.

So, it is possible to obtain the lightness data for preparing the tone value correcting table by measuring (with a colorimeter or the like) the lightness data of each tone of the color chips. At that time, it is possible to reduce the number of colors to be measured than before because only the color chips with plural tones are printed using the color inks individually. Also, it is not necessary to measure a plurality of items (such as hue and saturation) as before, and it is only necessary to measure the lightness data alone, and hence the work to create the tone value correcting table is alleviated.

Incidentally, in this embodiment, it is so constructed as to realize the image printing control function P11 for colorimetry by using the halftone processing function P4 and the rasterize processing function P5 to realize the ordinary printing processing; however, it may be so constructed as to realize by the another flow.

By the way, the tone value correcting table may be created by the following procedure, for example.

First, color chips of 256 tones, for example, are printed for each color ink with the standard printer by print control of the client connected to the standard printer. And, the lightness data of color chips printed for individual inks are measured for each tone by using a colorimeter based on the Lab calorimetric system, for example.

The lightness data of color chips of 256 tones printed with the standard printer is stored in the standard lightness table T11 for correspondence with the tone value of individual color inks, as shown in FIG. 9. FIG. 9 shows the standard lightness table T11 corresponding to the color ink of C. For other color inks, the standard lightness tables corresponding to them are created. In other words, the lightness table for each tone stored in these standard lightness tables are the data representing the prescribed standard color. Incidentally, in the case where the color chips are printed with less tones than 256 tones and the lightness data is obtained, it is permissible to obtain the lightness data of the tone of unprinted color by interpolation operation.

Figure 8:
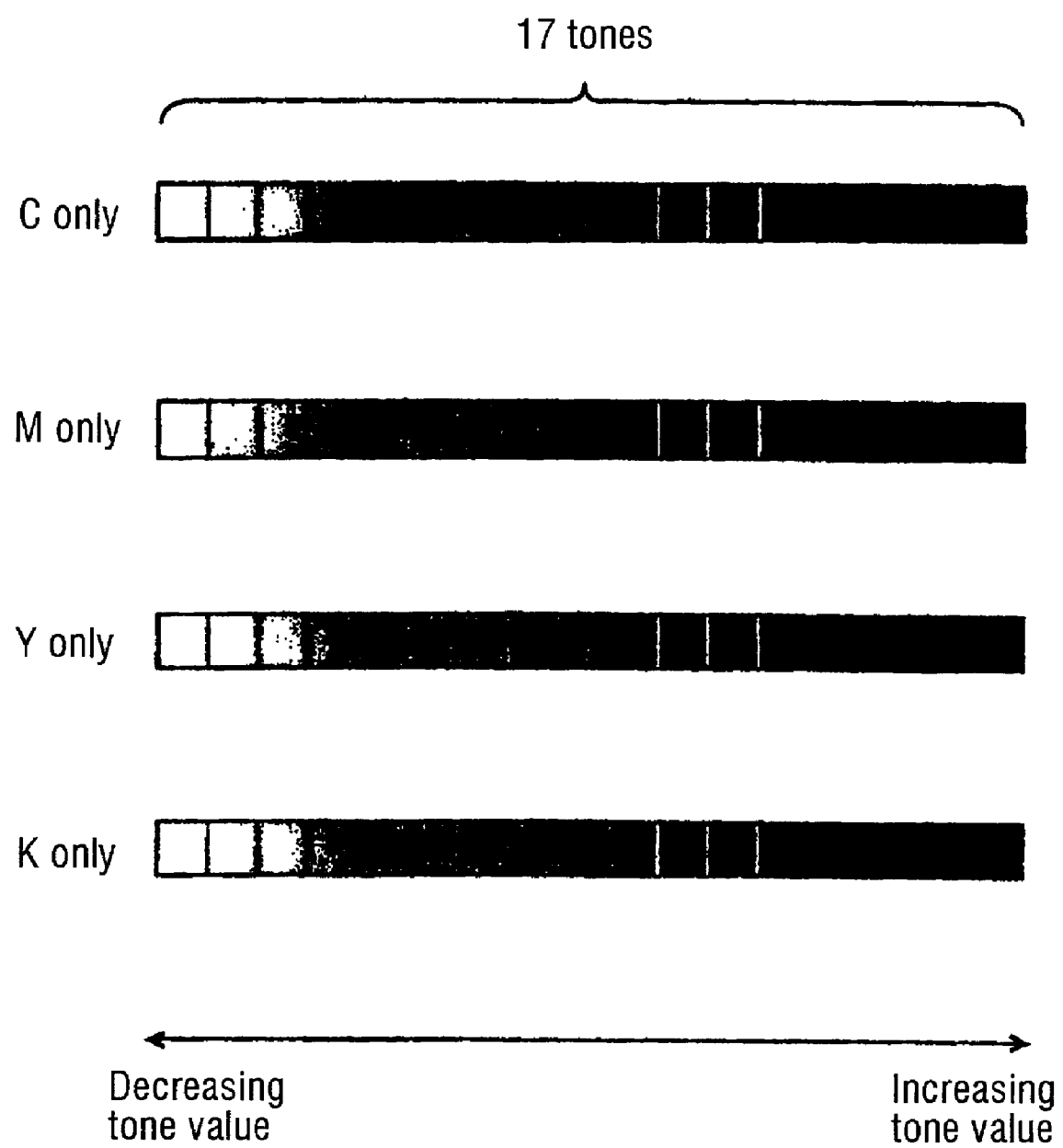
FIG. 8 is a diagram showing one example of the printed color chips.

Next, color chips for each color ink are printed by the user printer as shown in FIG. 8 according to the print control of the client connected to the user printer to be matched with the standard color, and the lightness data is obtained by the calorimeter. And, as shown in FIG. 9, the lightness table 12 is created in correspondence to the tone value of each color ink. The lightness table T12 in this figure is also the table corresponding to the color ink of C, and the lightness tables corresponding to other color inks are also created. Here, if the number of tones of color chips printed is, say, 17 tones, which is less than the 256 tones of the color data, only the tone value and lightness data corresponding to the printed color are stored in the lightness table T12. The following description is based on the assumption that the number of tones in printed color chips is 17.

Moreover, the tone value corresponding table T13 (shown in FIG. 9) for individual color inks is created from the standard lightness table T11 and the lightness table T12. At that time, the tone value corresponding table T13 corresponds to the tone value for which the lightness data stored in the lightness table T12 is identical with the lightness data stored in the standard lightness table T11. Incidentally, the tone value before correction in the tone value corresponding table T13 in the figure is the tone value stored in the lightness table T12, and the tone value after correction for color reproduction for matching with the standard color is the tone value stored in the standard lightness table T11.

Here, since the lightness table T12 stores the data for only 17 tones, the tone value of the lightness table T12 is stored first in the tone value corresponding table T13, and subsequently the tone value which becomes the lightness data corresponding to said tone value in the lightness table T12 is acquired from the standard lightness table T11, and it is stored in the tone value corresponding table T13. If the tone value which becomes said lightness data is not stored in the standard lightness table T11, it acquires the tone value closest to said lightness data from the standard lightness table T11 and stores it in the tone value corresponding table T13.

In the example shown in FIG. 9, the lightness table T12 stores the lightness data "42.0" corresponding to the tone value "128" of the user printer, and the standard lightness table T11 stores "42.0" corresponding to the tone value "110" of the standard printer. Therefore, it follows that the tone value corresponding table T13 stores the corrected tone value "110" corresponding to the tone value "128" which is not yet corrected.

Because the thus created tone value corresponding table T13 stores the data for only 17 tones, the tone value correcting table is created by obtaining (by interpolating operation) the corrected tone value corresponding to the tone value of the color data whose color reproduction was not made by the printer 40. For example, if the corrected tone values of B1 and B2 correspond to the consecutive uncorrected tone values A1 and A2 (A1<A2), the corrected tone value of B3 corresponding to the uncorrected tone value of A3 (A1<A3<A2) between A1 and A2 can be obtained from the following formula.

$$B3 = B1 + \{(B2-B1) \times (A3-A1)/(A2-A1)\} \quad (1)$$

The above formula is a mere example; it is possible to obtain the corrected tone value by various methods of interpolation, such as spline interpolation.

In this way, it is possible to create the tone value correction table for each color ink, as shown in FIG. 7. Incidentally, the tone value correction table T1 in the figure is a table corresponding to the color ink of C, and tone value correction tables corresponding to the other color inks may also be created.

Incidentally, it is permissible to create the tone value correction table by causing the server 20 to perform the above-mentioned process automatically; alternatively, it is also permissible to create the tone value correction table by performing the above-mentioned process separately and receiving the input. And, when the tone value correction table created by the color matching information output means U4 is output to the client, the color matching information acquisition means U14 of the client acquires said tone value correction table and builds it into the printer driver. Then, the tone vale correction function P3 references said tone value correction table and corrects the color data, and the color reproduced by the printer 40 becomes the one which matches the standard color.

(3) Action of the Print Control System: Main Example

In what follows, the action of the print control system PCS1 constructed as mentioned above is explained with reference to the flow chart. Incidentally, in the following description, as one example of usage of the this system PCS1, a scene is assumed in which the printing trader possesses the standard inkjet printer and the color reproduced by the inkjet printer used by the customer is matched with the standard color printed by said standard printer. Incidentally, the trader and customer are previously given the user name as the identification information. And, according to the flow (not shown), the trader memory means U5 of the server acquires the trader name, the user name, and the password are acquired by accepting the operation input or the like, and they are stored in the trader storage region in the hard disk 24a in correspondence to them. Also, the customer memory means (not shown) acquires the customer name, the user name, and the password by accepting the operating input, and they are stored in the customer storage region in the hard disk 24a in correspondence to them.

Figure 10:
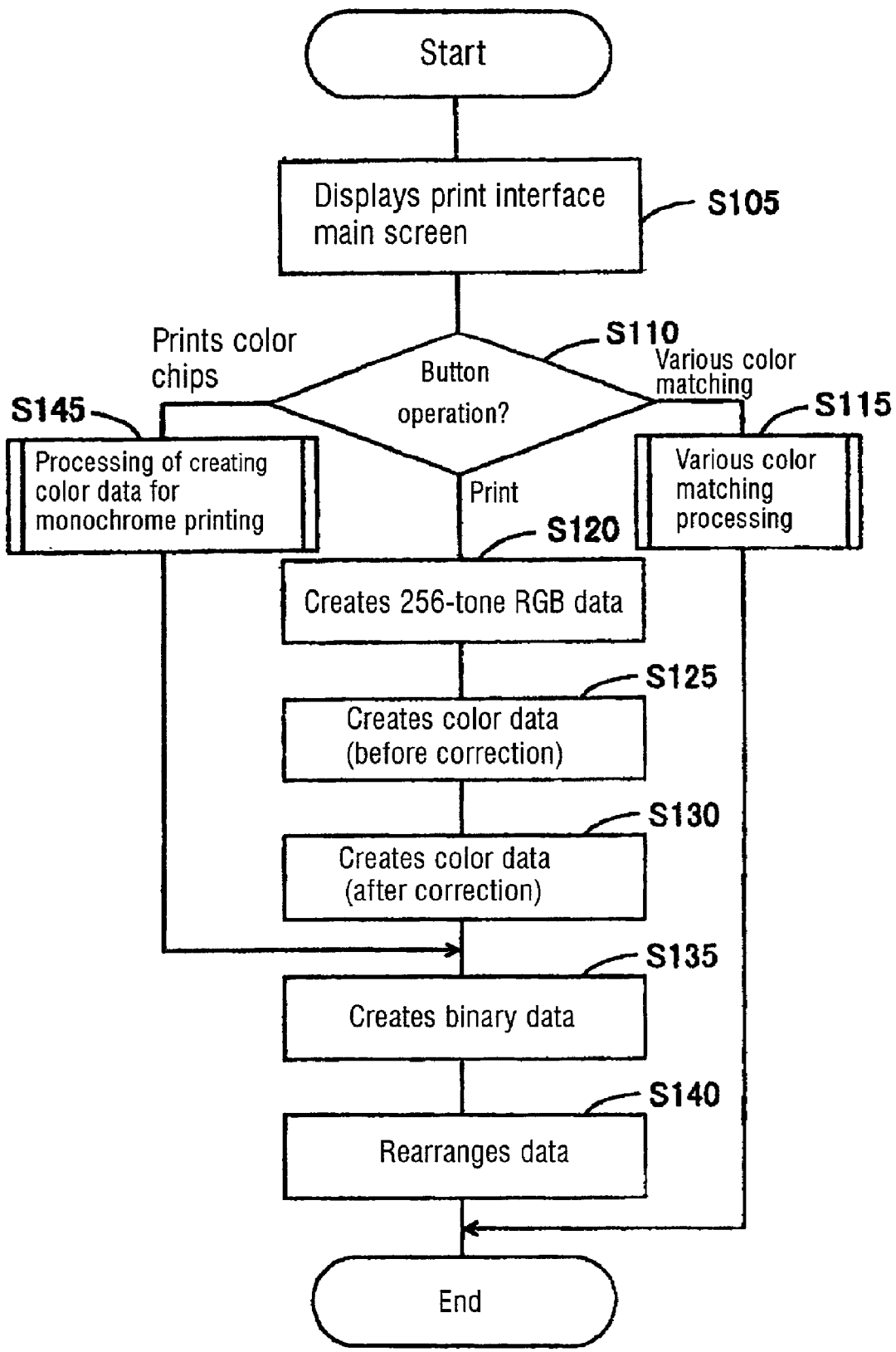
FIG. 10 is a flow chart showing the outline of the processing by PC's print driver.

FIG. 10 shows the outline of the processing of the printer driver of PC 30 and PC 60. APL of PC possesses the printing function for APL; when the print execute menu displayed in the display 37a is selected by this printing function for APL, the program of the print driver performs the processing to display the print interface main screen (not shown) (step S105). This screen displays the paper kind selection region, the print button, the color chip print button, the color matching button, etc. which are limited information to follow the ordinary print instructions.

Then, the processing branches according to the mouse operation to the button provided on the print interface main screen. (Step S110)

When the color matching button is clicked, the flow proceeds to step S115 and carries out various color matching processes (mentioned later), and this flow terminates. The various color matching processing accesses the server 20 and carries out processing for individual traders or customers.

When the print button is clicked, the flow proceeds to step S120 and implements the ordinary print control processing sequentially.

In step S120, the resolution change processing is carried out by the resolution changing function P1. It acquires the print data created by APL through GDI, creates the intermediate file based on the print data acquired, and temporarily stores it in the hard disk 34a. Here, the above-mentioned ICC profile has been imparted to the print data to be input. And, it reads the intermediate film and creates the RGB bit map data of 256 tones on the RAM 33. Incidentally, if the print data itself is the RGB bit map data of 256 tones, the resolution is not converted and it creates the RGB bit map data of 256 tones as such on the RAM 33.

In step S125, the color data conversion processing to convert into color data corresponding to each color ink is carried out according to the color data conversion function P2. In other words, the color data before correction consisting of four kinds of CMYK is created from the RGB bit map data. This processing is carried out by converting the each of the bit map data of 256 tones of RGB into each of the color data of 256 tones of CMYK. Incidentally, this LUT is a table which permits the standard machine of the same kind as the printer 40 to reproduce the standard color, and hence the color data created in said step is the color data before correction by the tone value correction table. Therefore, in the case where this color data undergoes halftone processing and rasterize processing, the standard color may not be reproduced.

In step S130, the tone value correction function P3 carries out the tone value correction processing to convert the color data before correction into the color data to reproduce the prescribed standard color after correction, by reference with the tone value correction table which is the color matching information. Since the tone value correction table is created for each color ink of CMKY, it sequentially references each tone value correction table and converts sequentially only the color component corresponding to the tone value correction table. For example, if it is assumed that the color data is converted in the order of components of CMYK, it first references the tone value correction table for cyan and converts only the component of C among the color data before correction. The, it references the tone value correction table for magenta and converts the component of M among the color data before correction. It carries out the same processing for the components of Y and K. In other words, it is only necessary to carry out the conversion processing for individual components, and the processing time is saved.

As mentioned above, the processing in the steps S120–S130 converts the entered print data into the color data corresponding to a plurality of printing colorants such that the prescribed standard color is reproduced after conversion on the basis of the prescribed color matching information.

In step S135, the halftone processing function P4 carries out the halftone processing which represents the color data after correction in binary values. Then, the rasterize processing function P5 carries out the rasterize processing to rearrange the binary data (step S140) and created the print job, terminating this flow.

Then, the printer 40 acquires the print job and drives the printer head according to this print job and forms dots of each color ink, thereby accomplishing color printing. Thus, the color reproduced by the color ink matches with the standard color by the tone value correction function P3.

In the meantime, when the color chip print button on the print interface main screen is clicked, the flow proceeds from step S110 to step S145 and accomplishes the processing for preparation of the color data for monochrome printing.

Figure 11:
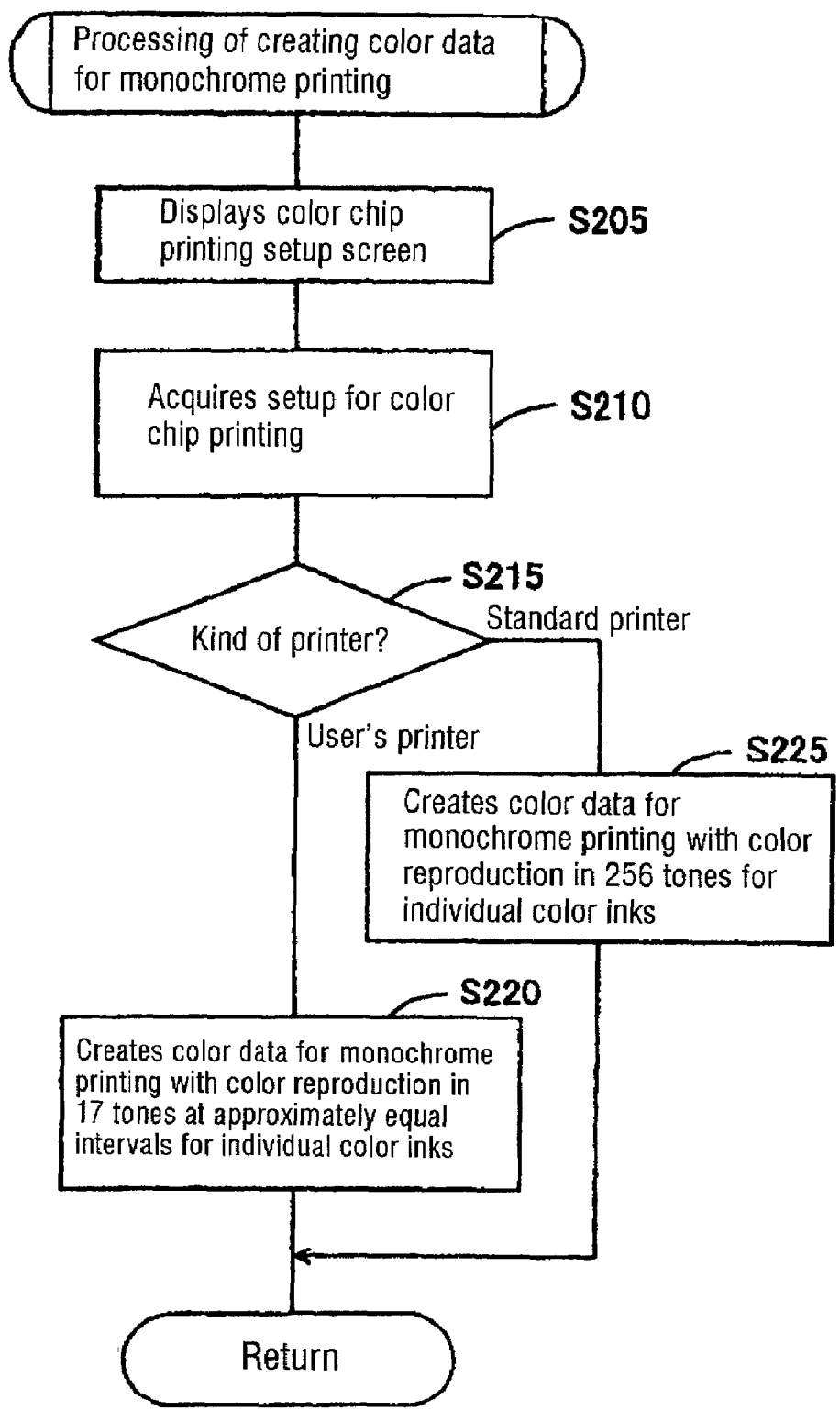
FIG. 11 is a flow chart showing the process for preparing the color data for monochrome printing.

FIG. 11 shows the flow chart of the processing in step S145 for preparation of the color data for monochrome printing. In step S205, the color chip printing setup screen (not shown) is displayed, and in step S210, the setup for prescribed items for color chip printing is acquired. And, in step S215, the flow branches depending on whether the printer setup is the standard printer used by the trader or the user printer used by the customer.

If the printer setup is the user printer, the color data for monochrome printing is created in step S220. This color data permits color reproduction in 17 tones at approximately equal intervals corresponding to the individual CMYK color inks. On the other hand, if the printer setup is the standard printer, the color data for monochrome printing is created in step S225. This color data permits color reproduction in 256 tones for individual color inks. After the completion of either step 220 or step 225, this flow terminates.

After that, in step S135 (in FIG. 10), the above-mentioned functions P4 and P5 convert the color data for monochrome printing into binary values and rearrange the binary values to create the print job, and this flow terminates. The construction of this flow is a mere example, as a matter of course. For example, it may be modified such that the processing in steps S135 and S140 is reserved as a subroutine and this subroutine is called and executed when the color data after correction is created by step S130 and the same subroutine is also called and executed when the color data for monochrome printing is created in step S145.

Then, the printer 40 acquires the print job based on the color data for monochrome printing, and this print job drives the printer head to form dots of each color ink, thereby printing color chips as shown in FIG. 8. The example in FIG. 8 is applicable to color chips (image for colorimetry) with 17 tones to be printed by the user printer; if color chips for lightness data measurement are printed with standard color by the standard printer, color chips with 256 tones are obtained.

As mentioned above, the processing in steps S145, S135–S140 constitute the colorimetry image print control means U11 and U21 to control printing the images for colorimetry having a plurality of tones for a plurality of printing colorants. As the results, color chips with a plurality of tones for individual CMYK color inks are printed, and hence the number of color to be metered is saved. In addition, in the case where the color chips are printed with the user printer, the number of tones in the color chips printed is less than the number of tones in the color data, and this saves the work for colorimetry. Since the tone values of the color data for monochrome printing which is used to print color chips are arranged at approximately equal intervals, there is no variation in tone change in color chips, and this saves errors due to interpolation operation at the time of preparation of the tone value correction table.

Figure 12:
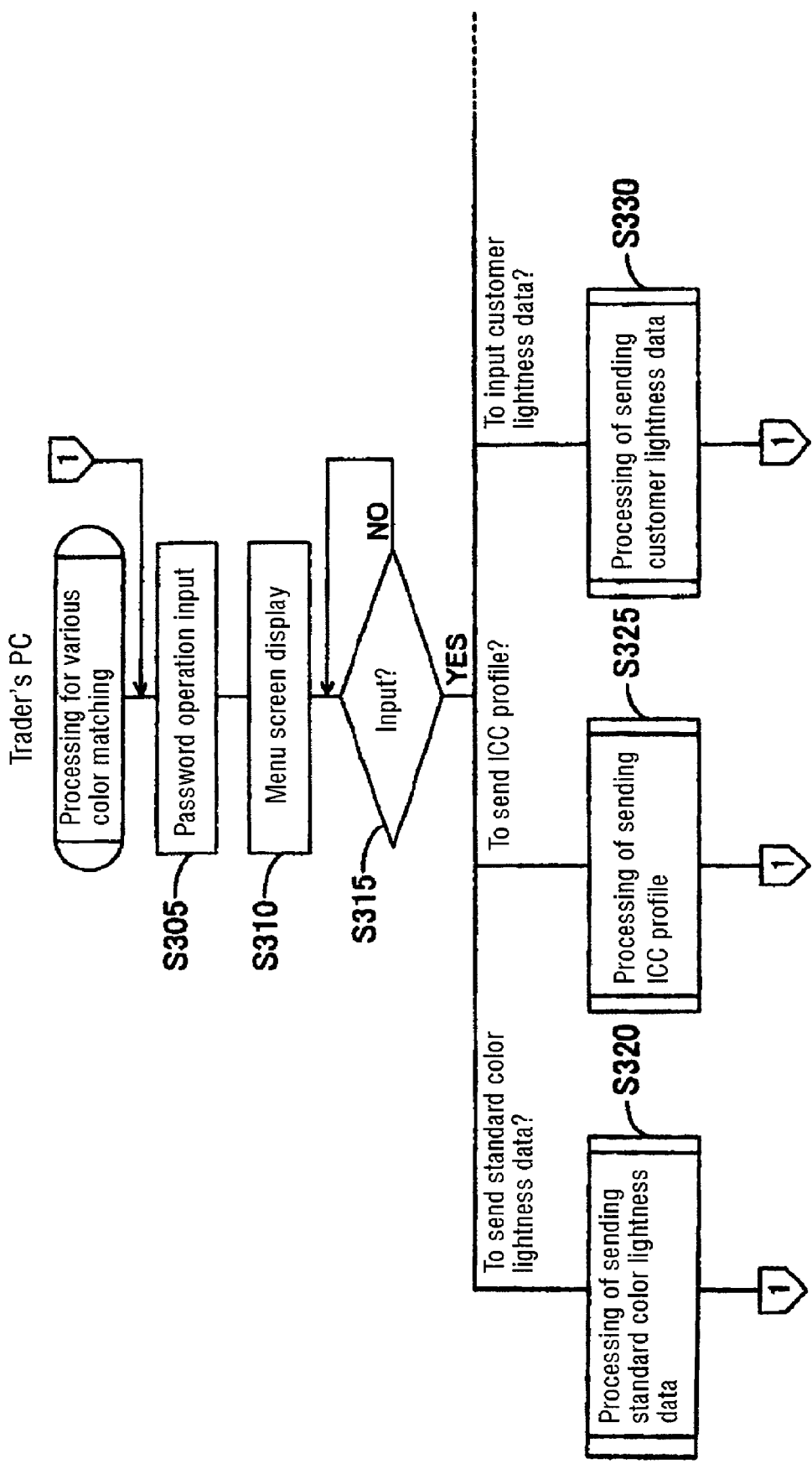
FIG. 12 is a flow chart showing the outline of the color matching processes to be performed by the trader's PC.
Figure 13:
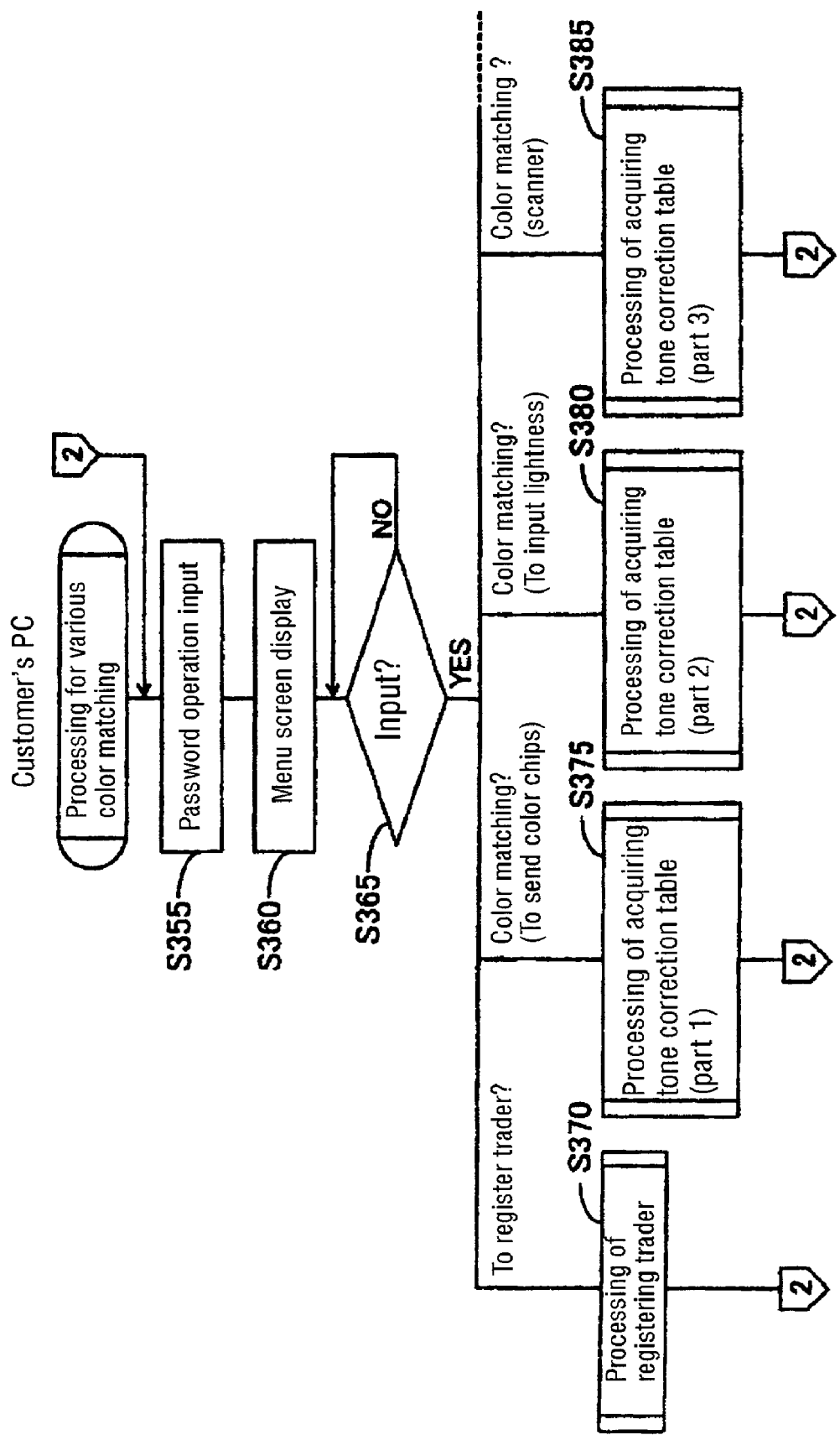
FIG. 13 is a flow chart showing the outline of the color matching processes to be performed by the customer's PC.

FIGS. 12 and 13 are flow charts showing the various color matching processing which is carried out in step S120. This flow is carried out upon calling from the printer driver. However, it can also be executed by direct calling from APL. Incidentally, when the user name is entered by the login screen which is displayed by the flow (not shown), PC 30 and PC 60 access the server 20 and carry out various color matching processing for the trader shown in FIG. 12 if the user name is the user name of the trader possessing the standard printer and carry out various color matching processing for the customers in FIG. 13 if the user name is the user name of the customer.

PC 60 used by the trader receives the access input of password in step S305 shown in FIG. 12. PC 60 sends the received password to the sever 20. If the password agrees with the user name, the server 20 outputs the data for display of the prescribed menu screen to said PC 60. In other words, unless the password agrees with the user name, the flow does not proceed to step S310 but receives the access input of password repeatedly.

When the data for menu screen display is output from the server 20, PC 60 gets said data and displays it on the menu screen (not shown) in step S310. The menu screen has "standard color lightness data send" button, "ICC profile send" button, "customer lightness data input" button, and "end" button. And, a judgment is made on whether or not the selection input to the button has been made by the mouse operation (step S315), and step S315 is repeated until the selection input is performed. And, the processing branches according to the kind of the button selected.

If the "standard color lightness data send" button is clicked, it receives the input of the lightness data of color chips of standard color to be printed by the standard printer possessed by the trader and executes the standard color lightness data send processing to be stored in the server 20 (step S320), and it returns to step S3109 and displays the menu screen again. If the "ICC profile send" button is clicked, it performs the ICC profile send processing to store the ICC profile for the standard printer in the server 20 (step S325) and returns to step S310. If the "customer lightness data input" button is clicked, it performs the customer lightness data send processing to receive the input of the lightness data of color chips sent from the customer and sends it to the server 20 (step S330), and returns to step S310. If the "end" button is clicked, this flow terminates by the flow (not shown).

Incidentally, the details of steps S320–S330 will be described in more detail later.

On the other hand, PC 30 which the customer uses also receives the access input of the password in step S355 in FIG. 13. And, if the password agrees with the user name, it gets the data for the prescribed menu screen display from the server 20 and displays the menu screen (not shown) (step S360). The menu screen has "trader register" button, "color matching (color chip send)" button, "color matching (lightness input)" button, "color matching (scanner)" button, and "end" button. And, a judgment is made on whether or not the selection input for the button has been performed by mouse operation (step S365) and the processing branches according to the kind of the button selected.

If the "trader register" button is clicked, it performs the trader register processing to select and register the trader possessing the standard printer (step S370) and returns to step S360 to display the menu screen again. If the "color matching (color chip send)" button is clicked, it performs the tone value correction table acquisition process (part 1) to acquire from the server 20 the tone value correction table created based on the color chips sent to the trader (step S375) and returns to step S360. If the "color matching (lightness input)" button is clicked, it receives the input of the lightness data of color chips and performs the tone value correction table acquisition process (part 2) to acquire from the server 20 the tone value correction table created based on said lightness data (step S380) and returns to step S360. If the "color matching (scanner)" button is clicked, it reads the image data of the color chip from the scanner and performs the tone value correction table acquisition processing (part 3) to acquire from the server 20 the tone value correction table created based on said image data (step S385) and returns to step S360. If the "end" button is clicked, this flow terminates by the flow (not shown).

Incidentally, regarding the "color matching (color chip send)" button, "color matching (lightness input)" button, and "color matching (scanner)" button, it is possible to select and input in the case where the trader is selected in step S370, and in the case where the trader is not selected, the processing in steps S375–S385 is not performed.

In what follows, a detailed description is given for the action of the print control system PCS1 coping with the various mode of usage.

When this system PCS1 is used to perform color matching with the standard color, it is necessary that the trader should send to the server 20 the lightness data and ICC profile of the standard color and the customer should select and register the trader.

Figure 14:
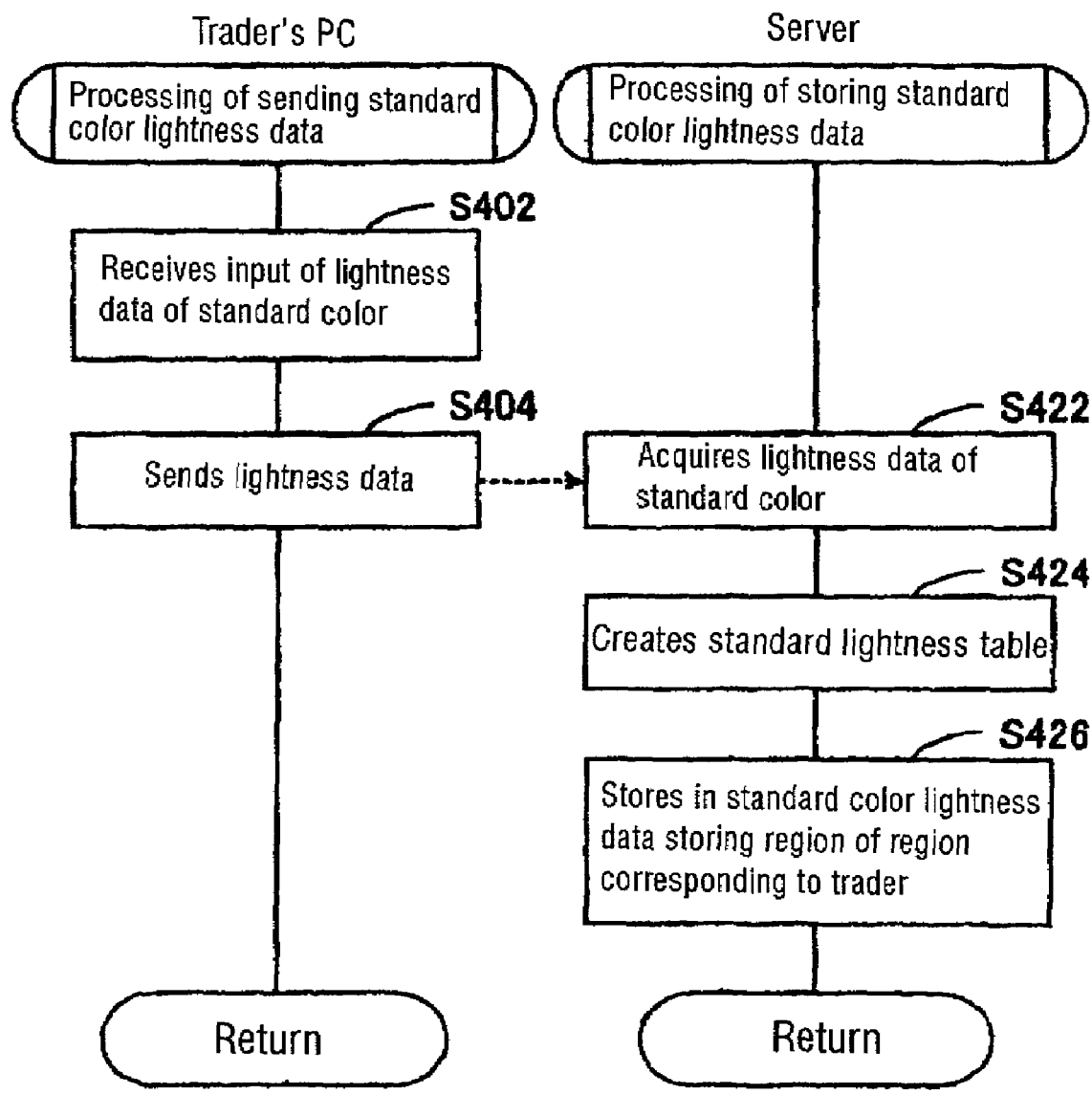
FIG. 14 is a flow chart showing the process of sending the standard color lightness data and the server's process of storing the standard color lightness data.

FIG. 14 shows the standard color lightness data send processing which is performed in said step S320 together with the standard color lightness data memory processing of the server 20. As the premise of this flow, it is assumed that the color chips of the standard color of 256 tones for individual color inks have been printed by the standard printer 70.

PC 60 of the trader receives the input of the lightness data of the standard color (step S402). Here, it receives the input of the lightness data of 256 tones for each ink; it is also possible to receive by operation input or to receive by automatically inputting the lightness data sent from the calorimeter. Then, it sends to the server 20 the lightness data of the standard color which has been received (step S404), and this flow terminates. In other words, the processing of steps S402–S404 constitutes the standard color lightness data sending means U23.

Incidentally, the work such as measuring the lightness data may be performed for the trader by the printer maker.

On the other hand, upon receipt of the lightness data of the standard color from PC 60 (step S422), the server 20 creates the standard lightness table T11 which stores the lightness data of the standard color for individual color inks and individual tone values as shown in FIG. 9 (step S424). And, because the user name entered in the login screen has been sent out from PC 60, it stores the standard lightness table T11 in the standard color lightness data storage region M1 of the region corresponding to the user name of the trader (step S426), and this flow terminates. In other words, the processing of steps S422–S426 constitutes the standard color lightness data storing means U1 to store the lightness data of the standard color entered from the client. At that time, it stores the lightness data entered from a plurality of the first clients individually for each of the first clients.

Figure 15:
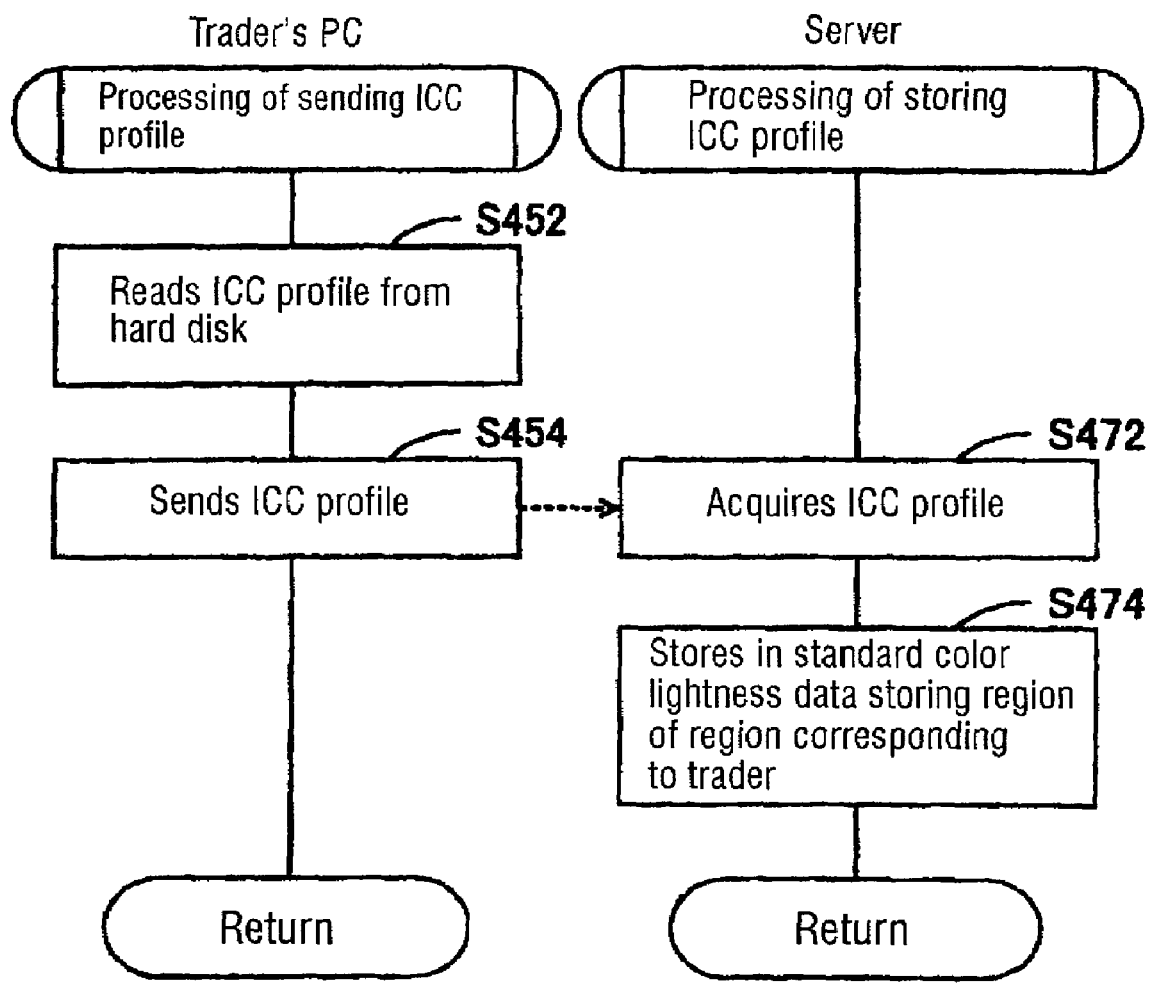
FIG. 15 is a flow chart showing the process of sending the ICC profile and the server's process of storing the ICC profile.

FIG. 15 shows the ICC profile sending process performed in said step S325 together with the ICC profile storage processing of the server 20. PC 60 of the trader reads the ICC profile from the hard disk 43a by the ICC profile sending means U24 (step S452) and sends this ICC profile to the server 20 (step S454), and this flow terminates.

On the other hand, the server 20 acquires the ICC profile from the PC 60 by the ICC profile storing means U7 (step S472) and stores the same ICC profile in the ICC profile storage region of the region corresponding to the user name of the trader (step S474), and this flow terminates.

Figure 16:
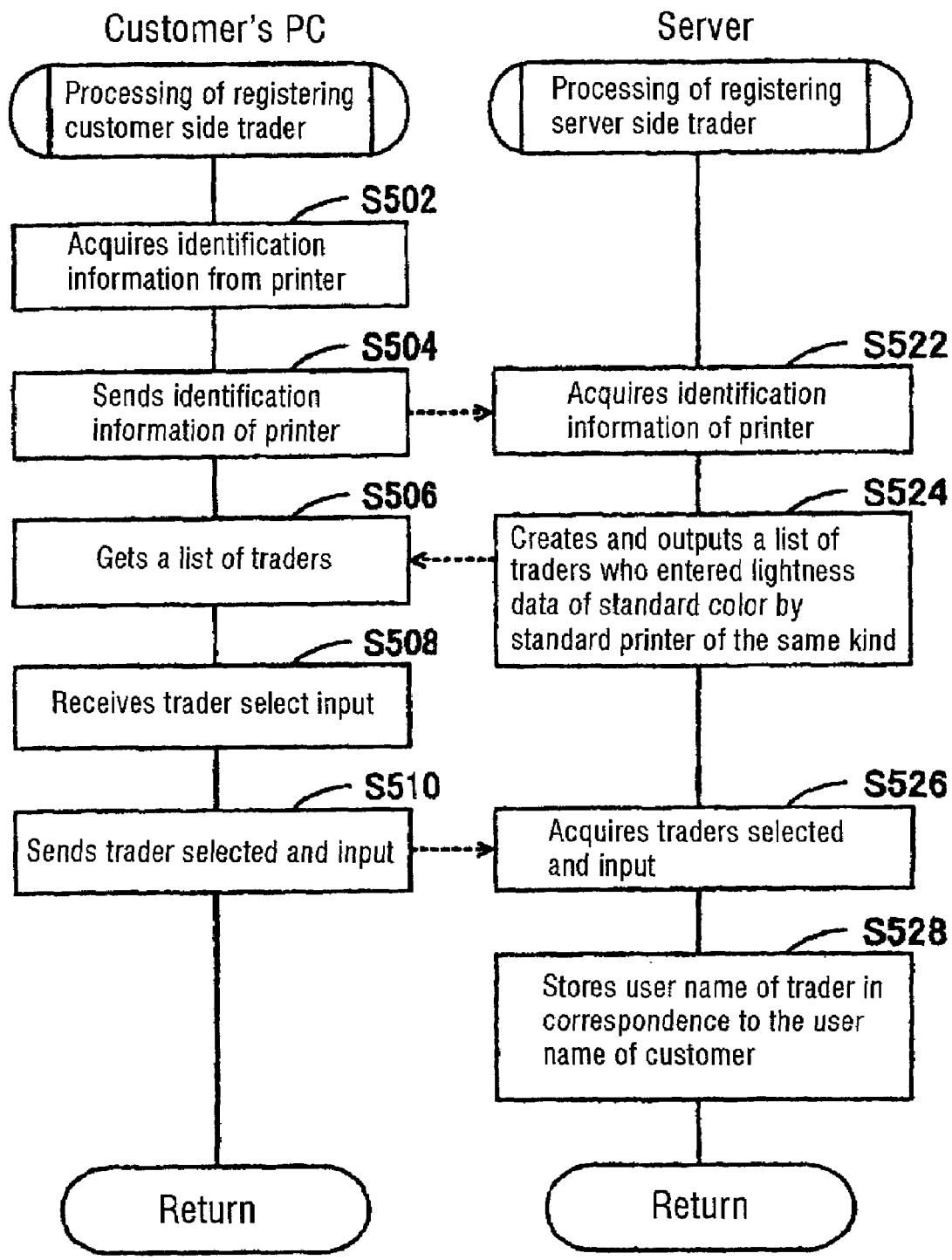
FIG. 16 is a flow chart showing the customer's process of registering the trader and the server's process of registering the trader.

FIG. 16 shows the customer-side trader register processing which is performed in said step S370, together with the server-side trader register processing of the server 20. First, PC 30 for the customer acquires the identification information from the printer 40 (step S502). That is, when it outputs to the printer 40 the demand to acquire the identification information from PC 30, then the printer 40 reads the identification information of the printer from ROM 42 and outputs it to PV 30; thus PC 30 can acquire the identification information of the printer. Then, it sends to the server 20 the identification information of the printer which has been acquired (step S504).

Upon receipt of the identification information of the printer (step S522), the server 20 acquires the list of the traders stored in the hard disk 24a and retrieves the standard color lightness data storing region M1 and creates a list of the traders in which are entered the lightness data of the standard color printed by the standard printer of the same kind and outputs it to PC 30 (step S524). In other words, the processing in step S524 constitutes the list output means U6 to create a list of the first clients in which is entered the lightness data of the standard color and output it to the second client. Incidentally, step S524 may acquire a list of the traders who use the combination of the printing colorants of the same kind and output it to PC 30.

PC 30 acquires this list of the traders (step S506) and receives the select input of the traders based on said list (step S508). Ant, it sends the select input trader to the server 20 (step S510), and this flow terminates. In other words, steps S506–S508 constitutes the select input receiving means U15 to select the specific first client based on the list output from the server, and step S510 constitutes the select result output means U16 to send to the server 20 the first client which has been selected and input. Upon receipt of the selected input trader (step S526), the server 20 stores the user name of the selected input trader in the registered trader memory region of the hard disk 24a corresponding to the user name of the customer which has been selected and input (step S528), and this flow terminates.

As soon as the customer has selected and registered the trader, it becomes possible to perform work for color matching with the standard color by various modes of use.

Figure 17:
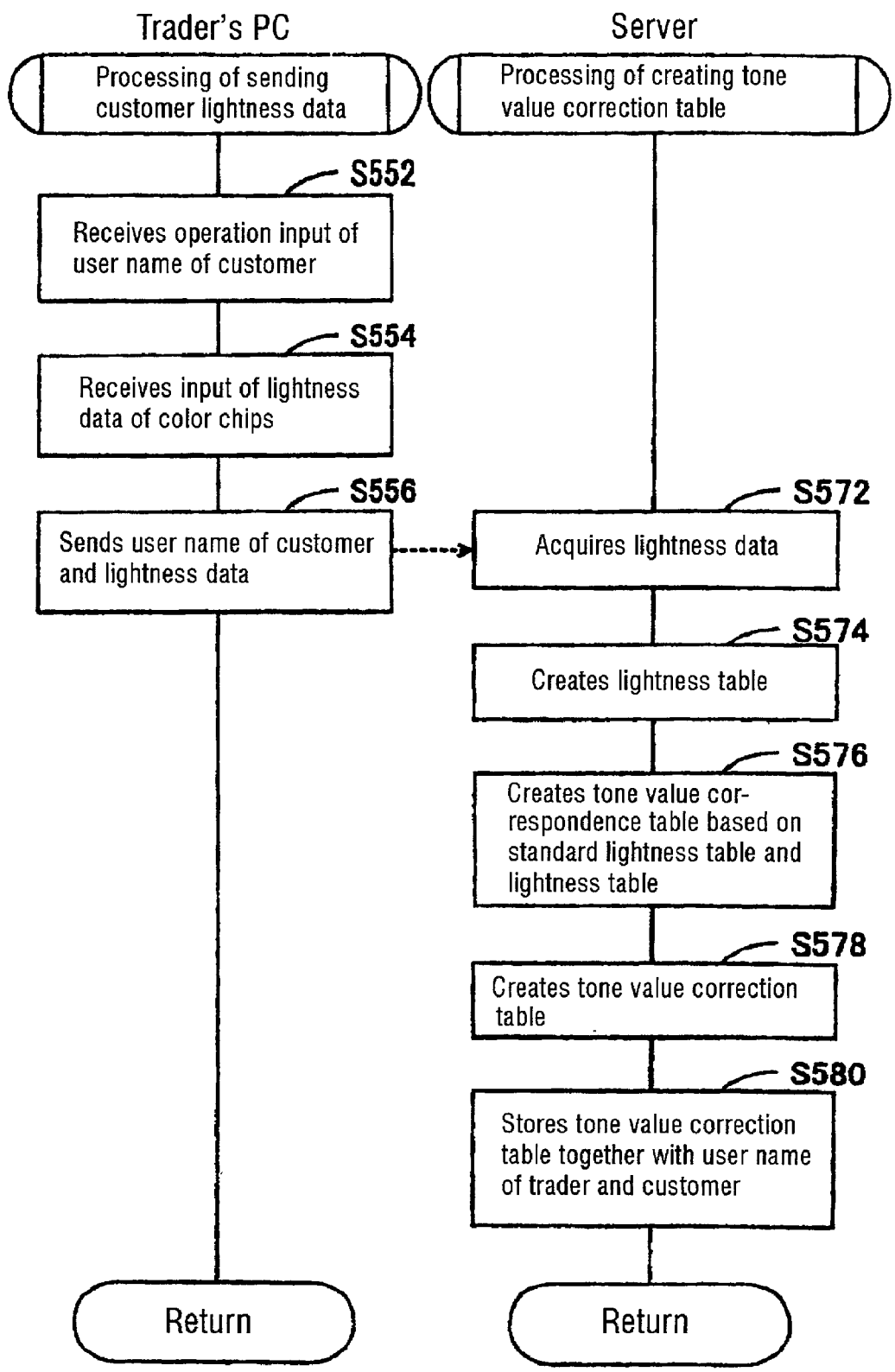
FIG. 17 is a flow chart showing the process of sending the customer's lightness data and the server's process of preparing the tone value correction table.

As an example of the modes of use, it is conceivable that the customer prints color chips for color matching from the printer and sends said color chips to the trader and makes him measure the lightness data and downloads the tone value correction table from the server 20. In this case, the trader to which the color chips for color matching have been sent selects and inputs the "customer lightness data input" button on the menu screen and measures the lightness data with a colorimeter and inputs to PC 60. FIG. 17 shows the customer lightness data send processing to be performed in said step S330, together with the tone value correction table preparation processing of the server 20.

PC 60 of the trader receives the operation input of the user name of the trader who has sent the color chips (step S552).

Then, it receives the input of the lightness data of the color chips which have been sent (step S554). Here, it receives the input of the lightness data of 17 tones for individual color inks; but it is possible to receive it by operation input or it is possible to receive it by inputting automatically the lightness data sent from the colorimeter. And, it sends to the server 20 the user name of the customer and the lightness data of color chips thus relieved (step S556), and this flow terminates.

On the other hand, the server 20 acquires the user name of the customer and the lightness data of color chips which have been sent out (step S572). In other words, processing of step S572 constitutes the lightness data acquisition means U2 to acquire the lightness data of the image for colorimetry for individual printing colorants to be printed by the client. Then, based on the lightness data acquired, as shown in FIG. 9, it creates the lightness table T12 which stores the lightness data for individual inks and for individual tone values (step S574). Moreover, it acquires the standard lightness table T11 for individual color inks corresponding to the user name of the trader from the standard color lightness data store region M1, and, as mentioned above, it creates the tone value correspondence table T13 for individual inks based on the standard lightness table T11 and the lightness table T12 (step S576). In other words, it stores the tone values of the lightness table T12 in the tone value correspondence table T13 and then it acquires from the standard lightness table T11 the tone value which becomes the lightness data corresponding to the tone value in the lightness table T12 or the tone values closest to the lightness data, and it stores it in the tone value correspondence table T13. And, it obtains by interpolation operation the corrected tone values corresponding to the tone value of the color data for which the printer 40 was not made to perform color reproduction, and it creates the tone value correction table which is color matching information as shown in FIG. 7 (step S578). After that, it stores the tone value correction table together with the user name of the trader and the user name of the customer in the hard disk 24a (step S580), and this flow terminates.

In other words, the processing in steps S572–S580 constitutes the color matching information preparation means U3 to create the color matching information based on the lightness data of the image for colorimetry of printing colorants and the lightness data of the standard color corresponding to said printing colorants.

In the flow shown in FIG. 17, the tone value correction table for individual customers is created and stored in the hard disk 24a of the server, and hence it is possible for the customer to reproduce the standard color with the printer 40 by downloading the tone value correction table from the server 20. At that time, the customer selects the "color matching (color chip send)" button on the menu screen to download the tone value correction table.

Figure 18:
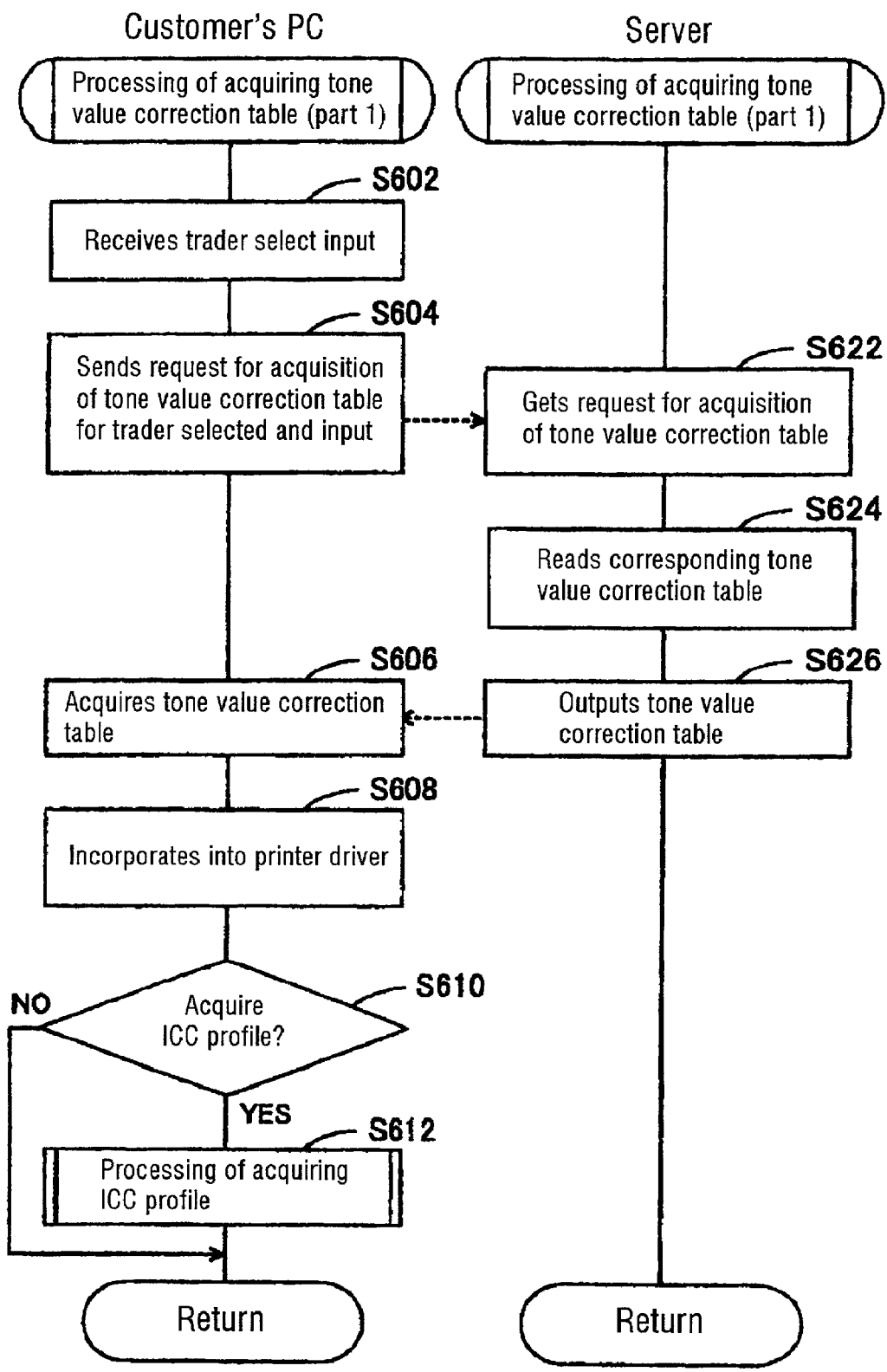
FIG. 18 is a flow chart showing the process (part 1) of acquiring the tone value correction table and the server's process (part 1) of sending the tone value correction table.

FIG. 18 shows the tone value correction table acquisition processing (part 1) which is performed in said step S375, together with the tone value correction table output processing (part 1) of the server 20. The flow shown in this figure performs the processing to acquire the tone value correction table to reproduce the standard color by the standard printer possessed by the trader registered in said step S370.

First, PC 30 in the customer acquires from the server 20 the list of the registered traders stored in said registered trader storing region (because there is an instance where there exists a plurality of registed traders), and then receives the selection and input of the trader based on this list (step S602). Then, it sends to the server 20 the trader which has been selected and input and the tone value correction table acquisition demand to request the output of the tone value correction table (step S604).

The server 20 acquires the tone value correction table acquisition demand (step S622) and then reads from the hard disk 24a the user name of the customer which has been sent at the time of login and the tone vale correction table corresponding to the user name of the trader which has been selected and input. This tone vale correction table is a table which has been created in said step S578. And, it outputs the tone value correction table which has been read to the corresponding customer's PC 30 (step S626), and this flow terminates.

PC 30 acquires the tone value correction table (step S606) and build it into the printer driver (step S608). After that, it displays on the display 37a asking for confirmation of the acquisition of the ICC profile for the standard printer; it receives the operation input with the mouse 36b and judges whether or not to acquire the ICC profile (step S610). If the ICC profile is to be acquired, it performs the ICC profile acquisition processing mentioned later (step S612), and this flow terminates. If the ICC profile is not acquired, this flow terminates without the processing of step S612.

In other words, the processing in steps S602–S608 constitutes the color matching information acquisition means U14 to acquire the color matching information from the server, and the processing in steps S622–S626 constitutes the color matching information output means U4 to output to the client the color matching information created by the color matching information preparation means U3. At that time, it specifies the lightness data of the standard color based on the first client selected and input which is sent from the second client and creates the color matching information corresponding to the second client, and it is output to said second client.

Then, when the ordinary print control processing is performed by said steps S120–S140, it is possible to reproduce the standard color by converting the color data based on the tone value correction table which is the color matching information.

Also, when the trader measures the color chips sent from the customer, it is only necessary to measure the lightness data of the color chips with a plurality of tones for individual color inks; and hence, unlike the conventional manner, it is not necessary to measure a large number of color chips in which a plurality of color inks are combined, nor is it necessary to measure plural items such as hue and saturation. Therefore, it is possible to alleviate work for color matching with the standard color. In addition, even though the customer is remote from the place where the standard printer is installed, it is possible to easily acquire the tone value correction table from the server. For this reason, the customer can perform renewing work without being troubled even in the case where the customer uses a printer which needs periodic renewal of the tone value correction table.

Also, as an example of other modes of use, it is conceivable that the customer prints color chips for color matching from the printer and measures the lightness data and inputs the lightness data to PC 30 and downloads the tone value correction table from the server 20.

Figure 19:
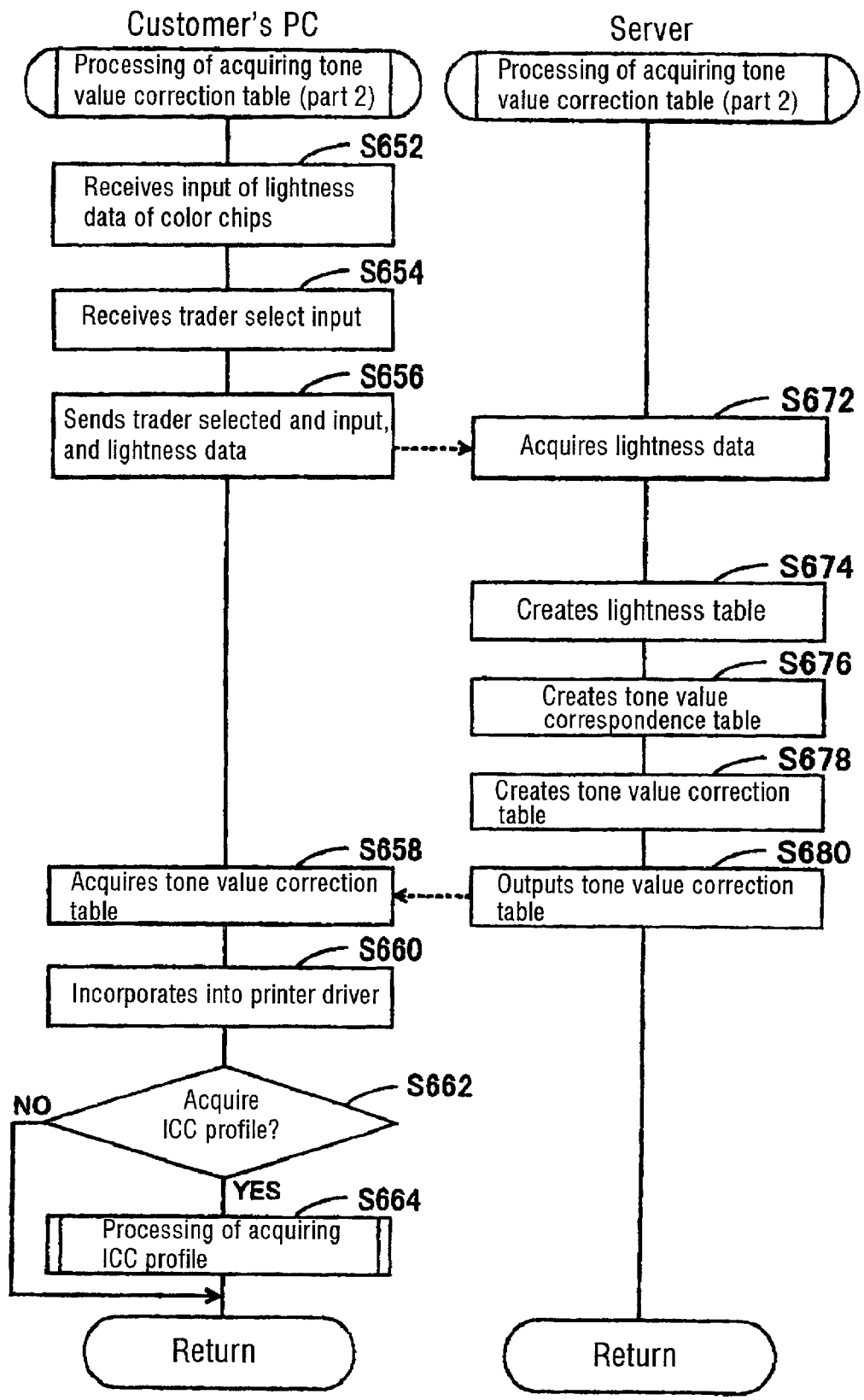
FIG. 19 is a flow chart showing the process (part 2) of acquiring the tone value correction table and the server's process (part 2) of sending the tone value correction table.

In this case, the customer selects and inputs the "color matching (lightness input)" button on the menu screen and measures the lightness data with a colorimeter and performs input operation for PC 30. FIG. 19 shows the tone value correction table acquisition processing (part 2) which is performed in said step S380, together with the tone value correction table output processing (part 2) of the server 20.

PC 30 receives the input of the lightness data of the printed color chips (step S652). Here, it receives the input of the lightness data of 17 tones for individual color inks; however, as explained in said step S554, it is permissible to receive by operation input or to receive by automatically inputting the lightness data sent from the calorimeter. Then, it acquires from the server 20 the list of the registered traders stored in said registered traders storing region and receives the selection and input of the trader (step S654). And, it sends to the server 20 the trader which has been selected and input and the lightness data of color chips (step S656). In other words, the processing in steps S652–S656 constitutes the lightness data sending means U12 to receive the input of the lightness data of the image for colorimetry and sends it to said server.

On the other hand, the server 20 acquires the trader which has been selected and input and the lightness data of color chips by the lightness data acquisition means U2 (step S672). Then, based on the acquired lightness data, it creates the lightness table T12 which stores the lightness data of color chips for individual color inks and for individual tone values (step S674). In addition, it acquires the standard lightness table T11 of individual color inks corresponding to the user name of the trader which has been selected and input from the standard lightness data storing region M1, and it creates the tone value correspondence table T13 for individual color inks based on the standard lightness table T11 and the lightness table T12 (step S676). And, it obtains by interpolation operation the corrected tone values corresponding to the tone value of the color data for which the printer 40 was not made to perform color reproduction, and it creates the tone value correction table (step S678). After that, it outputs the thus created tone value correction table to PC 30 of the corresponding customer (step S680), and this flow terminates.

In other words, the processing in steps S672–S688 constitutes the color matching information preparation means in other sense, and the processing in step S680 constitutes the color matching information output means in other sense.

PC 30 acquires the tone value correction table by the color matching information acquisition means U14 (step S658) and builds it into the printer driver (step S660). After that, as in steps S610–S612 mentioned above, it judges whether to acquire the ICC profile (step S662), and it performs the ICC acquisition processing (mentioned later) if it is to acquire the ICC profile (step S664), and this flow terminates.

Then, when the ordinary print control processing is performed, it is possible to reproduce the standard color by converting the color data based on the tone value correction table. At that time, when the customer measures the color chips, it is only necessary to measure the lightness data of the color chips with a plurality of tones for individual color inks; and hence, unlike the conventional manner, it is not necessary to measure for plural items a large number of color chips in which a plurality of color inks are combined. Therefore, it is possible to alleviate work for color matching with the standard color.

Also, as an example of other modes of use, it is conceivable that the customer prints color chips for color matching from the printer and takes the image data of the color chips using a color scanner and sends it to the server 20 and downloads the tone value correction table from the server 20. This mode is preferable.

Figure 20:
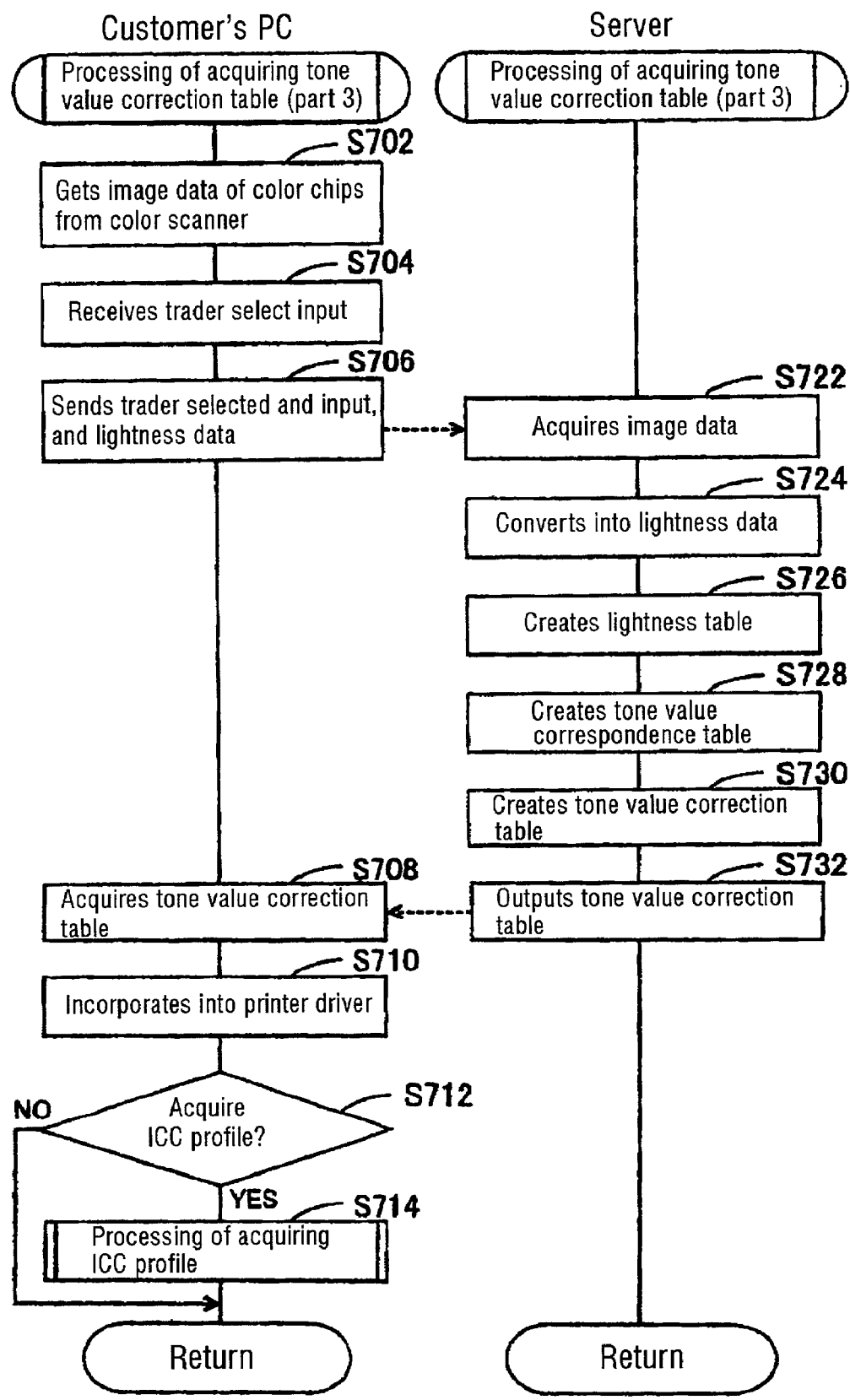
FIG. 20 is a flow chart showing the process (part 2) of acquiring the tone value correction table and the server's process (part 2) of sending the tone value correction table.

In this case, the customer selects and inputs the "color matching (scanner)" button on the menu screen and takes the image data of color chips by the color scanner 50. FIG. 20 shows the tone value correction table acquisition processing (part 3) which is performed in said step S385, together with the tone value correction table output processing (part 3) of the server 20.

PC 30 in the customer causes the color scanner 50 to acquire the image data of color chips and gets the image data from the color scanner 50 (step S702). Since the image data is usually multiple-tone data of RGB, it gets the RGB multiple-tone for individual tones. Subsequently, it gets from the server 20 the list of the registered traders which is stored in said registered trader storing region, and it receives the selection and input of the trader (step S704). And, it sends to the server 20 the trader which has been selected and input and the image data which has been obtained (step S706). In other words, the processing in steps S702–S706 constitutes the image data sending means U13 to acquire the image data from the image capturing device and send it to the server.

On the other hand, the server 20 acquires the trader which has been selected and input and the image data of the color chips (step S722). Then, it converts the image lightness data which has been acquired into the lightness data (step S724). Here, since the image data which has been acquired contains tone data for each of R, G, and B, it is only necessary to convert each tone data into the lightness data. For example, if each tone data of R, G, and B is represented by R, G, and B, respectively, then the lightness data L can be approximately calculated by the following formula (2).

$$L=0.30 \times R+0.59 \times G+0.11 \times B \tag{2}$$

Needless to say, it is also possible to obtain this lightness data by various methods. For example, the lightness data may be obtained by averaging or adding the values of tone data. Incidentally, in the case where the image data has discrete lightness data, it is possible to omit the processing for conversion into the lightness data.

In other words, the processing in steps S722–S724 constitutes the lightness data acquisition means in the sense that it acquires the lightness data of the image for colorimetry by converting the image data entered from the client into the lightness data.

Subsequently, based on the lightness data which has been converted, it creates the lightness table T12 which stores the lightness data for individual color inks and for individual tone values (step S726). After that, as in said steps S676–S680, it acquires the standard lightness table T11 and creates the tone value corresponding table T13 (step S728), creates the tone value correction table for individual color inks (step S730), and outputs the thus created tone value correction table to the corresponding customer's PC 30 (step S732), and this flow terminates.

PC 30 acquires the tone value correction table (step S708) and builds it into the printer driver (step S710). After that, as in said steps S610–S612, it judges whether or not it should acquire the ICC profile (step S712); in the case where it acquires the ICC profile, it performs the ICC profile acquisition processing (mentioned later), and this flow terminates.

As mentioned above, by using an image capturing device such as color scanner, it become unnecessary to measure the lightness data for each tone of color chips and work to measure the lightness data is alleviated. Needless to say, it is permissible to use a digital camera in place of color scanner or to use any device capable of capturing monochrome image data.

Figure 21:
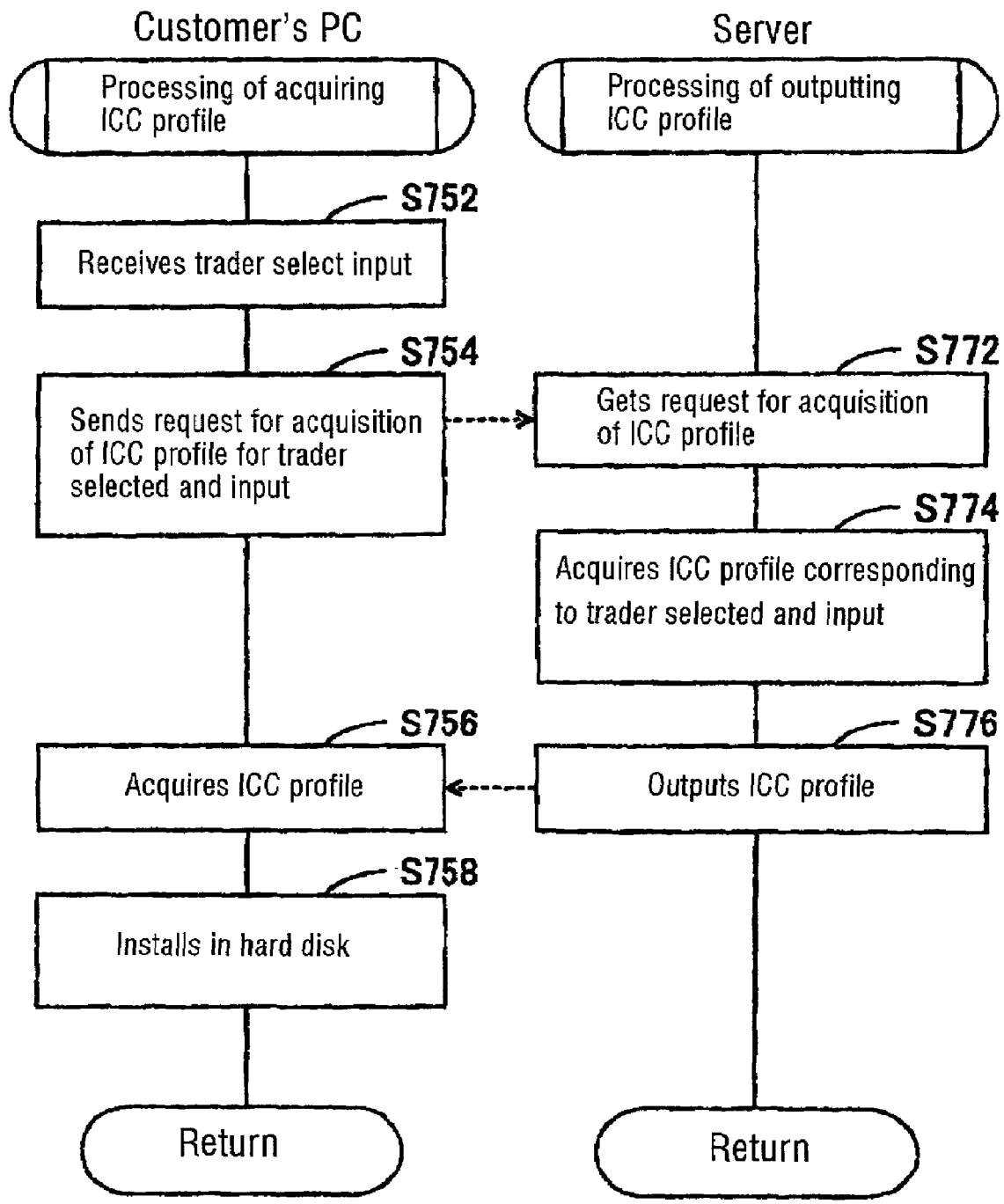
FIG. 21 is a flow chart showing the process of acquiring the ICC profile and the server's process of outputting the ICC profile.

Incidentally, by said steps S612, S664, and S714, the customer's PC 30 can download the ICC profile for the standard printer possessed by the selected trader and install it in the hard disk 34a. FIG. 21 shows said ICC profile acquisition processing, together with the ICC profile output processing of the server 20.

First, using the ICC profile acquisition means U17, PC 30 acquires from the server 20 the list of the registered traders stored in said registered traders storing region and receives the selection and input of the trader (step S752). Then, it sends to the server 20 the trader which has been selected and input and the ICC profile acquisition demand to request the output of the ICC profile (step S754).

Upon receipt of the ICC profile acquisition demand (step S772) by the use of the ICC profile output means U8, the server 20 reads from the ICC profile memory region the ICC profile corresponding to the user name of the trader which has been selected and input (step S774). And, it outputs the ICC profile which has been read to the corresponding customer's PC 30 (step S776), and this flow terminates.

PC 30 acquires said ICC profile (step S756) and installs it in the hard disk 34a (step S756), and this flow terminates.

Thus, when the ordinary print control processing is performed by said steps S120–S140, it is possible to reproduce the standard color by imparting the ICC profile to the print data and converting the print data into color data based on the LUT and the tone vale correction table.

In this way, the print control system can be used in various modes, so that it alleviates work to match the color reproduced by the printer with the standard color printed by the standard printer. In other words, it is only necessary to measure the lightness data of color chips with a plurality of tones printed for individual color inks and to do work to input from the server the tone value correction table through the internet. Therefore, it is not necessary to measure a large number of color images in which a plurality of color inks are combined, nor is it necessary to measure several items such as hue and saturation. Also, even though the customer is remote from the place where the standard printer is installed, it is possible to easily acquire the tone value correction table through the internet. Moreover, it is possible to match reproduced colors among clients and it is possible to acquire the ICC profile for the standard printer through the communication means; therefore, it is highly convenient.

Figure 22:
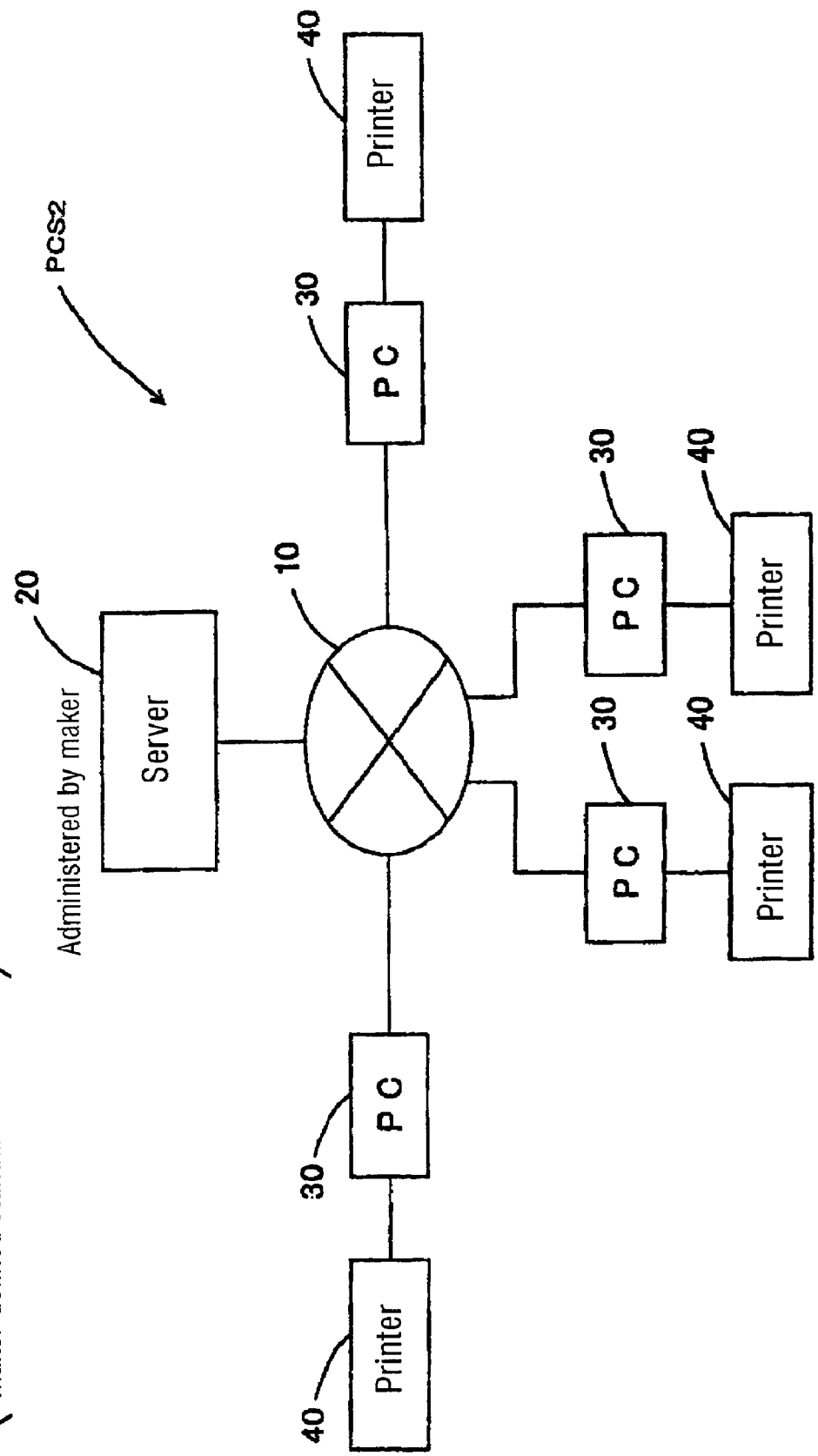
FIG. 22 is a diagram showing the outline of the print control system pertaining to the first modified embodiment of the present invention.
Figure 23:
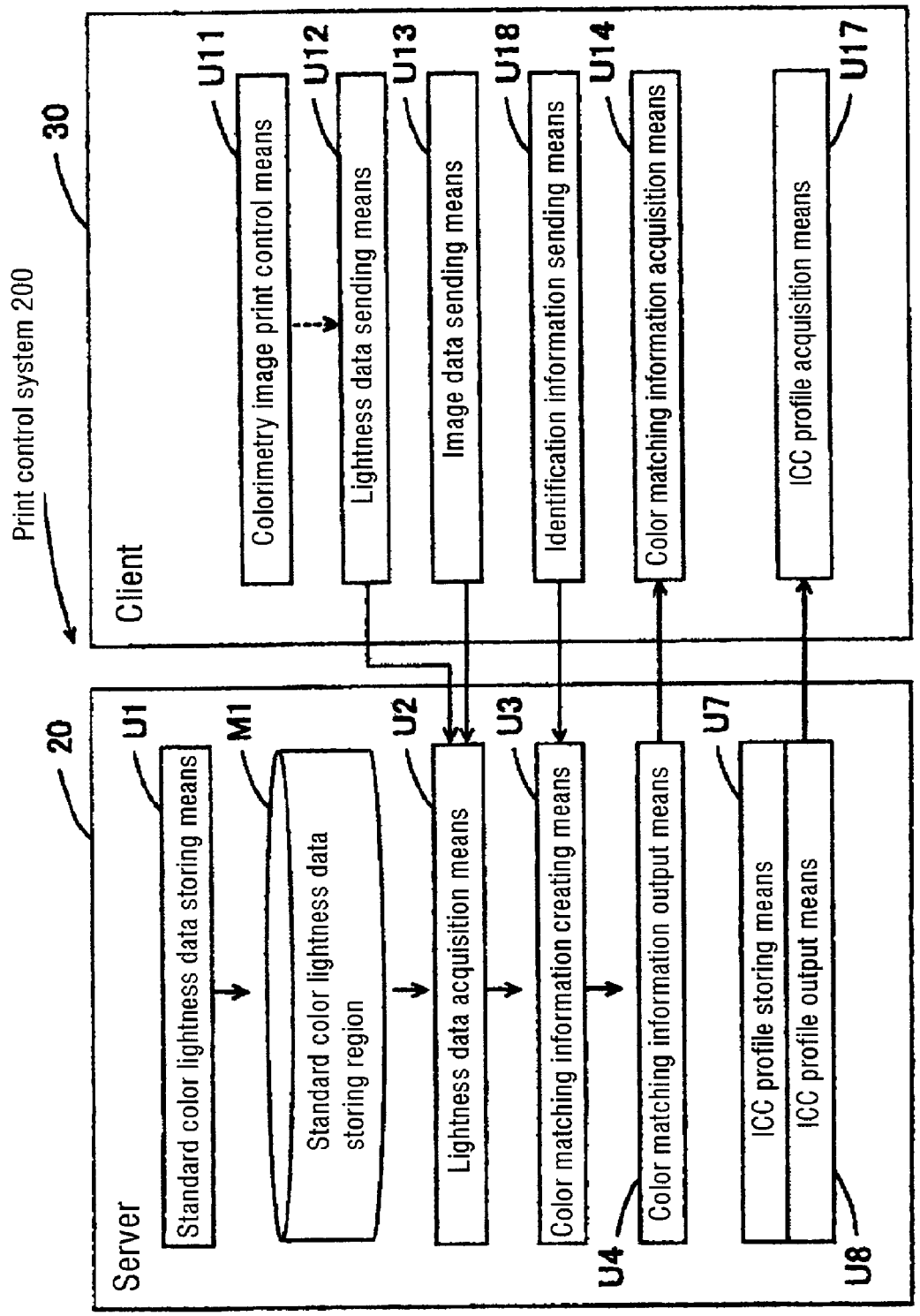
FIG. 23 is a block diagram showing the outline the major means constituting the print control system.

(4) First Modified Example:

Incidentally, the print control system of the present invention may be constructed in various ways. FIG. 22 schematically shows the print control system PCS2 pertaining to the first modified example of the present invention. FIG. 23 is a schematic block diagram showing the main means constituting the print control system PCS2. The same components as in FIGS. 1 and 5 are given the same symbols.

This system PCS2 performs color matching with the standard color defined by the administrator of the server of the printer maker or the like. Therefore, it is not provided with PC for the trader, and it is constructed such that the server 20 stores the lightness data of the standard color for several kinds of printers and automatically creates the tone value correction table in compliance with the request from the PC 30 (as the client) and outputs it. In other words, it is not necessary for the user to register the trader, and hence this system PCS2 is suitable to reproduce the standard color using may printers at one time.

Since it is not provide with PC for the trader, it is not provided with the means to store the trader, the means to output the list, the means to receive select input, and the means to output select result. And, the lightness data acquisition means U2 is able to acquire the lightness data of color chips and the image data sent out from PC 30, and it is also able to receive input of the lightness data of color chips directly from the administrator of the server 20 and to acquire the lightness data. Also, since the standard color lightness data storing means U1 receives input for individual printers directly from the administrator of the server 20, it stores the lightness data of the standard color in the standard color lightness data storing region M1, and since the ICC profile storing means U7 receives input for individual printers directly from said administrator, it stores the ICC profile in the ICC profile storing region. Needless to say, it may be constructed such that a client is set up through the internet 10 so that the administrator of the server 20 inputs the lightness data of color chips into the server, and this client receives input of the lightness data of color chips, and the entered lightness data is sent to the server.

Here, the processing of the printer driver which is performed by PC 30 is carried out by the flow shown in FIG. 10. The processing for various color matching can be performed by the flow shown in FIG. 13, except for the trader registration processing (step S367). However, since the users of this system PCS2 use printers of various kinds, it is necessary to identify them when the tone value correction table is created. So, PC 30 has the identification information sending means U18, so that it is possible to send to the server 20 the printer identification information. And, the color matching information preparing means U3 creates the tone value correction table in correspondence to this identification information.

Figure 24:
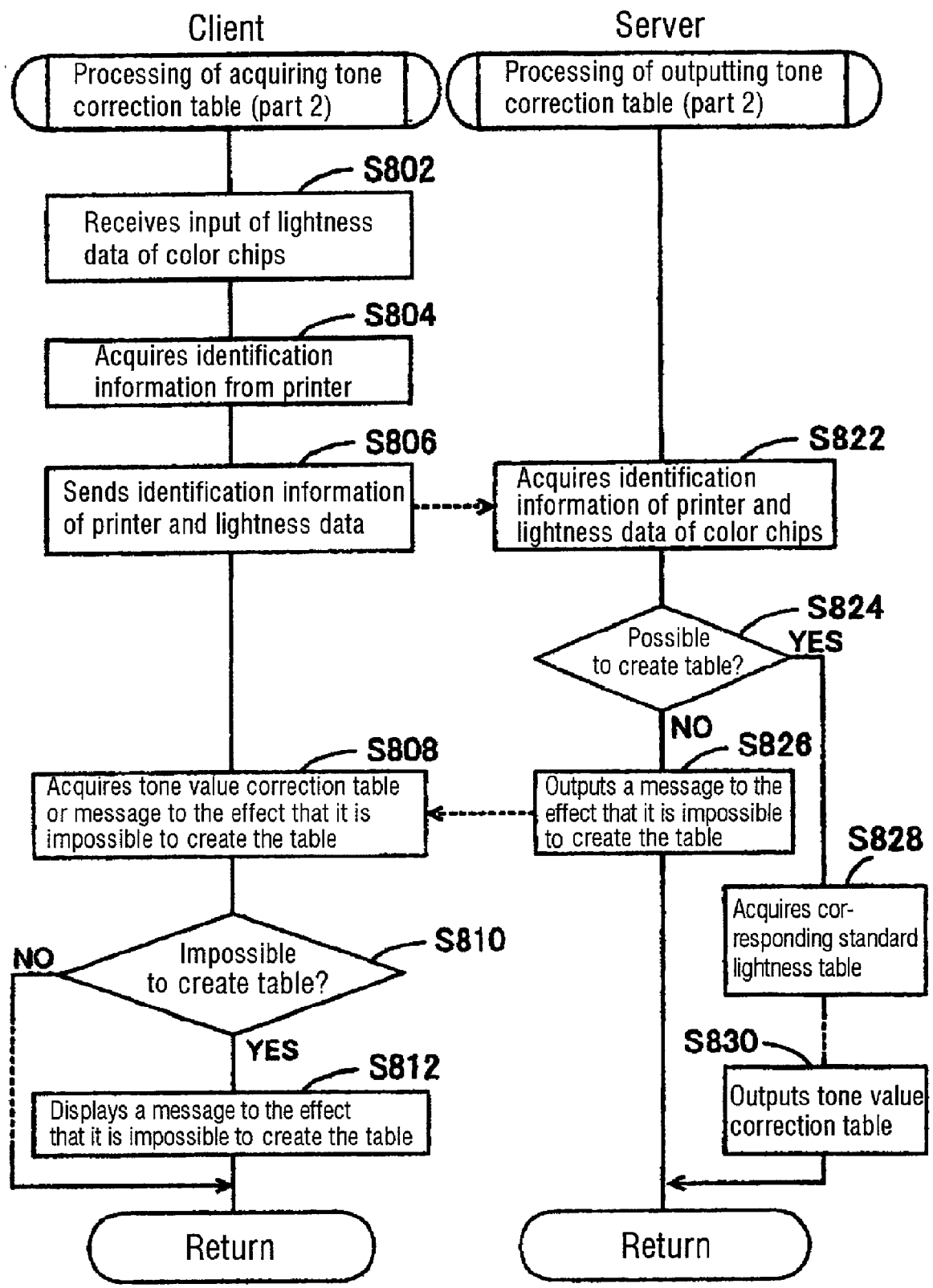
FIG. 24 is flow chart showing the process (part 2) of acquiring the tone value correction table and the server's process (part 2) of sending the tone value correction table, in the first modified embodiment.

FIG. 24 shows the tone value correction table acquisition processing (part 2) which is performed in step S380 in FIG. 13, together with the tone vale correction table output processing (part 2) of the server 20.

First, PC 30 receives the input of lightness data of color chips printed (step S802). Then it receives the identification information from the printer 40 (step S804). In other words, when the request for acquisition of the printer identification information is sent from PC 30 to the printer 40, printer 40 reads the printer identification information from ROM 42 and sends it to PC 30, and PC 30 acquires the printer identification information. Then, it sends to the server 20 the thus acquired printer identification information and the thus entered lightness data (step S806). In other words, the processing of steps S804 to S806 constitutes the identification information sending means U18 to acquire the identification information for the printer which reproduces colors with printing colorants and send it to the server.

Upon receipt of the printer identification information and the lightness data of color chips (step S822), the server 20 judges whether or not it is possible to create the tone value correction table based on the identification information (step S824). For example, it acquires the kind of the printer by referencing the kind corresponding table (not shown) which makes the printer identification information correspond to the kind of the printer, and it sees if the acquired lightness data of the standard color corresponding to the kind of the printer is stored in the standard color lightness data storing region M1. In the case where the lightness data of the standard color corresponding to the same kind of printer is not stored for the reason that the printer is obsolete, it creates the message to the effect that it is impossible to create the tone value correction table and outputs it to PC 30 (step S826), and this flow terminates.

On the other hand, in the case where it is judged that it is possible to create the tone value correction table in step S824, it acquires the standard lightness table T11 corresponding to the kind of the printer acquired from the standard color lightness data storing region M1 (step S828). After that, it creates the lightness table T12 based on the lightness data of color chips acquired (not shown) and creates the tone value correspondence table T13, and then it creates the tone value correction table for individual color inks and outputs it to PC 30 of the corresponding customer (step S830), and this flow terminates.

In other words, the processing for steps S822–S830 constitutes the color matching information preparing means in the sense that the color matching information is created based on the lightness data of the standard color corresponding to the identification information entered from the client.

PC 30 receives a message to the effect that it is impossible to create the tone value correction table to be created in step S826 and acquires the tone value correction table which is output from step S830 (step S808). It judges whether or not it has acquired the message to the effect that it is impossible to create the tone value correction table (step S810) and, if the condition is met, it displays the message to the effect that it is impossible to create the tone value correction table (step S812), and this flow terminates. On the other hand, if the condition is not met in step S810, it acquires said tone value correction table, as in said steps S658–S660, and builds it into the printer driver, and this flow terminates.

It is only necessary for this system PCS2 to measure the lightness data of color chips with several color tones printed for individual color inks and to perform work to get the tone value correction table through the internet from the server. This alleviates work to match the color reproduced by the printer with the standard color, and it is possible to get the tone value correction table in a simple manner. In addition, unlike the first embodiment, it is not necessary for the user to register the trader; therefore, this system PCS2 is suitable to reproduction of the standard color by a number of printers.

(5) Second Modified Example:

Incidentally, the first and second modified examples use the tone value correction table as the color matching information; however, it is permissible to use a mathematical formula in place of the tone value correction table. In this case, for example, it is possible to create the standard lightness table corresponding to the standard printer shown in FIG. 9, create the lightness data corresponding to the user printer, and create the mathematical formula corresponding to tone values for individual color inks in place the tone value correction table by multivariate analysis such as regression analysis. And, the mathematical formula for individual color inks thus created is downloaded and built into the printer driver of PC 30; in this way it is possible to correct the color data by reference to the mathematical formula.

Figure 25:
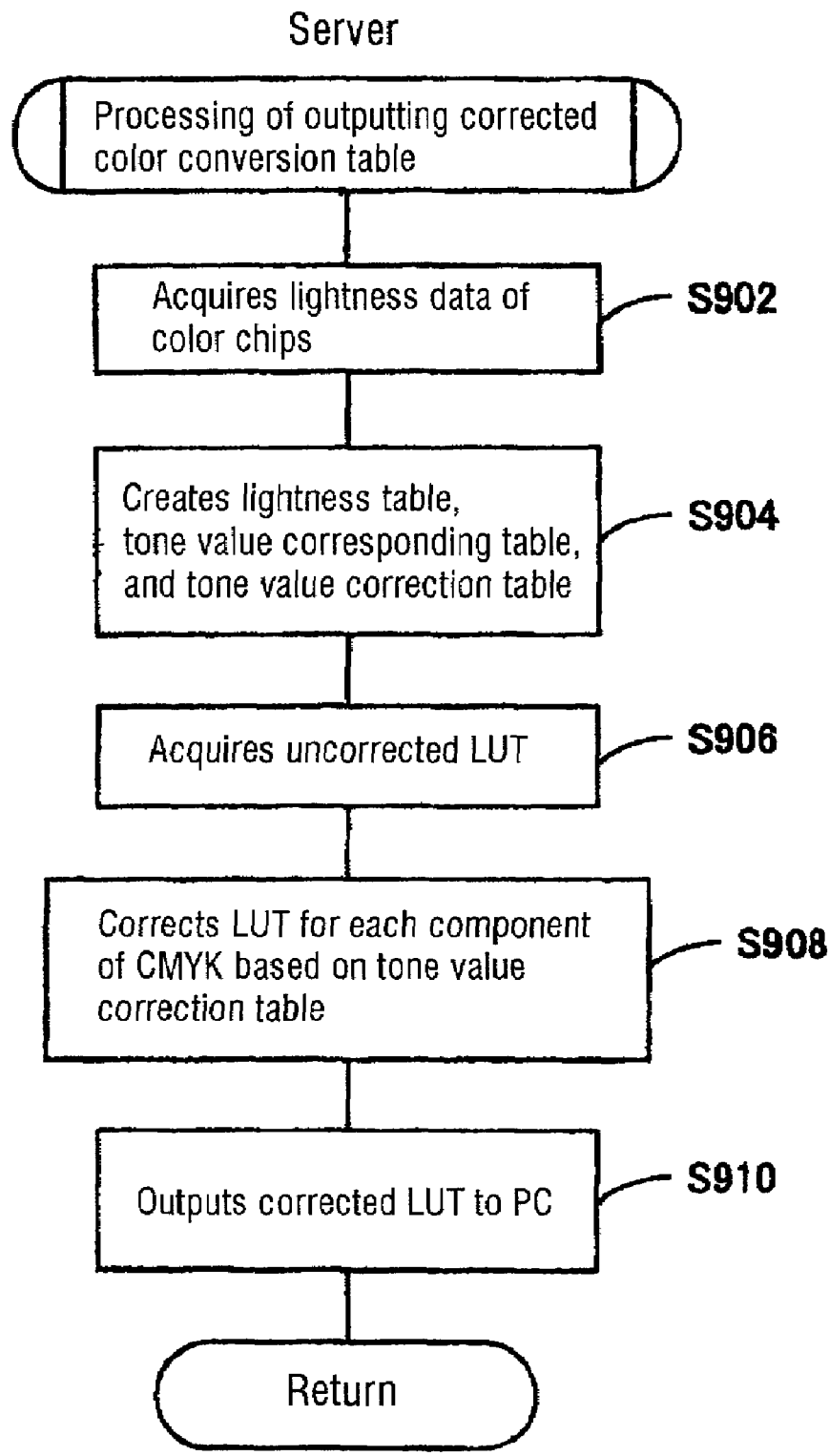
FIG. 25 is a flow chart showing the server's process of outputting the corrected color conversion table in the second modified embodiment.

Also, it is also permissible to correct the LUT itself used in step S125 in FIG. 10 and use the corrected LUT as the color matching information. FIG. 25 shows an example of the corrected color conversion table output processing to correct the LUT and outputs it. Incidentally, this flow replaces the tone value correction table output processing (part 2) shown in FIG. 19 which is performed by the server 20.

First, the server 20 acquires the lightness data of color chips from PC 30 by the lightness data acquisition means U2 (step S902). Then, as in said steps S674–S678, based on the acquired lightness data, it creates the lightness table T12 in which is stored the lightness data of color chips for individual color inks and for individual tone values, acquires the corresponding standard lightness table T11, and creates the tone value correspondence table T13 for individual color inks based on this standard lightness table T11 and the lightness table T12 (step S904). Moreover, it acquires the LUT for the kind of the printer corresponding to the printer 40 which the customer uses from the prescribed color conversion table storing region allocated in the hard disk 24a (step S906).

And, based on the tone value correction table for individual color inks, it corrects the LUT for each component of CMYK in the LUT (step S908). For example, it is assumed that the LUT is corrected sequentially in the order of CMYK components, then it first references the tone value correction table for cyan and converts only the C component in the uncorrected LUT. Then, it references the tone value correction table for magenta and converts only the M component in the uncorrected LUT. The same processing as above is performed also on the Y and K components. Since the tone value correction table is a table which makes the tone value of the color data to be converted by the uncorrected LUT correspond to the tone value of the reproduced color to be matched with the standard color, the corrected LUT becomes a table which matches the print data with the color data which is converted from the said print data and reproduced such that it is matched with the standard color with the color ink. And, this corrected LUT becomes the color matching information.

Incidentally, when the LUT is corrected in step S908, it is permissible to perform correction based on the tone value correspondence table in place of the tone value correction table.

Subsequently, it outputs the thus created and corrected LUT to PC 30 of the corresponding customer (step S910), and this flow terminates. PC 30 builds the corrected LUT into the printer driver according to the flow (not shown). Then, in conversion of print data into color data, it can create the color data corresponding to individual color inks for matching with the standard color by referencing the LUT. In other words, it is possible to offer the color conversion table in the form of the color conversion table in which the corresponding relation between input and output is corrected. And, by using the corrected color conversion table, conversion from printed data into color data can be accomplished at a time.

(6) Third Modified Example

Figure 26:
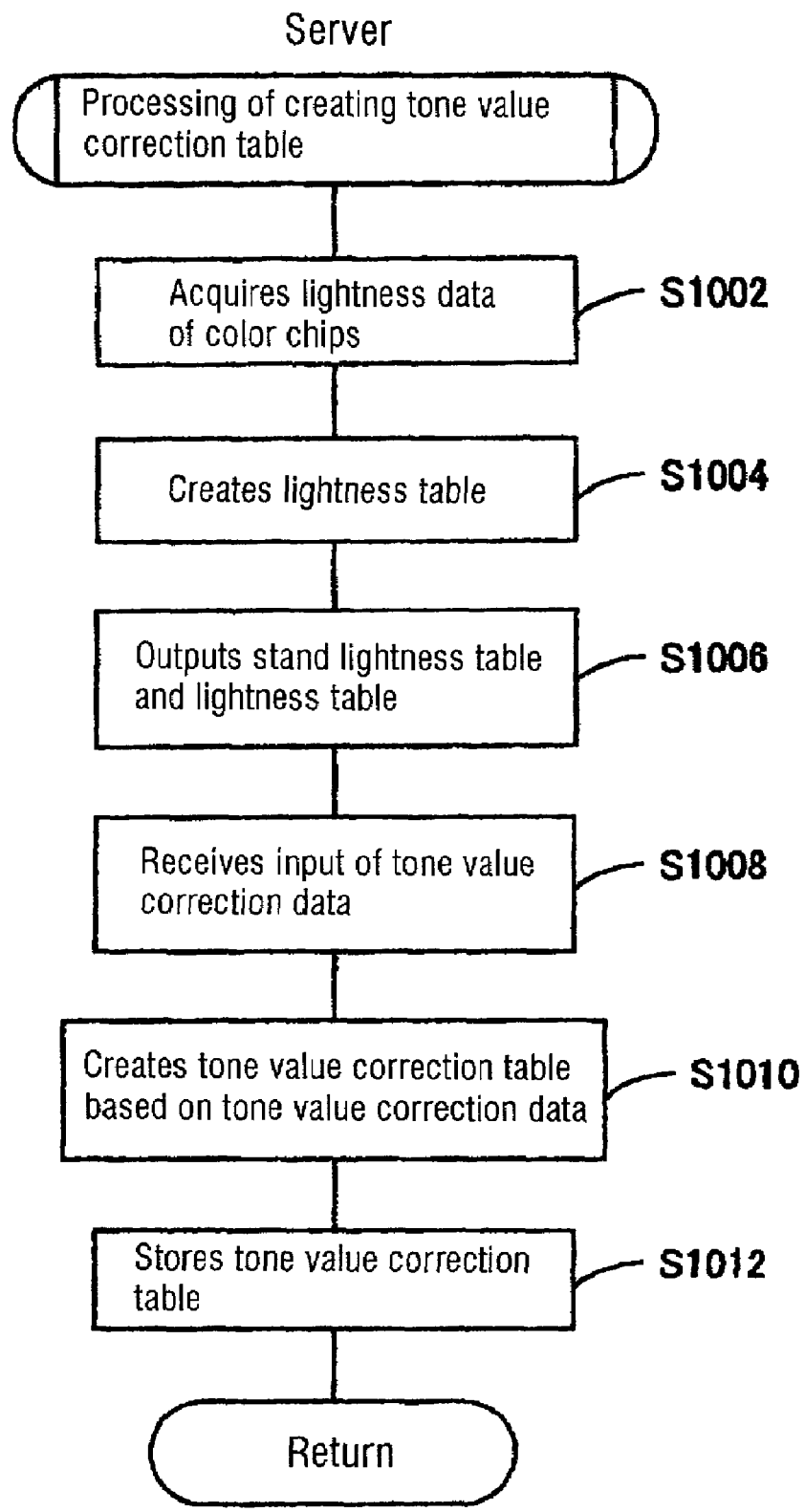
FIG. 26 a flow chart showing the server's process of preparing the tone value correcting table in the modified embodiment.

In the meantime, when the color matching information, such as tone value correction table, is created by the color matching information preparing means U3 in server 20, it is permissible to output the lightness data of the standard color and the lightness data of the color images for colorimetry printed by the user printer to the prescribed display or printing device, thereby receiving the input of color matching data and preparing the color matching information. FIG. 26 shows an example of the processing. Incidentally, this flow is carried out in place of the tone value correction table preparing means in FIG. 17 which is carried out by the server 20.

First, the server 20 acquires the lightness data of color chips by the lightness data acquisition means U2 (step S1002). Then, based on the acquired lightness data, it creates the lightness table T12 for individual color inks as shown in FIG. 9 (step S1004). Then, it acquires the standard lightness table T11 for corresponding individual color inks from the standard lightness data storing region M1, and it outputs the standard lightness table T11 and the lightness table T12 to the display or the like (step S1006). And, it receives the input of the tone value correction data which is the corrected tone value data corresponding to the uncorrected tone value (step S1008). This tone value correction data may be the corrected tone value data to be stored in the tone value corresponding table T13 or the corrected tone value data to be stored in the tone value correction table. For example, in the case where it inputs the corrected tone value data to be stored in the tone value corresponding table T13, it follows that the one who inputs the same data inputs the tone value data of 17 tones for individual color inks.

After that, based on the entered tone value correction data, it creates the tone value correction table as shown in FIG. 7. At that time, if there exists no corrected tone value correction table corresponding to the uncorrected tone value, it creates the tone value correction table from the corrected tone value corresponding to the uncorrected tone value by interpolation operation (step S1010). And it stores the tone value correction table in the hard disk 24a (step 1012), and this flow terminates.

In other words, it is also possible to constitute the color matching information preparing means U3 by the processing in steps S1006–S1012.

Incidentally, at the time of inputting and outputting data to and from the server 20, it is possible to perform data input and output through the display or keyboard connected directly to the server 20, or it is possible to perform data input and output from the prescribed computer connected to the internet 10.

(7) Other Modified Examples:

It is conceivable that the print control system of the present invention may take on various constructions.

For example, the printer may be one which is integrated with the computer. Also, the printer is not limited to the one which employs the piezoelectric element to eject color inks to form their dots; it may be that of bubble type which generates bubbles in the ink passage, thereby ejecting color inks. Moreover, it is also possible to use a printer (like a variable printer) which produces dots with various sizes. Needless to say, it is possible to use laser printers (which employ color toners) in addition to ink jet printers. In this case, the color toners are equivalent to the printing colorants defined above in the present invention.

In addition, the color inks are not limited to the above-mentioned combination of CMYK. Other possible combinations are CMY and CMYKcm (in which low-concentration cyan (c) and low-concentration magenta (m) are used). The multiple color inks may be held in a plurality of cartridges or in a single ink cartridge.

In addition, regarding the flow shown in FIG. 10, it is possible to execute within PC or it is also possible to execute part or all using a printer or a dedicated image processing device.

As explained above, the present invention is put into practical use in several modes in order to offer a print control system which alleviates work to match the color reproduced with a plurality of printing colorants with the standard color and makes it possible to simply get the data for reproduction of the standard color. In addition, the above-mentioned server functions as a device to perform the above-mentioned processing and output the information if it is connected to clients for two-way communication. Therefore, the present invention can be applied to a print control device. Moreover, the print control system and the print control device can be used as the print control method, the print control program, and the medium in which are stored the program.

Figure 27:
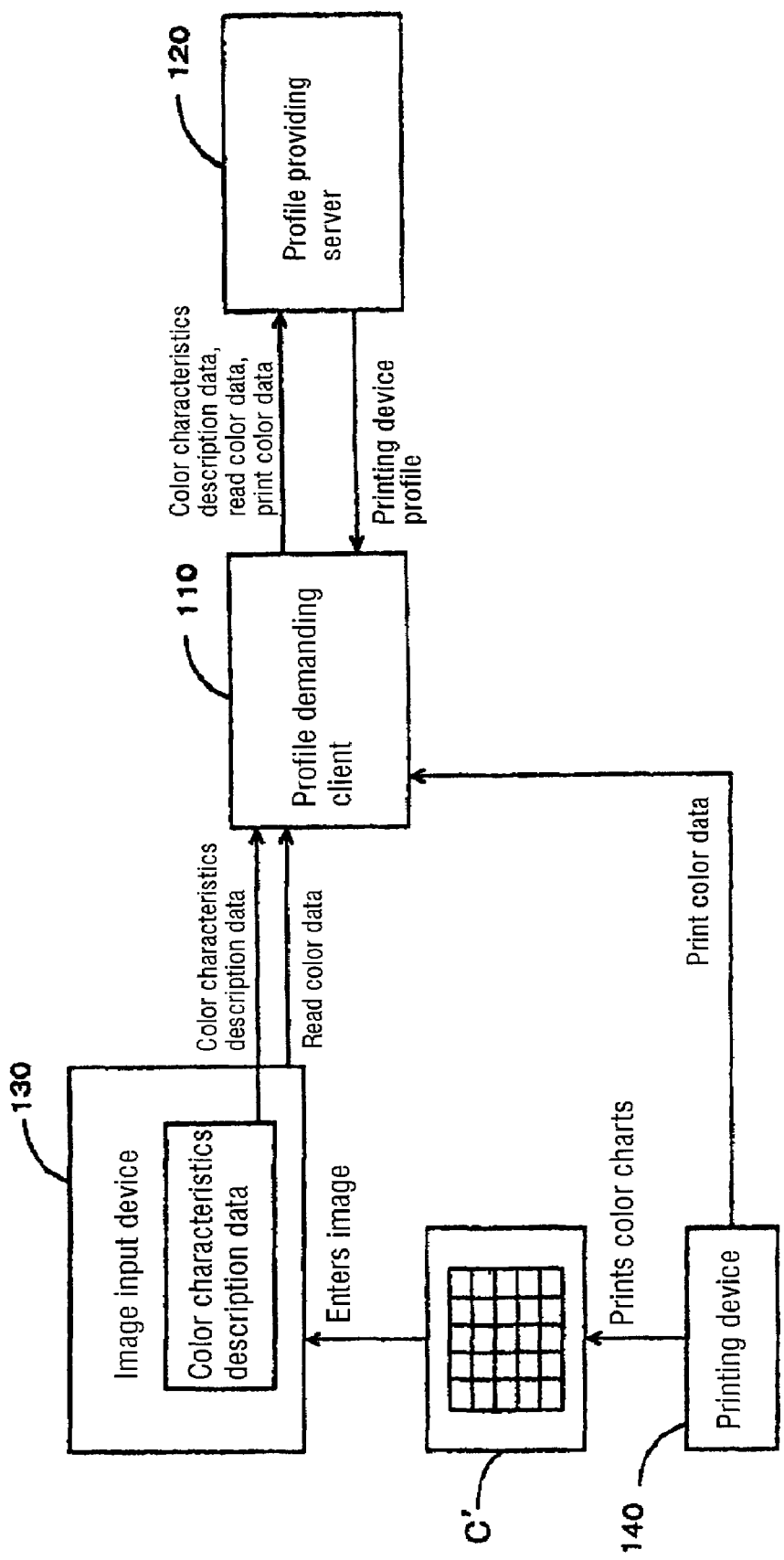
FIG. 27 is a block diagram showing the outline of the system to provide the profile.

II. The Second Embodiment (8) Outline of Profile Providing System:

FIG. 27 is a block diagram showing the outline of the system to provide the profile pertaining to the present invention. In this figure, the profile demanding client 110 is a client which is constructed of the computer which the user uses. In answer to the operation which the user has performed on the profile demanding client 110, the external profile proving server 120 creates the profile and sends it to the profile demanding client 110. The profile demanding client 110 controls the image input device 130 and the printing device 140. The profile demanding client 110 is a terminal to make the print color data used by the printing device 140 correspond to the standard color space coordinate values and perform creation demand of the printing device profile and to create and send the necessary data at the time of creation demand.

In other words, profile demanding client 110 causes the printing device 140 to print the color chart C' consisting of a plurality of color patches according to the prescribed print color data. And, the image input device 130 reads the actually printed color chart C' and acquires the read color data. Moreover, the image input device 130 stores the color characteristic data. The profile demanding client 110 sends to the profile providing server 120 the print color data, read color data, and the color character description data, and it receives from the profile providing server 120 the printing device profile created by the profile providing server 120.

The color character description data is data measured for each device and it includes uncertain elements such as manufacturing variation of each device. It is data to make the read color data correspond to the standard color space coordinates. Therefore, the read color data of the image input device 130 can be converted into the standard color space coordinate values though the color character description data. The profile providing server 120 creates the profile of the printing device 140 by utilizing this conversion. In other words, each color of the color chart C' printed by the printing device 140 is read by the image input device 130 and described as the read color data of the image input device 130, and the standard color space coordinate values are requested through the color character description data. Since this standard color space coordinate values are the standard color space coordinate values of the color char5 C', it follows that the print color data which the printing device 140 uses has been made to correspond to the standard color space coordinate values. And, the profile providing server 120 creates the profile of the printing device 140 by utilizing this corresponding relation.

Incidentally, the above-mentioned color character description data is the data to convert the read color data of the image input device 130 into the standard color space coordinate values; however, it is not necessary that all the data necessary for conversion be stored in the above-mentioned image input device 130, and it is possible to store part of it in the image input device 130 and part of it in the profile providing server 120. Also, it is not necessary to keep necessary data in the form of data; but it is possible to keep part of it in the form of data and to obtain detailed data by prescribed calculations in the profile providing server 120 and the profile demanding client 110. The color character description data handled in the present invention may take various modes, and various examples are realized by such modes.

(9) Constitution of Profile Providing System:

In what follows, the system constitution to realize the present invention is explained.

Figure 28:
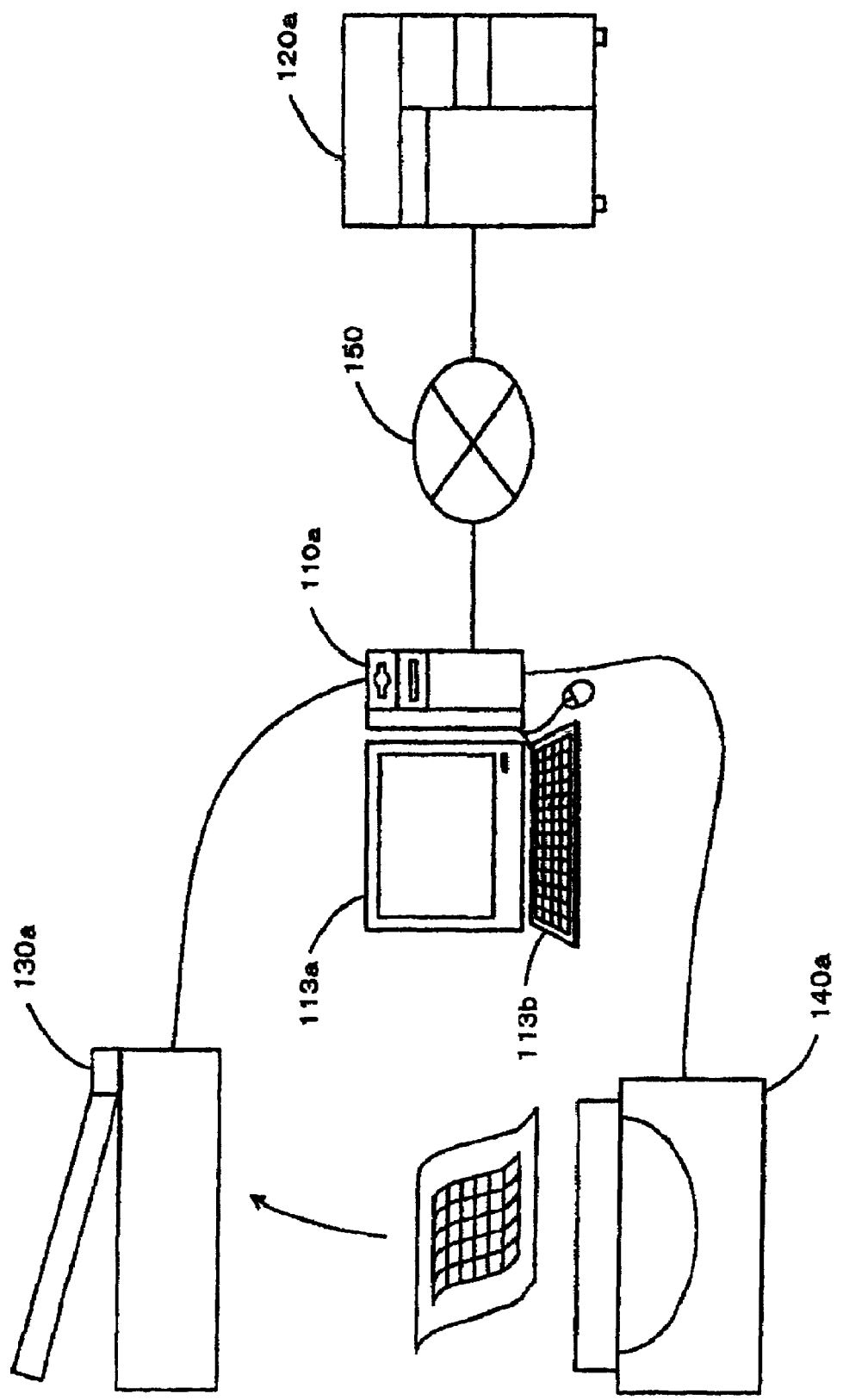
FIG. 28 is a diagram showing the construction of the system.

FIGS. 28 to 32 show the concrete constitution of the hardware to realize the present invention. FIG. 28 is the diagram of the system constitution. The profile demanding client 110 is constructed of the general-purpose personal computer 100a, the profile providing server 120 is constructed of the network server 120a, the image input device 130 is constructed of the flatbed scanner 130a, and the printing device 140 is constructed of the ink-jet printer 140a. To the personal computer 110a are connected the flatbed scanner 130a and the ink-jet printer 140a through USB cables. The flatbed scanner 130a and the ink-jet printer 140a are controlled by the driver built into the operating system which is run by the personal computer 110a.

And, the operating system which is run by the personal computer 110a has a built-in communication driver, which is capable of sending and receiving various kinds of information to and from the network servers 120a through the internet 150. The demand for profile creation is sent to the network server 120a from the personal computer 110a through the internet 150. The ICC profile of the printer is created by the network server 120a, and it is sent to the personal computer 110a through the internet 150. As soon as the personal computer 110a acquires the ICC profile of the printer, the printer drive after that executes printing by using the ICC profile, and adequate color management is accomplished.

Figure 29:
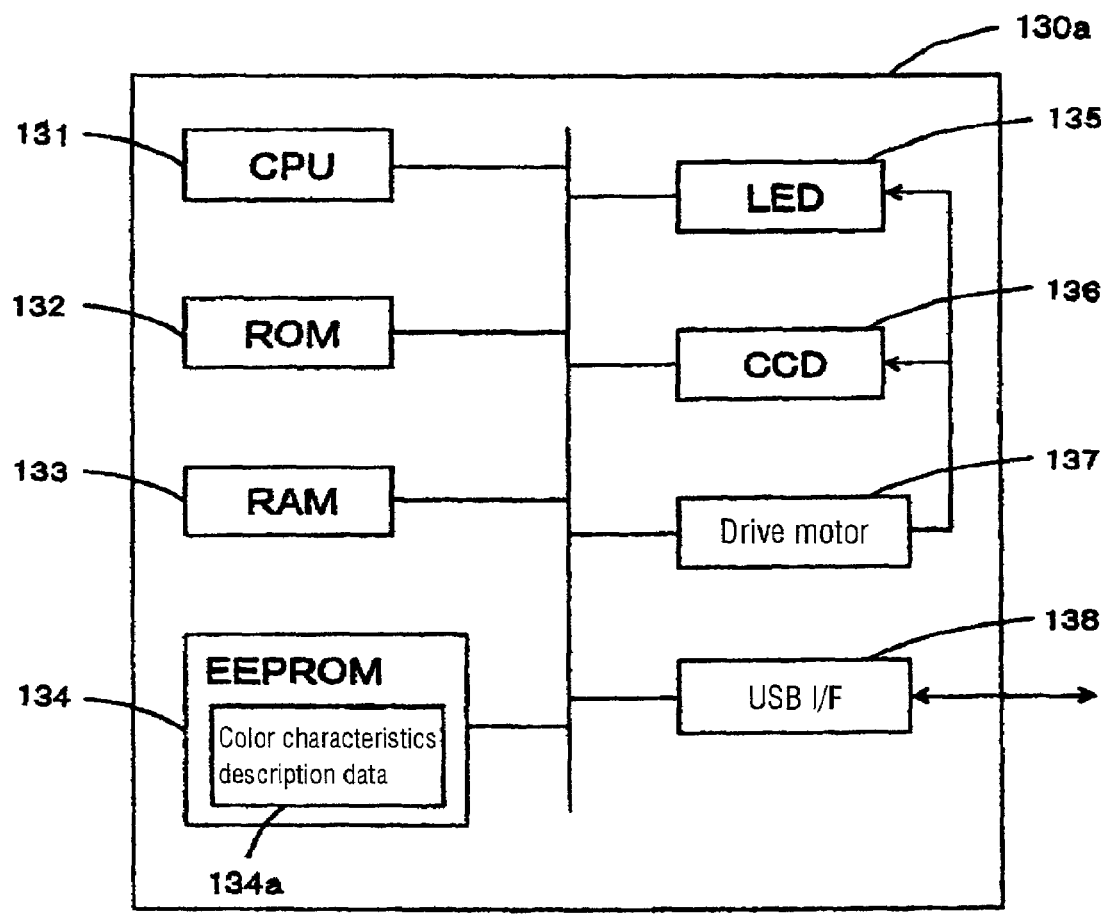
FIG. 29 is a diagram showing the hardware construction of the flat bed scanner.

FIG. 29 shows the hardware constitution of the said flatbed scanner 130a. In this figure, the optical reading system is constructed of the LED 135, the CCD 136, and the drive motor 137. In other words, the LED 135 consists of LED elements which are arranged in the primary scanning direction (or the transverse direction of the copy board) of the flatbed scanner 130a, and they are capable of irradiating the original with light simultaneously in the primary scanning direction. The CCD 136 consists of CCD elements arranged in the primary scanning direction, and they receive the reflected light of the irradiated light and convert it into electrical signals. Also, said CCD 136 is capable of obtaining electric signals of three colors, red (R), green (G), and blue (B), and it creates the read color data of color. The LED 135 and CCD 136 constitute the line sensor, and they are mounted on a carriage extending in the primary scanning direction.

This carriage is constructed such that it is moved forward and backward in the secondary scanning direction (perpendicular to the primary scanning direction) by the drive motor 137. Each line is scanned by the primary and secondary scanning, and the color read color data of the entire surface of the original is created. Also, the flatbed scanner 130a is provided with the USB I/F 138, so that it is connected to said personal computer 110a through the USB I/F 138, and hence it is capable of sending the scan instruction and data. In addition, the flatbed scanner 130a has the CPU 131, the ROM 132, and the RAM 133 to execute the control program. In other words, the CPU 131 properly executes the control program stored in the ROM 132 and performs reading of the original.

When a scan instruction is entered through the USB I/F 138, it controls the drive motor 137 according to the prescribed program by referencing the ROM 132, stores in the RAM 133 the read color data created by the CCD 136, and outputs the stored read color data to the personal computer 110a through the USB I/F 138. The flatbed scanner 130a in the present invention stores the color character description data 134a in addition to the ordinary scanner constitution. The color character description data 134a is stored in the EEPROM 134, and the color character description data 134a is measured for individual machines by the factory serviceman in the stage of manufacturing the flatbed scanner 130a and the result is stored in the EEPROM 134.

Figure 30:
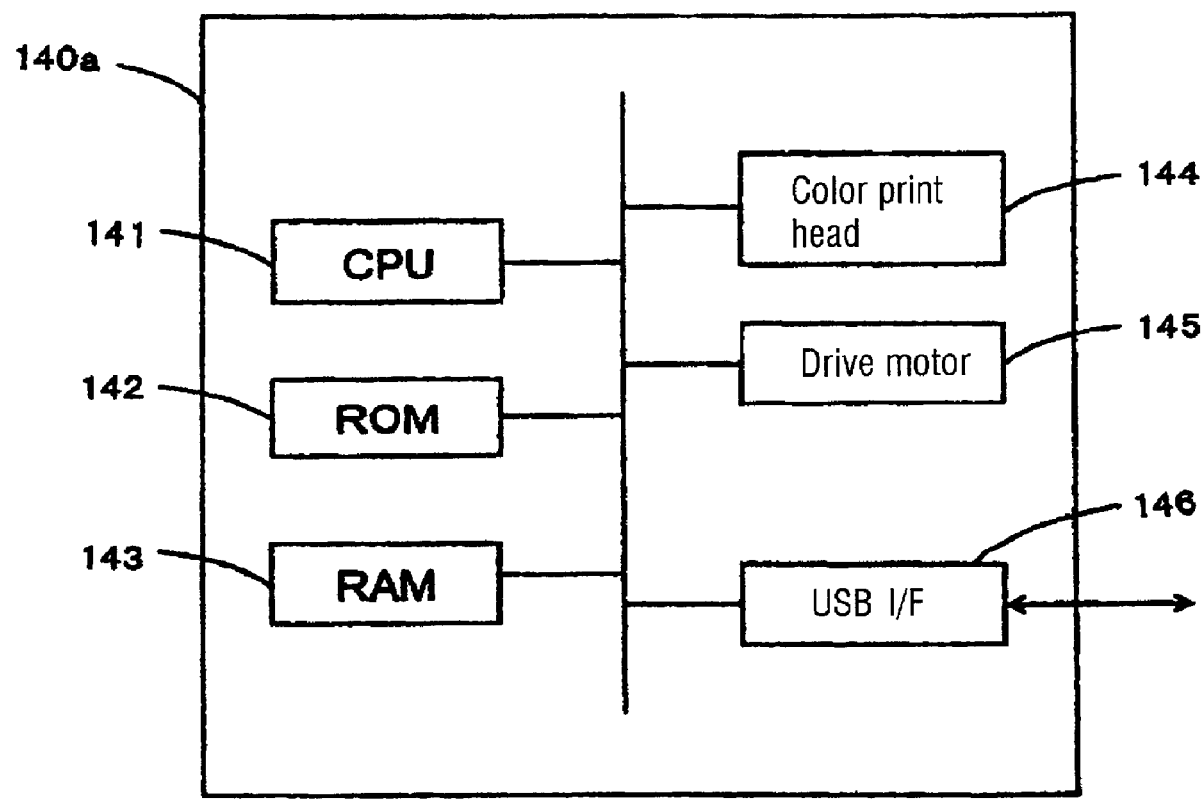
FIG. 30 is a diagram showing the hardware construction of the ink jet printer.

FIG. 30 shows the hardware construction of said ink-jet printer 140a. In this figure, the ink-jet printer 140a has the CPU 141 which constitutes the center of arithmetic processing. This CPU 141 can access the ROM 142 and RAM 143 through the system bus. To the system bus are connected the color print head 144 and the drive motor 145 through the USB I/F, and they receive the printer command and print color data through the USB I/F. The CPU properly executes the control program stored in the ROM 142 according to the printer command and controls the color print head 144.

And, the received print color data is buffered in the RAM 143 and is expanded into the drive signal of the color print head 144, which is supplied to the color print head 144. The color print head 144 has a plurality of nozzle arrays (not shown) for cyan (C), magenta (M), yellow (Y), and black (K), so that it expresses the prescribed color with the ejection density and size of dots of CMY, thereby performing color printing. This color print head is mounted on a carriage (not shown) and is moved back and forth in the primary scanning direction (perpendicular to the print paper feed direction) by the drive motor 145. Also, the drive motor 145 is capable of turning the carrier roller (not shown), which properly feeds print paper.

Figure 31:
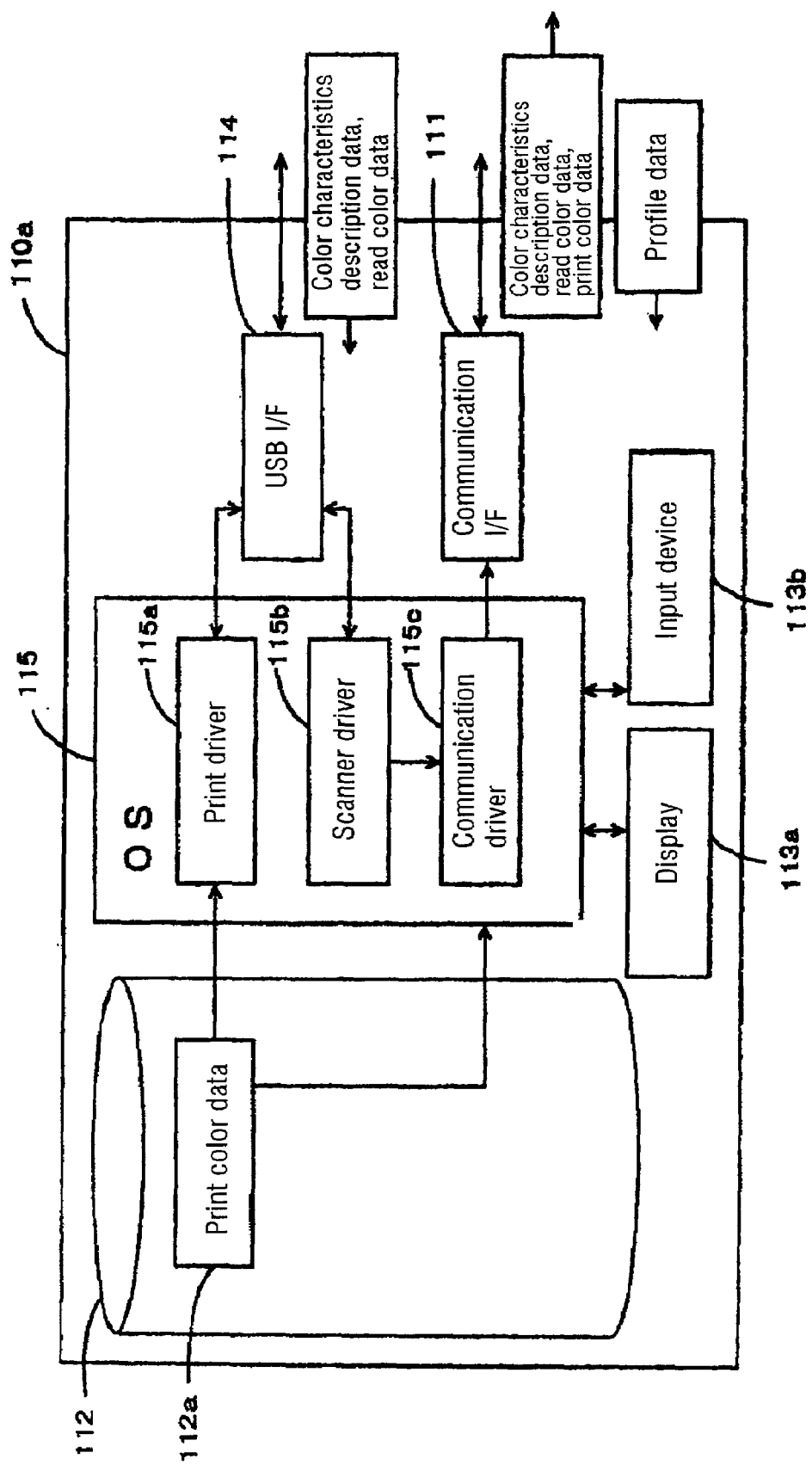
FIG. 31 is a diagram showing the outline of the construction of the personal computer.

FIG. 31 shows an outline of the structure of the personal computer 110a. This hardware structure is a mere example, and any general-purpose computer capable of being connected to the internet 150 can be the personal computer 110a. In this figure, the personal computer 110a has the communication I/F 111, hard disk drive 112, display 113a, input device 113b, and USB I/F 114. This structure and the CPU (no shown) execute the OS 115. The user performs the prescribed input operation wit the input device 113b while watching the display 113a, thereby executing various applications stored in the hard disk drive 112.

The OS 115 has the printer driver 115a to control the ink-jet printer 140a, the scanner driver 115b to control the flatbed scanner 130a, and the communication driver 115c to secure the communication line in the internet 150 through the communication I/F 111. The printer driver 115a receives the print execute instruction and print data from the applications and causes the ink-jet printer 140a to perform prescribed printing and also to print a plurality of color patches necessary for creation of the profile pertaining to the present invention.

The scanner driver 115b receives the image read instruction from the application, causes the flatbed scanner 130a to perform reading, and acquires the read color data. It also acquires read color data by reading the color chart of color patches (printed by the ink-jet printer 140a) for creation of the profile pertaining to the present invention and also acquires the color character description data 134a stored in the flatbed scanner 130a. The communication driver 115c receives and sends various kinds of data through the communication I/F; it also sends the color character description data 134a and the read color data necessary for creation of the profile pertaining to the present invention, and it receives the created profile data of the printer.

This profile providing service is provided through the property screen of the printer driver 115a and the scanner driver 115b. In other words, in the hard disk 112 is stored the prescribed print color data 112a; when execution of the profile providing service is selected in the prescribed property screen of the printer driver 115a, the printer driver 115a acquires the print color data 112a and outputs the printer command to instruct print execution based on the print color data 112a to the ink-jet printer 140a through the USB I/F 114. As the result, the ink-jet printer 140a prints a color charts composed of a plurality of color patches.

In this embodiment, the property screen of the scanner driver 115b is displayed as this work is done. On the property screen, it prompts to read the thus printed color chart. As the user reads the printed color chart according to the screen, the read color data is acquired through the USB I/F 114. At this time, said color character description data 134a is also acquired. The communication driver 115c sends these data through said communication I/F 111. Needless to say, such a structure is a mere example and various modes are available; for example, it is possible to use a mailer to acquire the profile data and to use the prescribed browser to request the profile creation.

Figure 32:
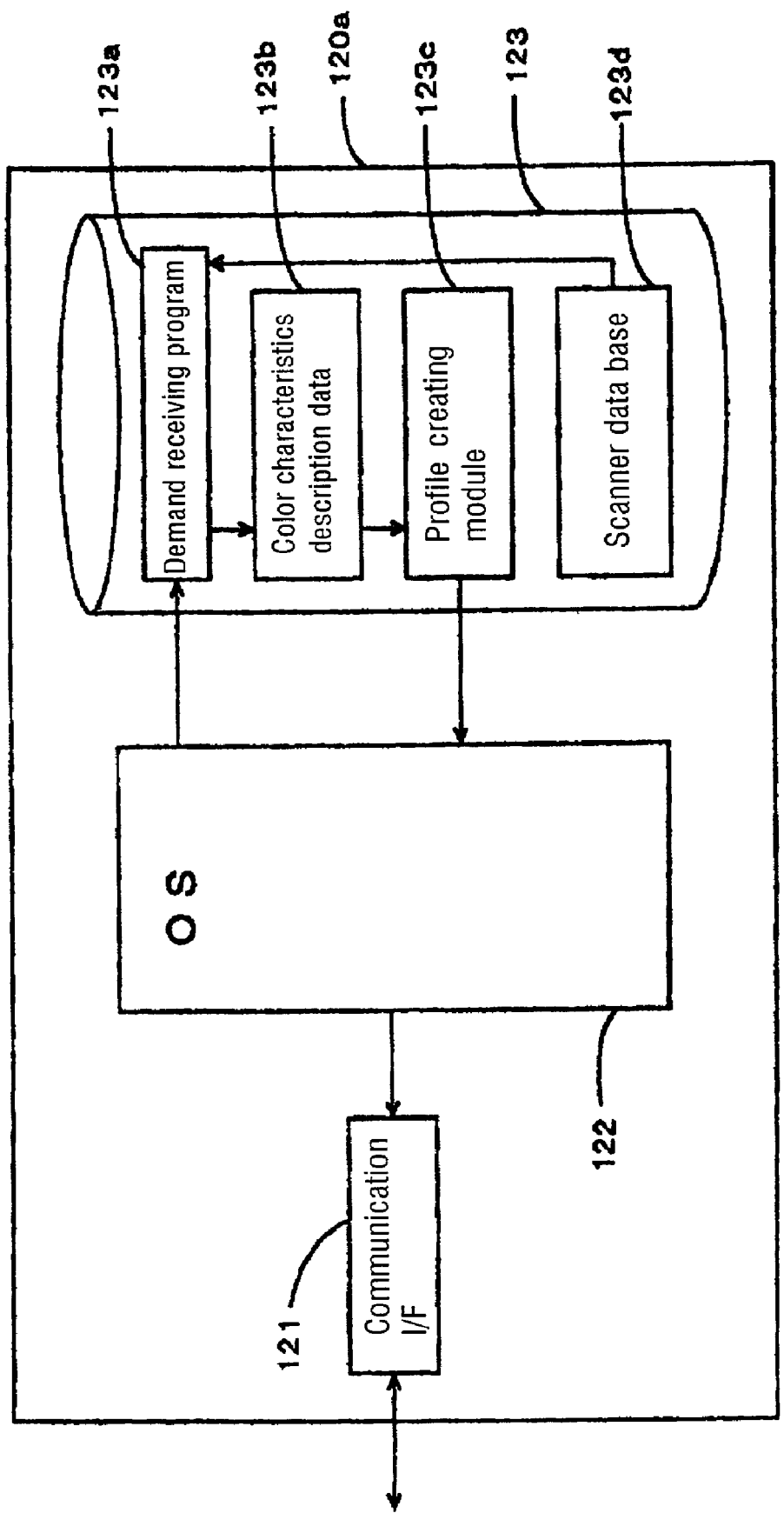
FIG. 32 is a diagram showing the outline of the construction of the network server.

FIG. 32 shows an outline of the structure of the network server 120a. In this figure, the network server 120a has the communication I/F 121 and the hard disk drive 123, and the demand receiving program 123a stored in the hard disk drive 123 is executed in resident mode under control by the OS 122 which is executed by the CPU etc. (not shown). In the hard disk drive 123 are further stored the color character description data 123b, the profile creation module 123c, and the scanner data base 123d. The demand receiving program 123a creates the profile of the printer by using these data and modules.

The color character description data 123b is data to make the read color data of the flatbed scanner 130a correspond to the standard color space coordinate values by combination with the color character description data 134a which said personal computer 110a sends. This color character description data 123b is the data measured for the characteristic properties of each body by the serviceman of the factory in the stage of manufacturing said flatbed scanner 130a. In other words, one part of the color character description data measured in the factory is stored in the EEPROM 134 of the flatbed scanner 130a and another part is stored in the hard disk drive 123b of the profile proving server. Several embodiments can be realized depending on what part of the measured data is stored in the flatbed scanner 130a or the network server 120a. Concrete examples will be explained in detail in the example given later.

The scanner database 123d is a database to univocally specify the body of the flatbed scanner 130a. In other words, since said color characteristic description data is measured for individual bodies of the flatbed scanner 130a, it is necessary that the body for which said color character description data 123b has been measured coincide with the body for which said color character description data 134a has been measured, so that the read color data corresponds to the standard color space coordinate values. The profile creating module 123c is a module to create the profile of the printer based on the input data; it references said color character description data 123b and 134a, makes the read color data received through said communication I/F 121 correspond to the standard color space coordinate values, and as the result, it grasps the correspondence relation between the print color data received and the standard color space coordinate values. And, it creates the profile based on this correspondence relation and outputs the profile to said personal computer 110a through said communication I/F 121.

(10) Creating of Character Description Data:

A description is given below of the processing for creating said color character description data which is utilized in said system structure. Incidentally, it is possible to create the ICC profile of the flatbed scanner 130a from the color character description data; however, in the present invention, the color character description data is a concept which embraces the ICC profile and it is also a broad concept embracing all data which make the read color data correspond to the standard color space coordinates. Several embodiments are available depending on which of the flatbed scanner 130a, personal computer 110a, and network server 120a performs the processing in the stage explained later or which data is stored. The following deals with a series of processing which is performed in the entire system regardless of the embodiment.

Figure 33:
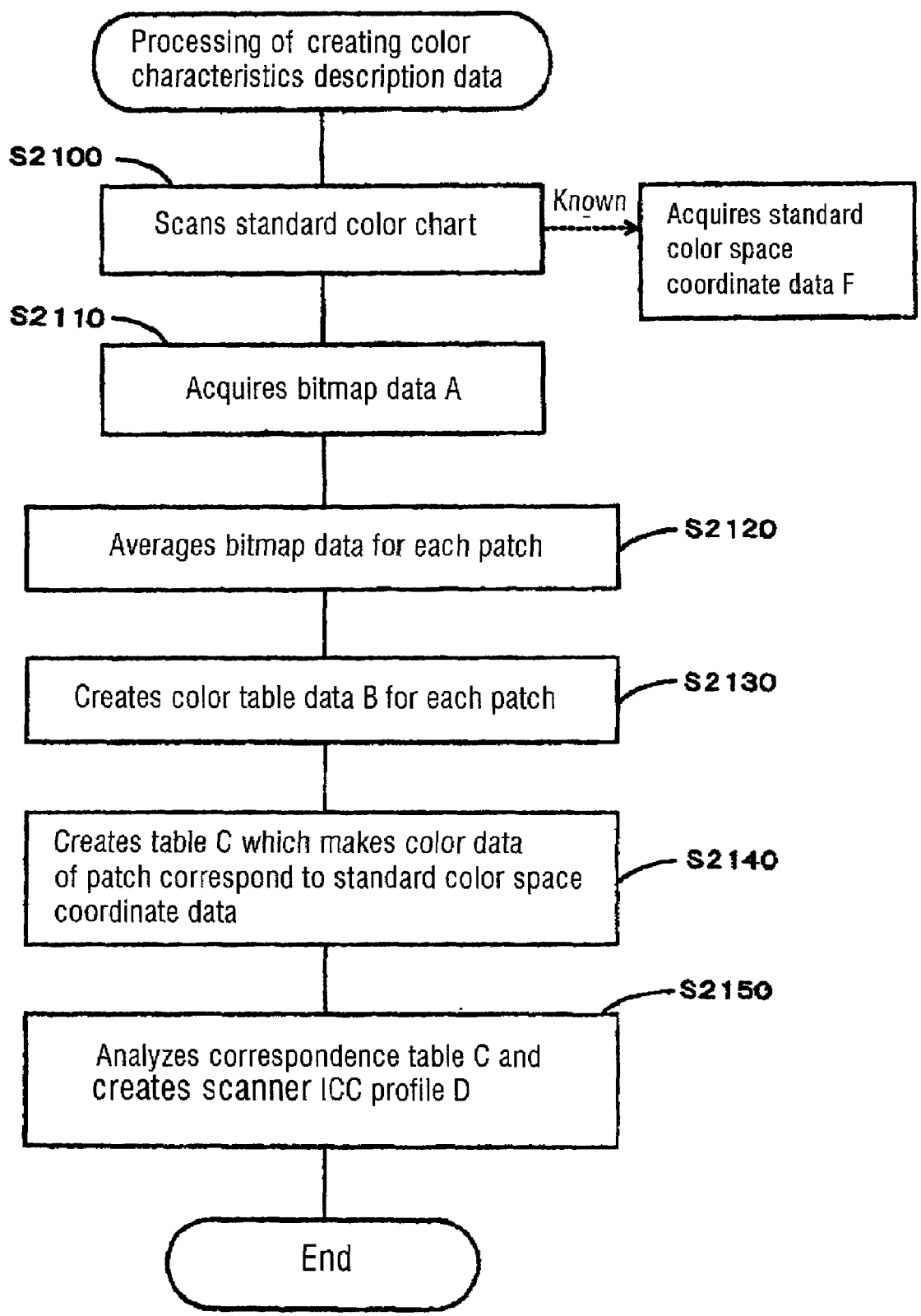
FIG. 33 is a flow chart of the process of creating the color character description data.
Figure 34:
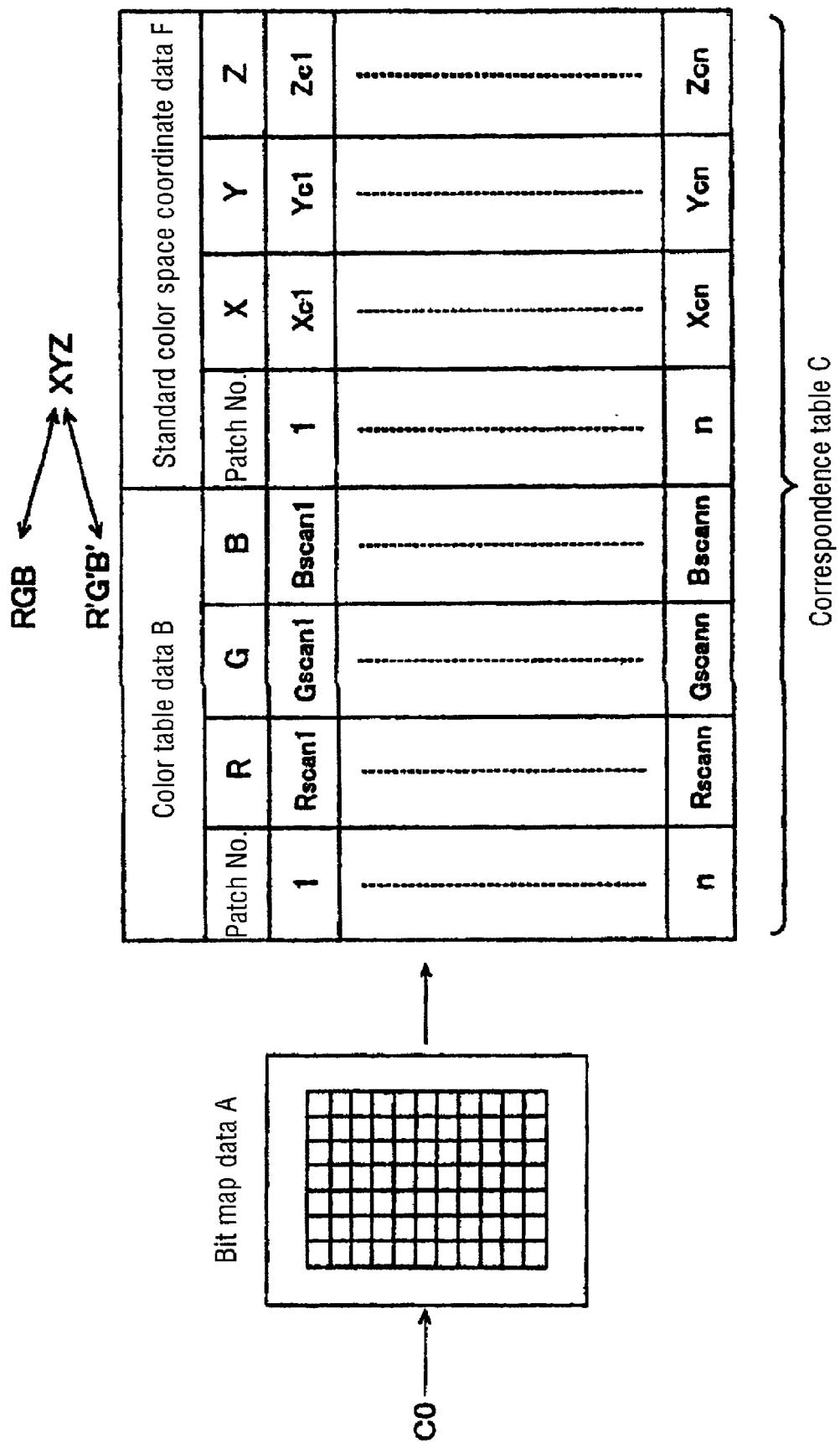
FIG. 34 is a diagram showing the data mode acquired in the process of creating the color character description data.

FIG. 33 is a flow chart for creating the color character description data. The color character description data is data to be created for individual bodies of the flatbed scanner 130a. In step S2100, the prescribed standard color chart C0 is scanned. Usually, the standard color space coordinate values of each color patch of the standard color chart C0 are previously known; therefore, it is possible to readily acquire the standard color space coordinate data F of this standard color chart C0. FIG. 34 is a diagram showing the data mode acquired in the processing for creating the color character description data. In this figure, the standard color space coordinate data F is one which represents the standard color space coordinate data for each color patch on the standard color chart C0 in terms of the coordinate values of the XYZ space. Here, the coordinate values of patch Nos. 1 to n are represented by (Xc1, Yc1, Zc1) to (Xcn, Ycn, Zcn).

In step S2110, said standard color chart C0 is read in said flatbed scanner 130a, and, as the result, the bit map data A is acquired which is the read data of the standard color chart C0. This bit map data A is data on the bit matrix representing the entirety of the standard color chart C0 as shown in FIG. 34. This data also represents individual dots having each tone of RGB. The standard color chart C0 has a plurality of color patches as shown in the bit map data A in FIG. 34, therefore, each tone value of RGB is averaged for each patch in step S2120. As the result, it is possible to acquire the read color data of the flatbed scanner 130a for each patch while reducing the read error of the flatbed scanner 130a.

In step S2130, this read color data is converted into a table, and the color table data B is created. As shown in FIG. 34, this color table data B is one in which the read color data of patches Nos. 1 to n is converted into the tone values of RGB (Rscan1, Gscan1, Bscan1) to (Rscann, Gscann, Bscann). The standard color chart C0 which has been read to create the color table data B is identical with the standard color chart C0 of said standard color space coordinate data F; therefore, by making both correspond to each other, it is possible to create a table which makes the read color data of the flatbed scanner 130a correspond to the standard color space coordinate values.

In step S2140, this correspondence table C is created as shown in FIG. 34. According to this correspondence table C, it is possible to make the read color data correspond to the standard color space coordinate values regardless of difference between the bodies of the flatbed scanner 130a. In other words, although the standard color space coordinate values of each patch of the standard color chart C0 is univocally define as the standard color space coordinate values of FIG. 34, the RGB tone values of the color table data B subtly fluctuates depending on difference between the bodies of the flatbed scanner 130a; therefore, there will be an instance where the patch for a certain body of printer is "RGB" whereas the patch for another body of printer is "R'G'B'". However, in any case, since the standard color space coordinate value of the patch is known, the above-mentioned "RGB" for a certain body of printer has the standard color space coordinate of "XYY" and the "R'G'B'" for another body of printer also has the standard color space coordinate of "XYZ".

Figure 35:
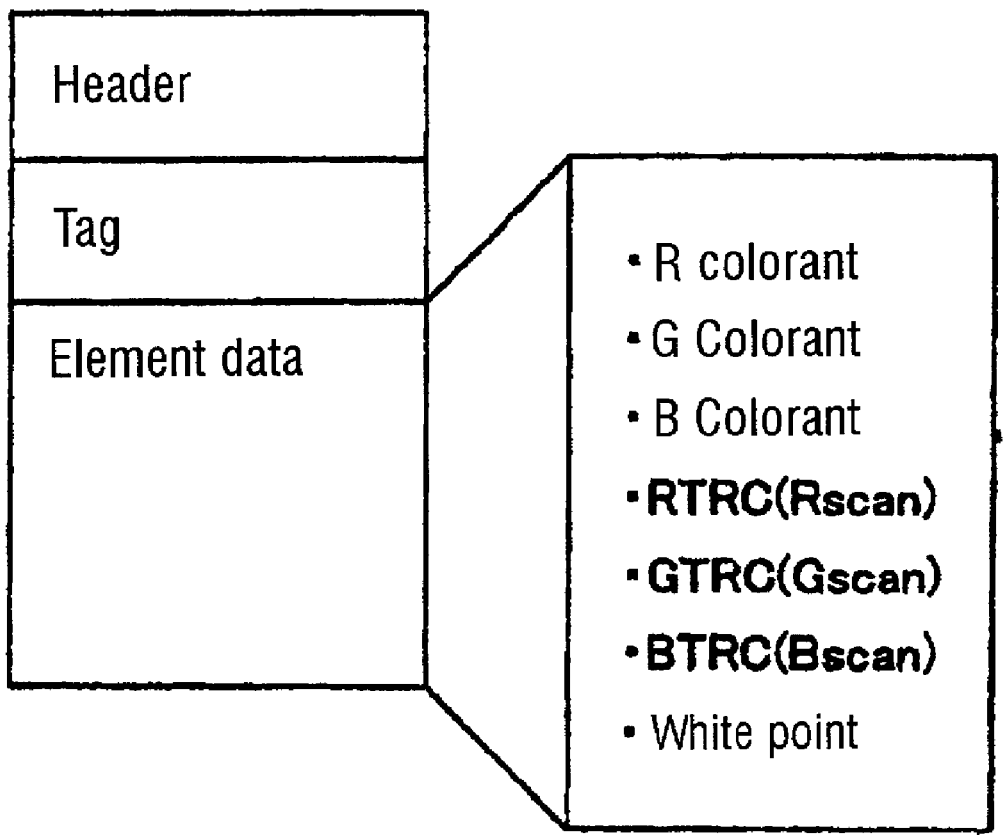
FIG. 35 is a schematic diagram of scanner ICC profile.

As mentioned above, it is possible to make the color data which has been read for each printer correspond to the standard color space coordinate value regardless of difference between bodies of the flatbed scanner 130a. Step S2150 is intended to analyze this correspondence table C and create the ICC profile D for the scanner. Needless to say, this profile creation is executed for individual bodies. The algorithm to create this profile can be accomplished by various known methods such as interpolation operation and color prediction. FIG. 35 schematically shows the thus created scanner ICC profile D.

The scanner ICC profile D consists of a header, a tag, and a data string of element data. In the header are described the size and version of the profile, the input device to which it is applied, and the kind of the medium. In the tag are described the tag signature to indicate the kind of the element data and the size of the element data. The element data is composed of each colorant of RGB, each tone curve (TRC) of RGB, and white point. Each tone curve of RGB is a function of the color data read from the scanner, and "scan" such as RTRC (Rscan) means the read color data.

The standard color space coordinate value XYZ is calculated by multiplying the column matrix in which the elements of the column are RTRC (Rscan), GTRC (Gscan), and BTRC (Bscan) by the 3×3 colorant matrix composed of the above-mentioned RGB colorants. In other words, it is possible to convert the arbitrary read color data of the image input device into the XYZ value which is the standard color space coordinate value. The scanner ICC profile created in this manner is used when the profile of the printing device is created in the present invention. Needless to say, it is possible to cause the above-mentioned personal computer 110a to acquire the scanner ICC profile D. Also, in the present invention, the ICC profile D of the flatbed scanner 130a mentioned above is not always essential to obtain the profile of the printing device; it is permissible to create a look-up table that makes arbitrary read color data correspond to the standard color space coordinate value by combination with interpolation operation.

(11) Processing for Profile Creation:

Next, we will explain the processing for profile creation in the present invention. Incidentally, several embodiments may be available depending on which stage of processing to make the print color data correspond to the standard color space coordinate value is carried out by the personal computer 110a or the network server 120a. Here, we will explain a series of processing which is carried out in the entire system regardless of its embodiment.

Figure 36:
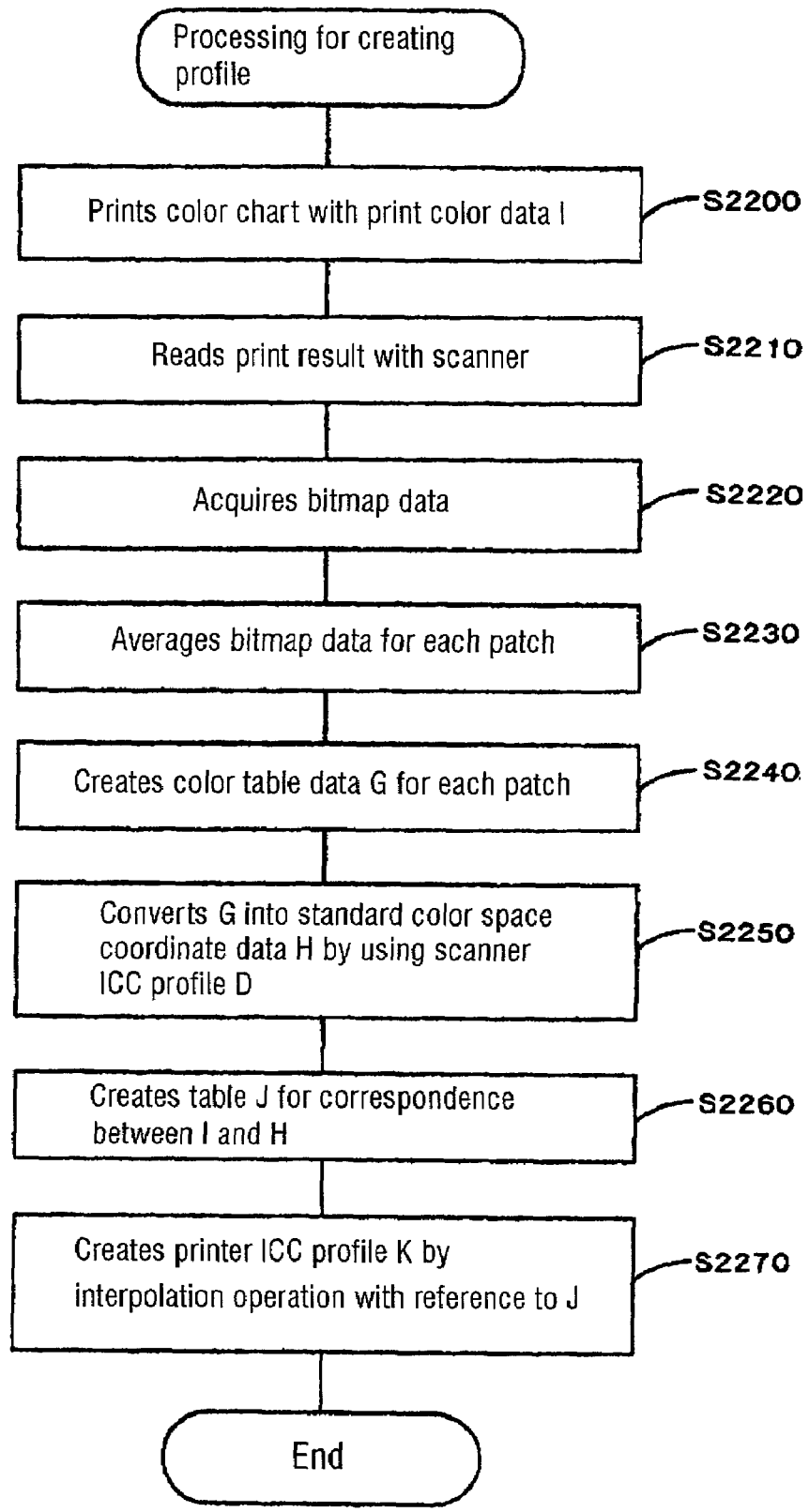
FIG. 36 is a flow chart of the process for profile generation.
Figure 37:
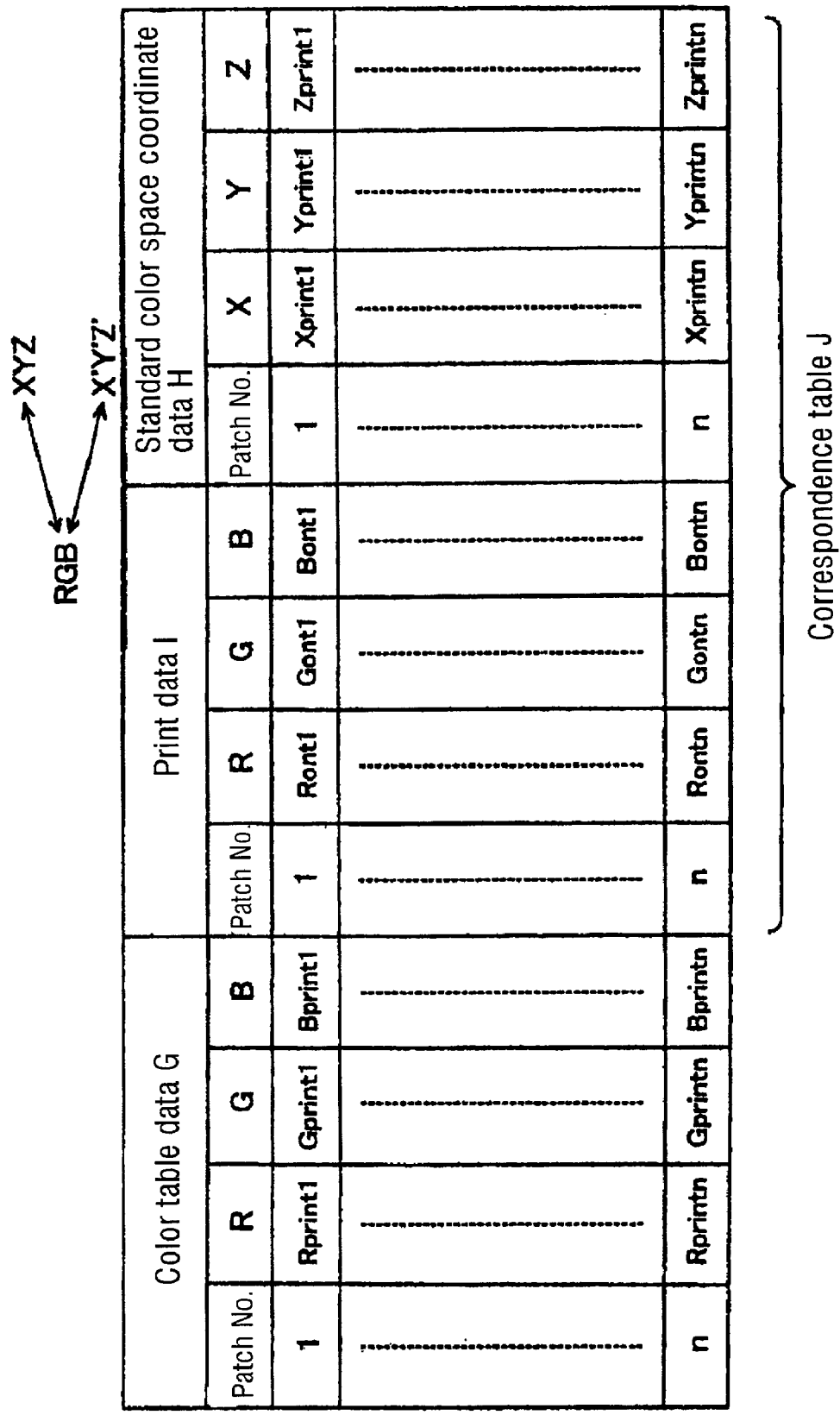
FIG. 37 is a diagram showing the data mode acquired in the process of creating the color character description data.

FIG. 36 is a flow chart of the processing for profile creation. The profile of the printing device is a profile which makes arbitrary print color data correspond to the standard color space coordinate value. In step S2200, the above-mentioned ink-jet printer 140a prints the color chart using the prescribed print color data I. Here, the print color data I is RGB data used by the ink-jet printer 140a. The data corresponding to patch Nos. 1 to n are designated as (Rout1, Gout1, Bout1) to (Routn, Goutn, Boutn) as shown in FIG. 37.

Then, in step S2210, the printed color chart mentioned above is read by the flatbed scanner 130a mentioned above. As the result, in step S2220, the bit-map data of the color chart is acquired, in step S2230, each tone value of RGB is averaged fro each patch (as in step S2120 mentioned above), and in step S2240, the color table data G for each patch of the printed color chart is created. FIG. 37 shows this color table data G; as shown in this figure, it is constructed such that the read color data of patch Nos. 1 to n is designated as the RGB tone values (Rprint1, Gprint1, Bprint1) to (Rprintn, Gprintn, Bprintn).

The scanner ICC profile created in step S2150 mentioned above is a series of data which can convert the arbitrary read color data of the flatbed scanner 130a into the standard color coordinate values; therefore, step S2250 converts the color table data G into the standard color space coordinate data H by using this scanner ICC profile D. As shown in FIG. 37, the standard color space coordinate data is constructed such that the standard color space coordinate values of patch Nos. 1 to n are designated as the XYZ coordinate values (Xprint1, Yprint1, Zprint1) to (Xprintn, Yprintn, Zprintn). As the result of this conversion, one-to-one correspondence is established between the standard color space coordinate data H and the print color data I, as shown in FIG. 37, and step S2260 creates the correspondence table J which makes the print color data I correspond to the standard color space coordinate data H.

According to this correspondence table J, it is possible to make the print color data correspond to the standard color space coordinate value regardless of difference between bodies of the ink-jet printer 140a. In other words, when printing is carried out with different ink-jet printers 140a by using common RGB data, the print result subtly differs in color from one printer to another; however, by referencing the correspondence table J, it is possible to make the print result correspond to the standard color space coordinate values, such that for the same RGB, the print result of one printer corresponds to XYZ and the print result of another printer corresponds to X'Y'Z'.

Figure 38:
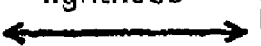
FIG. 38 is a schematic diagram of printer ICC profile.
Figure 38:
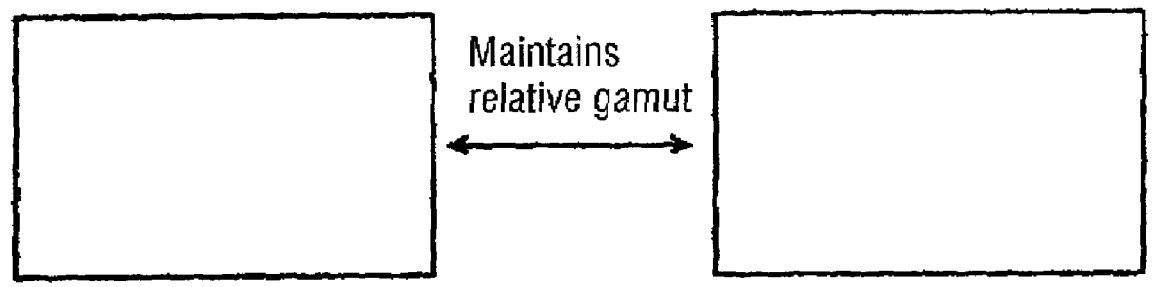
Figure 38:

In this way, it is possible to make the print color data correspond to the standard color space coordinate value regardless of difference between individual bodies of the ink-jet printer 140a. Step S2270 analyzes the correspondence table J to create the ICC profile K of the printer. This profile creation is carried out for individual ual demands for profile creation, as a matter of course. The algorism of this profile creation can be accomplished by using various known methods such as interpolation operation, color prediction, and gamma bit-mapping. FIG. 38 schematically shows the thus created printer ICC profile K.

The printer ICC profile K is one which describes six kinds of tables in terms of three kinds of rendering intent and white points of media; it is composed of the relation which describes the reference points (X0, Y0, Z0) to (X255, Y255, Z255) in the XYZ space and the reference points (R0, G0, B0) to (R255, G255, B255) in the RBG space in terms of the rendering intent of keeping the lightness, the relation which describes in a similar way in terms of the rendering intent of keeping the relative gamut, and the relation describing in terms of the rendering intent of keeping the saturation.

Needless to say, in order to prevent the profile size from becoming large, it is possible to divide the "0–255" level into several grids and constitute the XYY value information in each branch shop in the form of table and to constitute it in such a way that interpolation operation is carried out by the color conversion engine based on such constructed table, thereby performing mutual conversion between the arbitrary RBG values and XYZ values.

Figure 39:
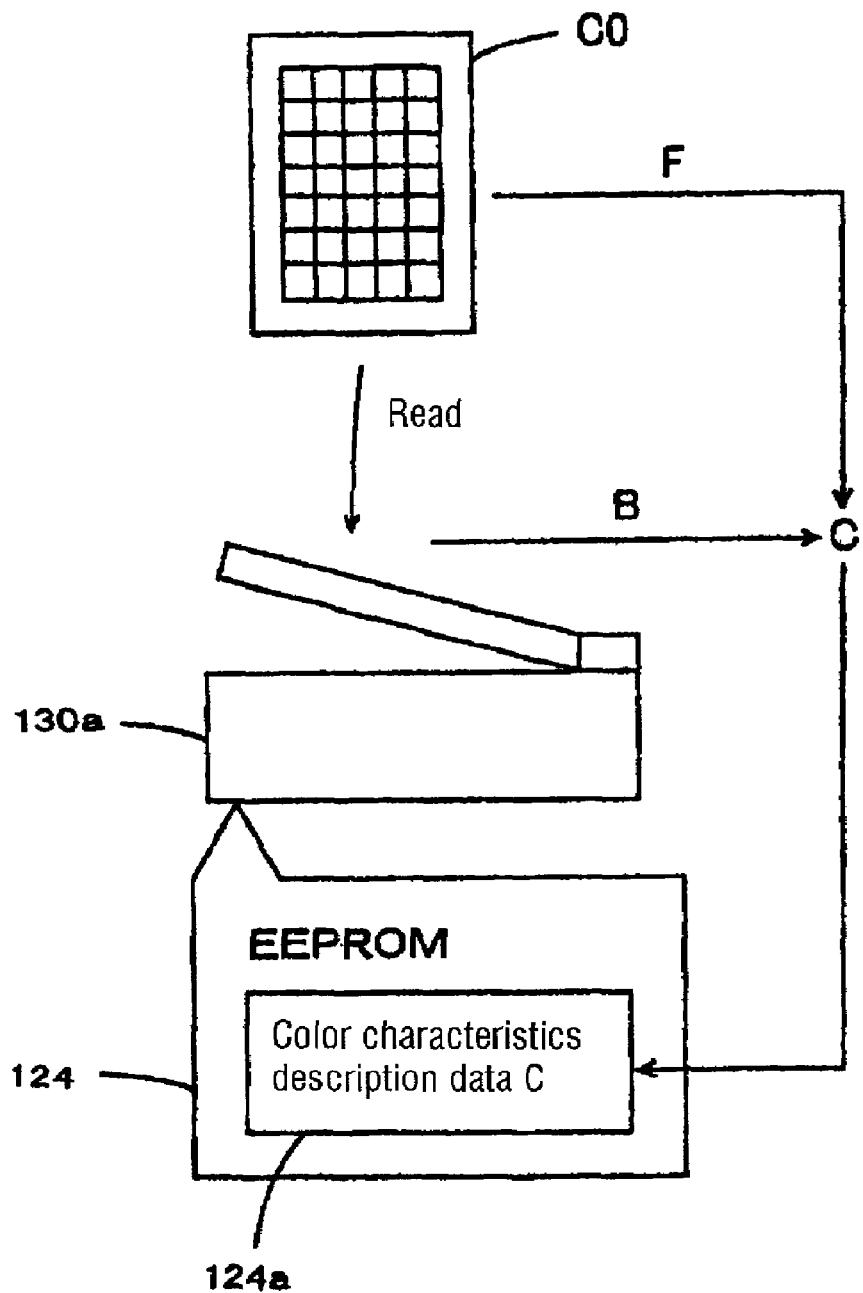
FIG. 39 is a diagram showing the data processing in the factory.
Figure 40:
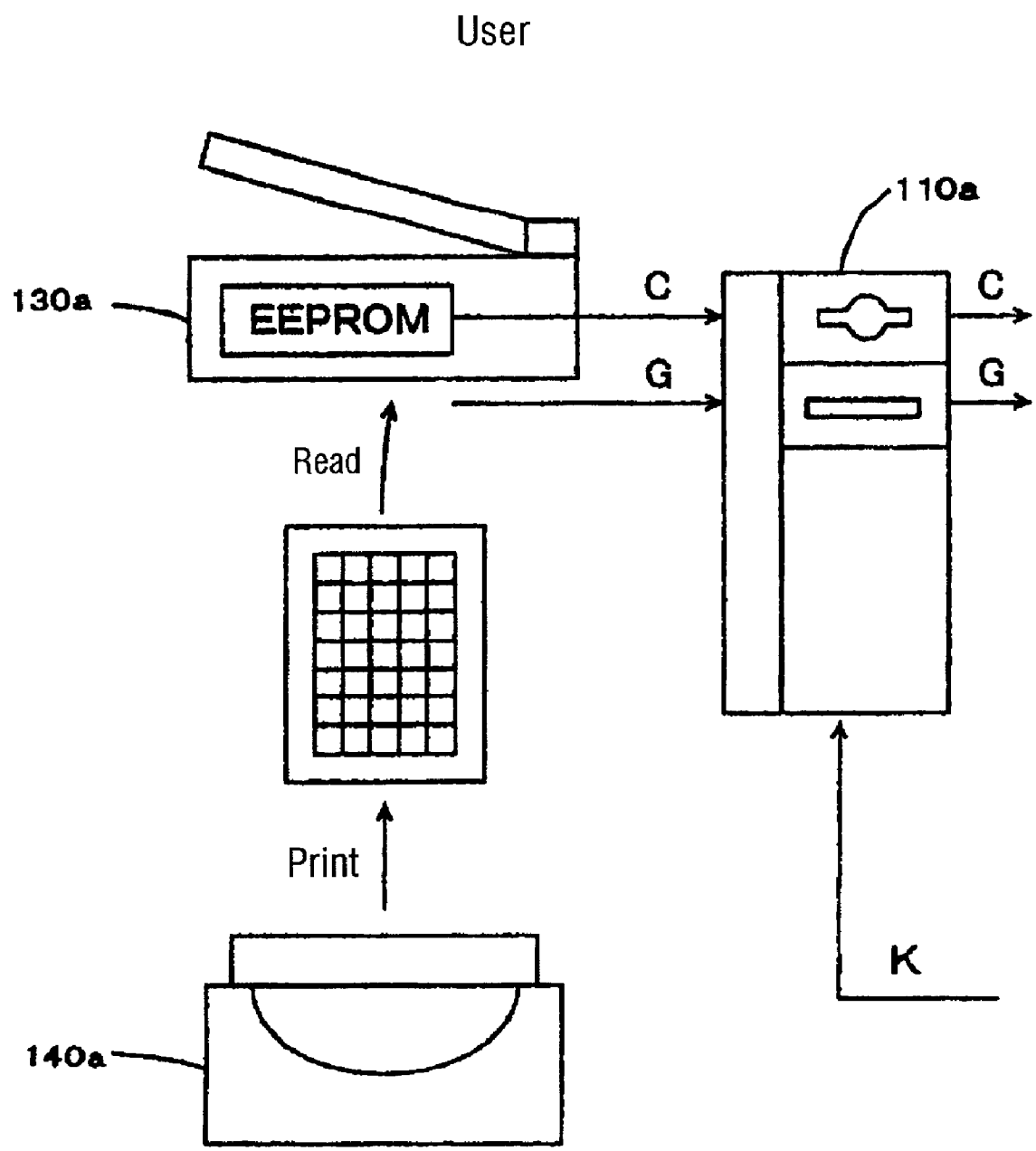
FIG. 40 is a diagram showing the data processing of the profile demanding client.
Figure 41:
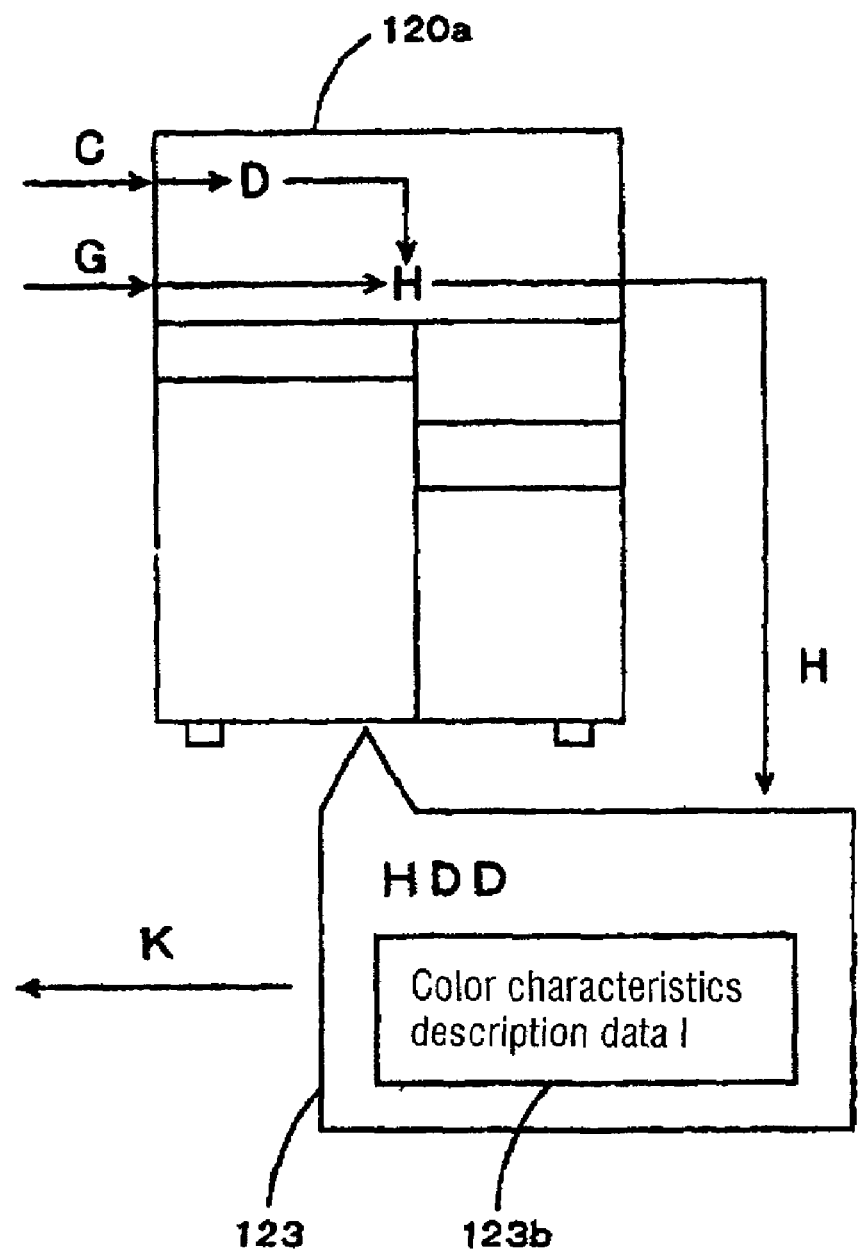
FIG. 41 is a diagram showing the data processing of the profile providing server.

(12) Main Example:

In what follows, we will explain the main example of the present invention which is constructed as mentioned above. FIG. 39 to 41 are diagrams explicitly showing the data processing which is carried out in this example and the storage place of the color character description data. In this example, the correspondence table C shown in FIG. 34 (mentioned above) is created in the stage of manufacturing the flatbed scanner 130a in a factory and it is stored in the color character description data 134a of the EEPROM 134 of the flatbed scanner 130a. To be concrete, it reads the standard color chart C0 by the flatbed scanner 130a and acquires its color table data B and combines it with the standard color space coordinate data F which is previously known, thereby creating the correspondence table C. And, it stores this correspondence table C as the color character description data 134a of EEPROM 134. In other words, the processing in steps S2100 to S2140 in FIG. 33 is carried out in the factory.

On the other hand, the user asks for the printer ICC profile K of the ink-jet printer 140a by using the personal computer 110a. At this time, the user sends to the network server 120a the data necessary for profile creation as shown in FIG. 40. In other words, the user invokes the property screen of the printer driver 115a in the personal computer 110a and selects the ICC profile demand execution in the property screen, and then the screen shown in FIG. 42 is displayed. In this figure, the screen displays with letters the sequence of creating the ICC profile, thereby guiding the work which the user carries out, and it also permits the user to enter the printer name, medium, and print quality.

The input data of the printer name, medium, and print quality is sent, together with the color table data G (mentioned later), to the network server 120a, and they are described in the ICC profile of the printer to be created. In this way there is created the printer profile capable of corresponding to the printer type, medium, and print quality. In FIG. 42, if the user enters the data of printer name, medium, and print quality and selects the OK button, the color chart is printed based on the previously established print color data I. In other words, this work corresponds to step S2200 in FIG. 36 mentioned above.

After the color chart has been printed, in response to print completion, the scanner driver 115b shown in FIG. 31 is activated and the screen shown in FIG. 43 is displayed as its property screen. In this figure, the screen prompts the user to set the printed color chart on the copy board of the above-mentioned flatbed scanner 130a and to enter the prescribed customer information as per input form. This customer information is composed of the user's name and address. It is sent together with the color table data G (mentioned later) to the network server 120a. By comparison with the data of the previously registered scanner database 123d, it is used to identify the body of the scanner and specify the customer for charging.

The screen shown in FIG. 43 has check boxes to select the scanner ICC profile and the printer ICC profile. If the check box for the scanner ICC profile is checked, the above-mentioned network server outputs the above-mentioned scanner ICC profile D in compliance with this request. Under the check box for the printer ICC profile is displayed the data of printer name, medium, and print quality which was entered in FIG. 42 (mentioned above). The user confirms this data and checks the check box of the printer ICC profile and select the apply button. Then, demand for the printer profile and the reading in the flatbed scanner 130a start.

Incidentally, the screen shown in FIG. 43 is designed such that the total amount of payment is automatically calculated, and payment is made in the method specified in the input form mentioned above. In other words, if payment by credit card or payment from bank account has been selected, this selection is sent to the above-mentioned network server 120a and the network server 120a asks the prescribed payer for payment.

As soon as the reading in the flatbed scanner 130a has been completed, the above-mentioned color table data G is created. In other words, the processing in steps S2110 to S2240 in FIG. 36 (mentioned above) is accomplished by the personal computer 110a. As soon as the color table data G has been created, the personal computer 110a reads the above-mentioned correspondence table C from the flatbed scanner 130a and sends to the network servers 120a the above-mentioned table data G and the correspondence table C and asks for the profile creation.

As shown in FIG. 41, the network server 120a acquires the demand for creation of the above-mentioned profile and the above-mentioned correspondence table C and performs the processing corresponding to step S2150 in the above-mentioned FIG. 33 and creates the scanner ICC profile D. Moreover, since the above-mentioned table data G is the read color data of the flatbed scanner 130a, it executes the processing corresponding to step S2259 and converts its color space into the standard color space coordinate data H by using the above-mentioned scanner ICC profile D. Moreover, in this example, the above-mentioned print color data I is previously stored as the color character description data of the above-mentioned hard disk drive 123. In other words, although the color charts printed under control of the above-mentioned printer driver 115a have color difference due to printer difference, the print color data I which is its tone data utilized the common one. Therefore, it is possible to use the data stored in the hard disk drive of the network server 120a without acquiring the print color data I through the network. Needless to say, such processing as changing the value of the print color data I for each printer type is possible; and it is also possible to so construct as to extract the adequate print color data I which the customer uses by comparison of the customer information shown in FIG. 43 (mentioned above) with the previously created database.

In addition, it carries out the processing corresponding to step S2260 in FIG. 36 (mentioned above), thereby creating the correspondence table J for the print color data I and the standard color space coordinate data H, and it carries out the processing corresponding to step S2270, thereby creating the printer ICC profile K. In this way, the ICC profile for each of the ink-jet printer 140a, medium, and print quality is created, and then the network server 120a outputs it to the personal computer 110a through the communication line. The personal computer 110a acquires this printer ICC profile and builds it into the above-mentioned printer driver 115a and uses it. In this way it is possible to perform subsequently the printing of the ink-jet printer 140a in the state of adequate color management.

Figure 44:
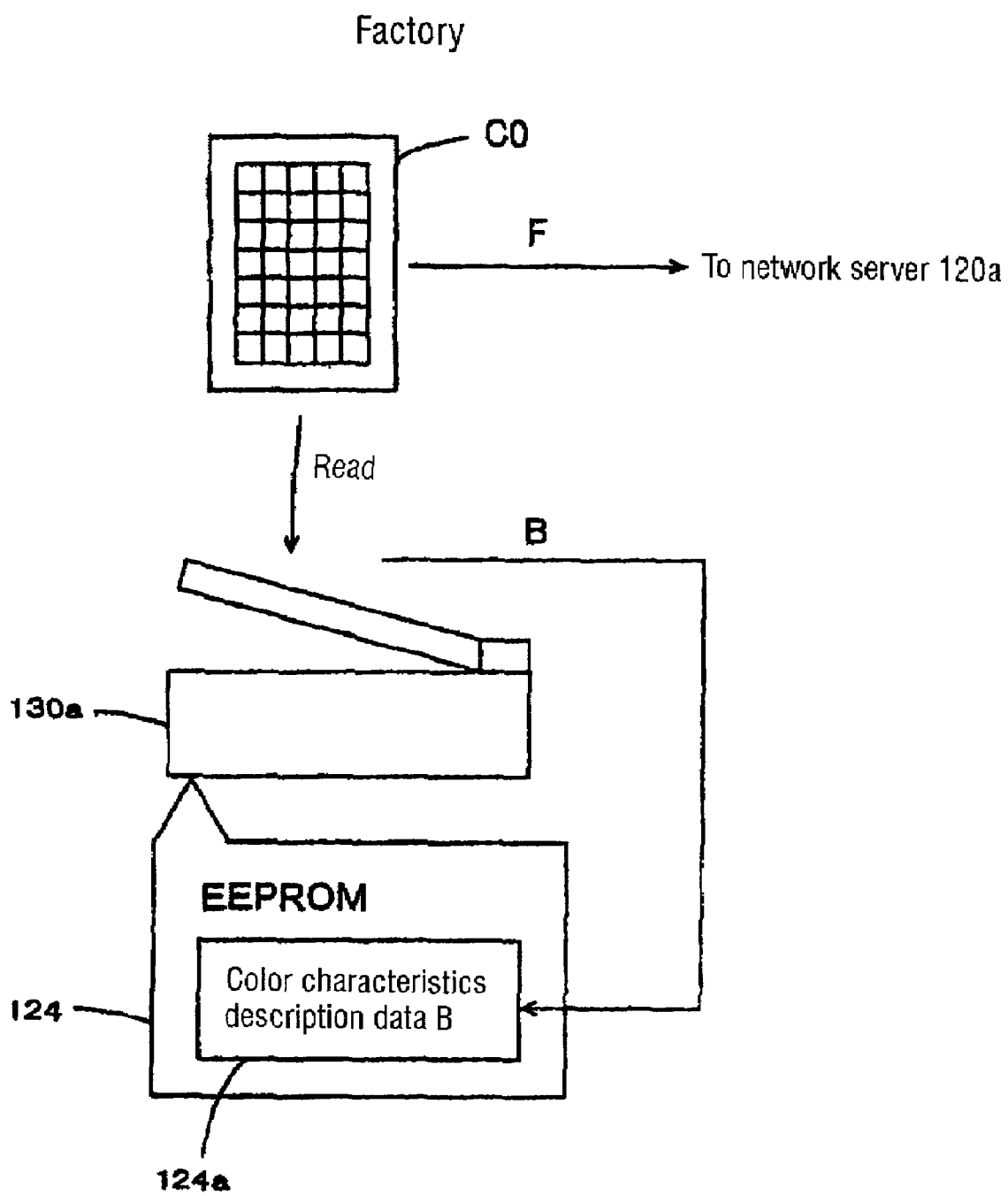
FIG. 44 is a diagram showing the data processing at the factory.
Figure 45:
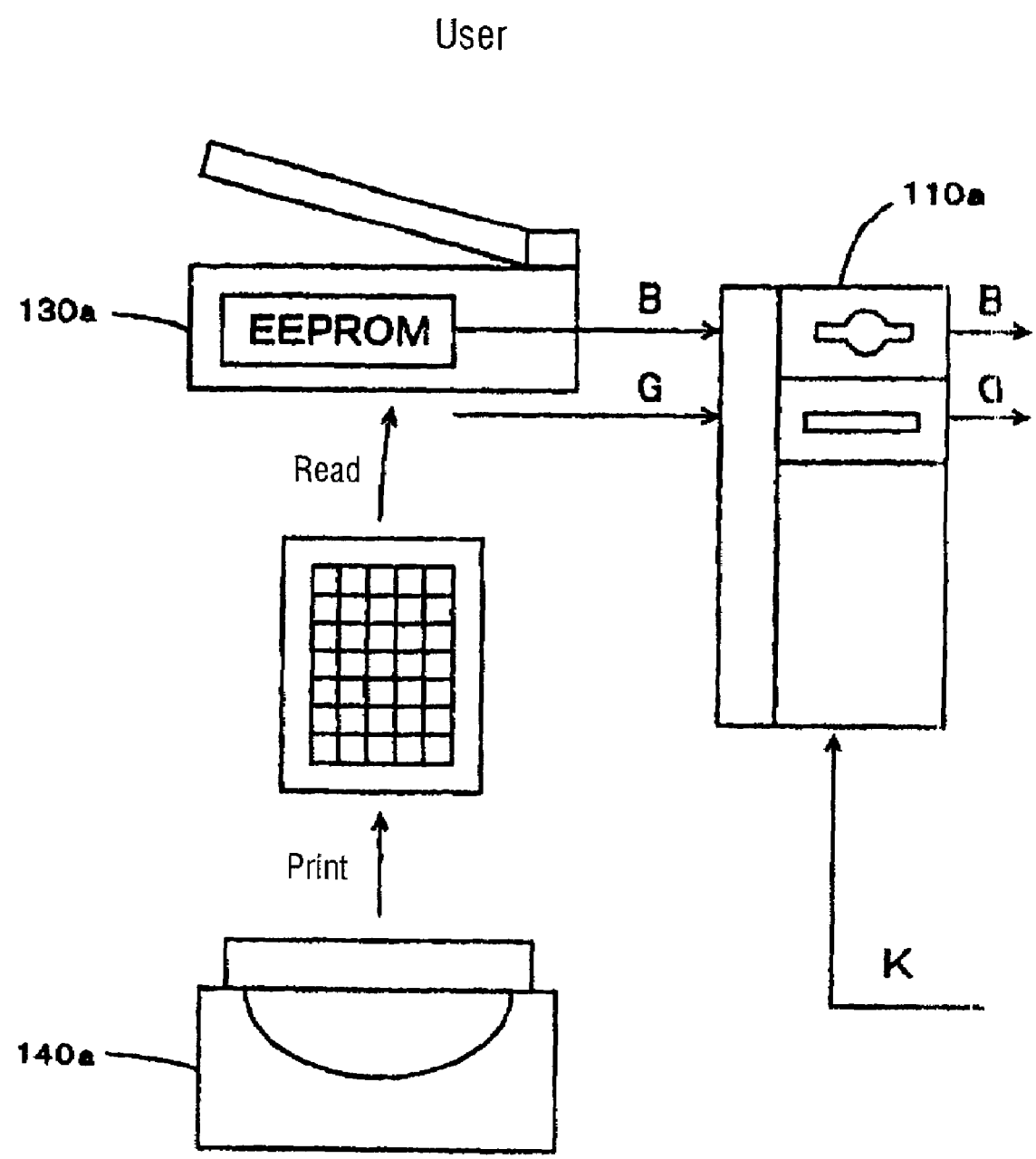
FIG. 45 is a diagram showing the data processing of the profile demanding client.
Figure 46:
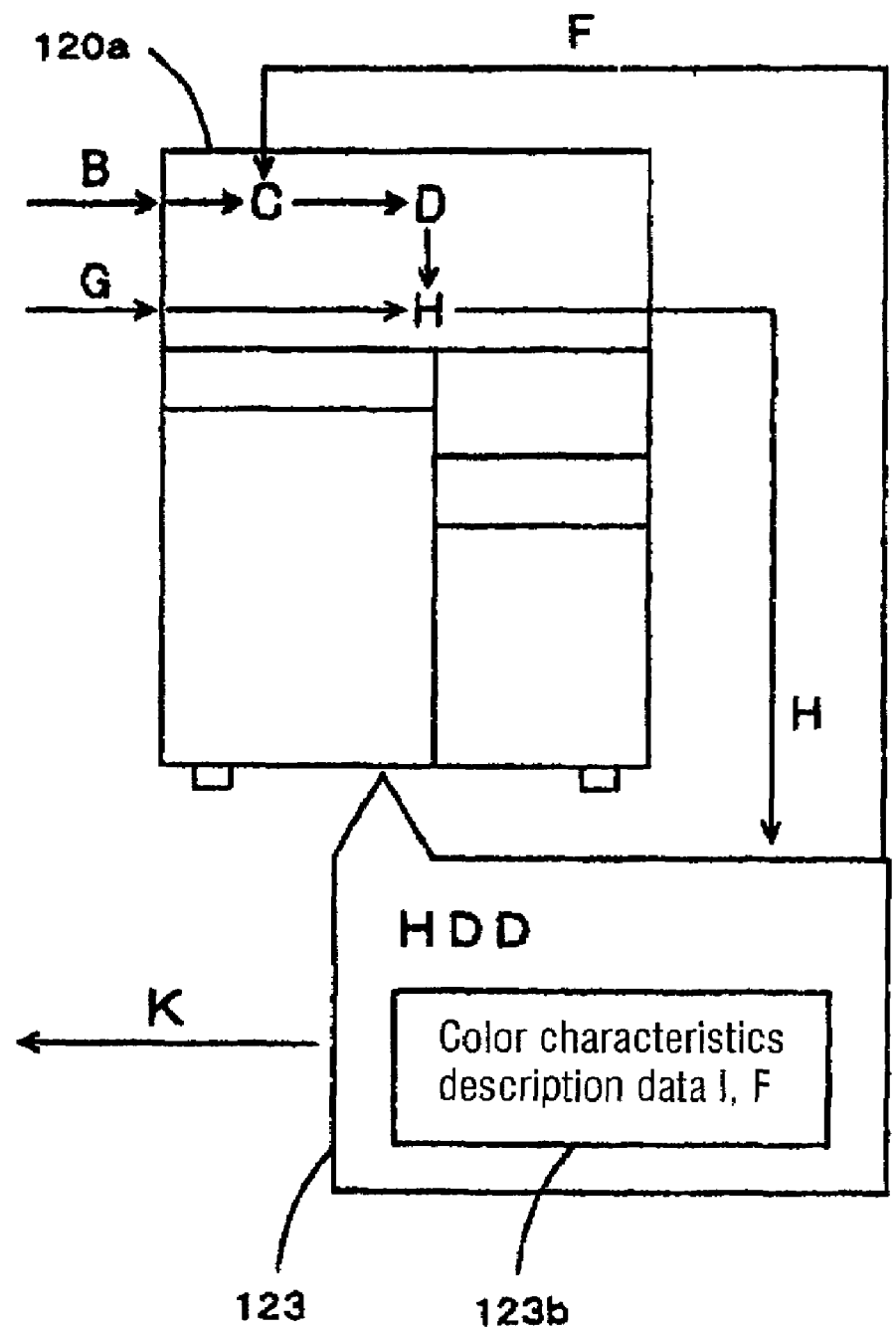
FIG. 46 is a diagram showing the data processing of the profile providing server.

(13) First Modified Example:

In the following, we will explain the first modified example of the present invention with the above-mentioned structure. FIGS. 44 to 46 are diagrams which explicitly show the data processing which is performed in this example and the storage place of the color character description data. In this example, the color table data B shown in FIG. 34 (mentioned above) is created in the stage of manufacturing the flatbed scanner 130a in the factory, and it is stored in the color character description data 134a of the EEPROM 134 of the flatbed scanner 130a. Also, the previously known standard color space coordinate data F is stored as one of the color character description data 123b in the hard disk drive 123 of the network server 120a. In other words, the processing in steps S2100 to S2130 in FIG. 33 (mentioned above) is carried out in the factory.

On the other hand, the user asks for the printer ICC profile K of the ink-jet printer 140a by using the personal computer 110a, and the work and processing which are carried out in this personal computer 110a are almost the same as those which are carried out in the above-mentioned main example. However, the color character description data 134a stored in the flatbed scanner 130a is not the correspondence table C but the color table data B, and hence the data sent from the personal computer 110a is not the correspondence table C but the color table data B. In this example, too, the processing in steps S2200 to S2240 is carried out in the personal computer 110a.

When the personal computer 110a outputs the color table data G and the color table data B to the network server 120a and asks for the creation of the profile, the network server 120a performs the processing corresponding to step S2140 in FIG. 33 (mentioned above) and creates the correspondence table C. In other words, in this example, the standard color space coordinate data F is stored as the color character description data 123b in the hard disk drive 123 of the above-mentioned network server 120a and hence it makes the standard color space coordinate data F correspond to the color table data B acquired through the above-mentioned communication line, and it creates the correspondence table C.

By this correspondence table C, it becomes possible to create the scanner ICC profile D, and it creates the scanner ICC profile in step S2150. Moreover, it performed the processing corresponding to step S2250 and, by using this scanner ICC profile D, converts the color table data G into the standard color space coordinate data H. As the result, it becomes possible to execute steps S2260 and S2270, and the created printer ICC profile K is output to the personal computer 110a through the communication line. In the personal computer 110a, as in the main example, the acquired printer ICC profile is built into the above-mentioned printer driver 115a and is used, so that it becomes possible to perform subsequently printing with the ink-jet printer 140a in the state of adequate color management.

(14) Second Modified Example

Figure 47:
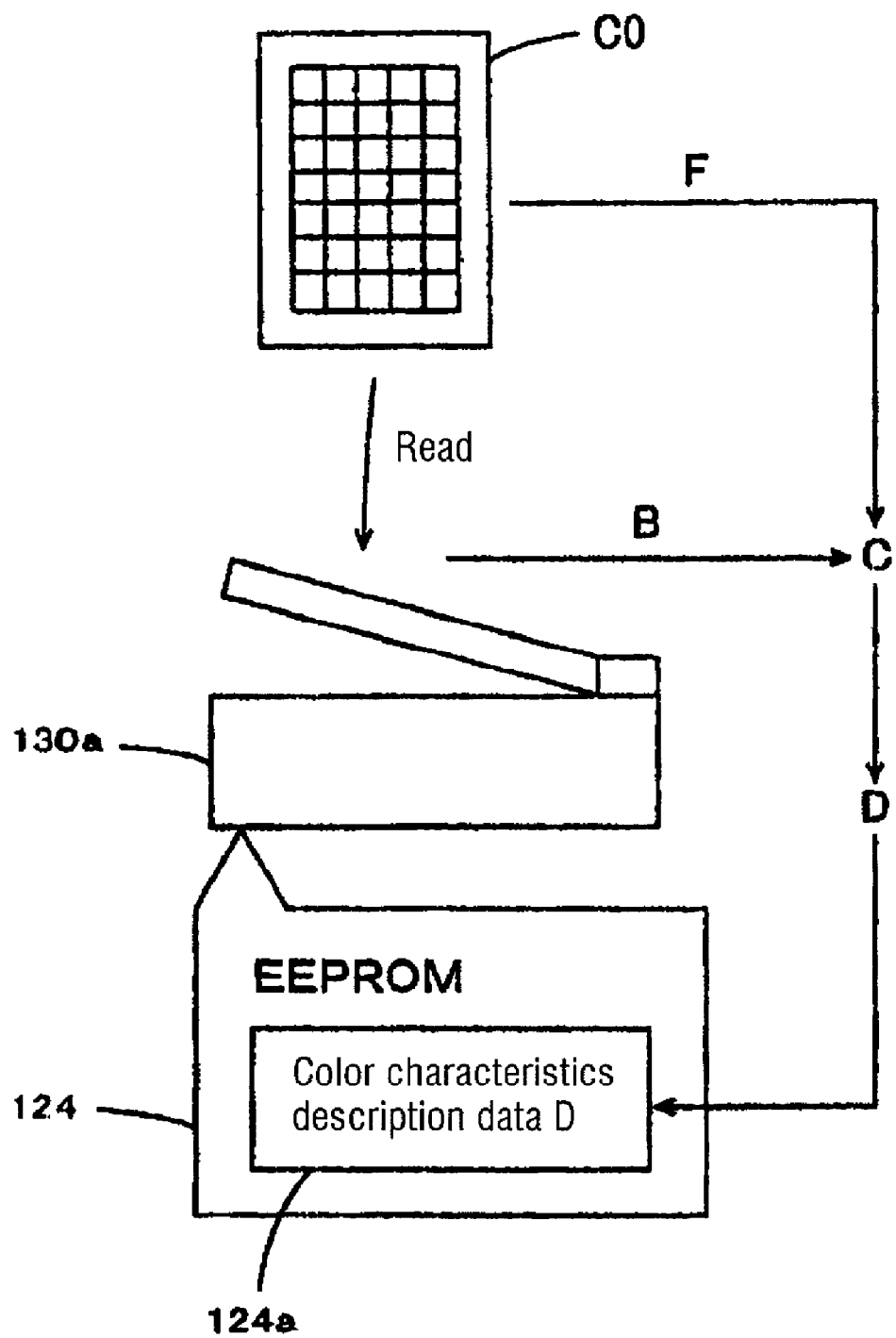
FIG. 47 is a diagram showing the data processing at the factory.
Figure 48:
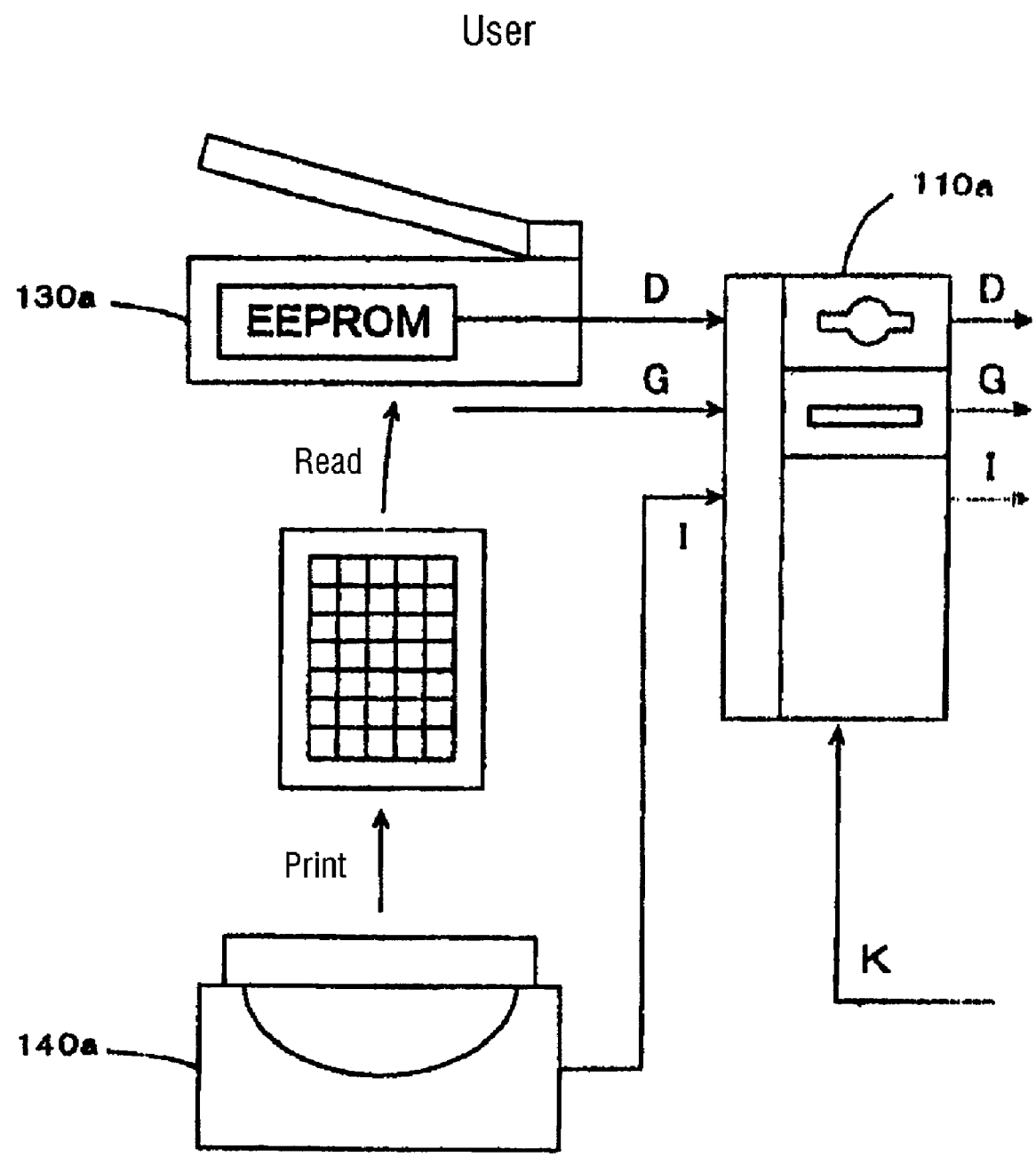
FIG. 48 is a diagram showing the data processing of the profile demanding client.
Figure 49:
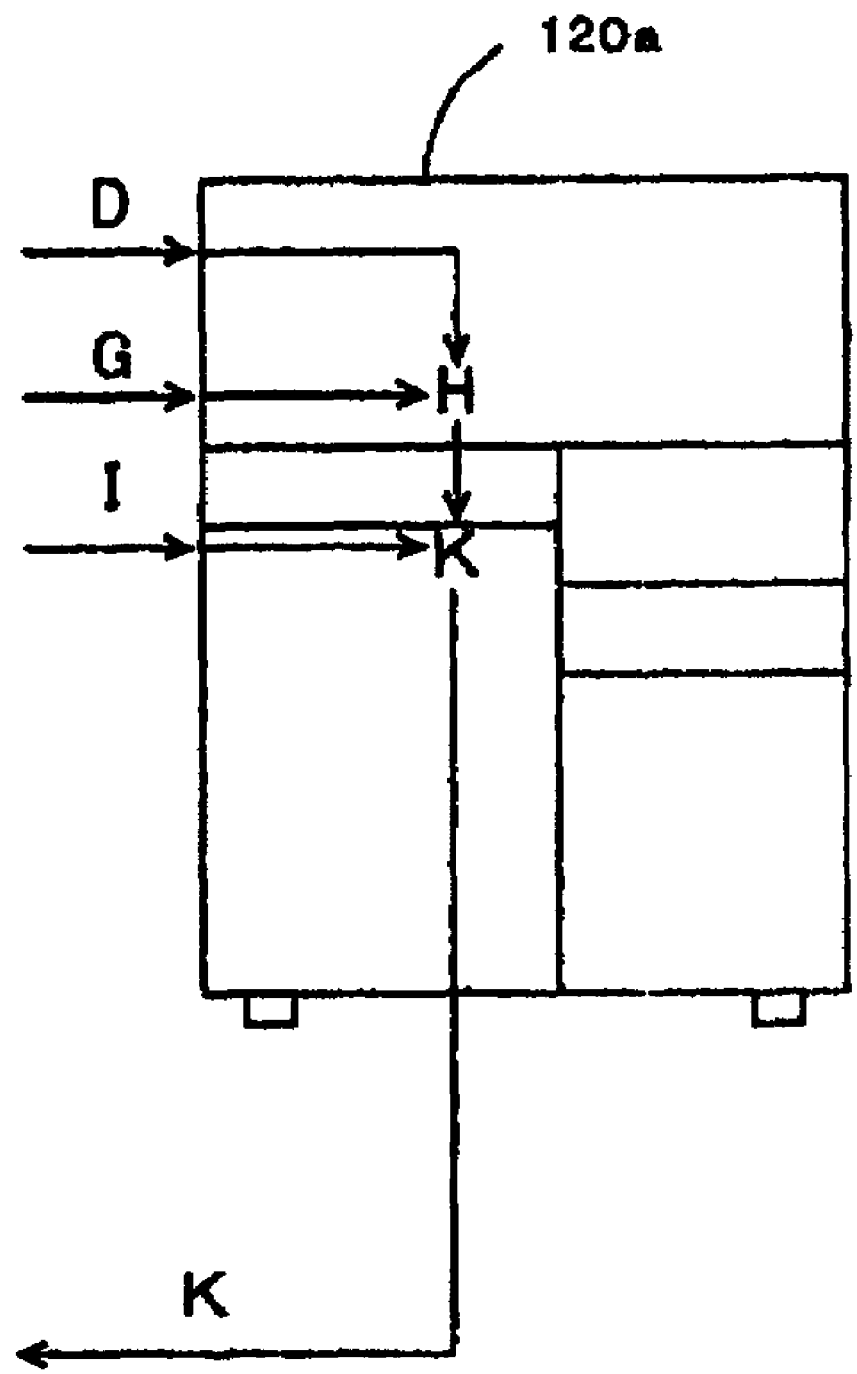
FIG. 49 is a diagram showing the data processing of the profile providing server.

In the following, we will explain the second modified example of the present invention with the above-mentioned structure. FIGS. 47 to 49 are diagrams which explicitly show the data processing which is performed in this example and the storage place of the color character description data. In this example, the scanner ICC profile D shown in FIG. 35 (mentioned above) is created in the stage of manufacturing the flatbed scanner 130a in the factory, and it is stored in the color character description data 134a of the EEPROM 134 of the flatbed scanner 130a. In other words, the processing in steps S2100 to S2150 in FIG. 33 (mentioned above) is carried out in the factory.

On the other hand, the user asks for the printer ICC profile K of the ink-jet printer 140a by using the personal computer 110a, and the work and processing which are carried out in this personal computer 110a are almost the same as those which are carried out in the above-mentioned main example and the first modified example. However, the color character description data 134a stored in the flatbed scanner 130a is not color table data B or the correspondence table C but the scanner ICC profile D; and hence the data sent from the personal computer 110a is the corresponding scanner ICC profile D. Therefore, in this example, too, the processing in steps S2200 to S2240 is carried out in the personal computer 110a.

This example is designed such that the print color data I is not stored in the network server 120a but the personal computer 110a causes the ink-jet printer 140a to print the print color data I and outputs it through the communication line. Incidentally, it is possible to perform the processing after step S2250 in the personal computer 110a; however, from the standpoint that the user does not have to make available the dedicated software for profile creation, it is desirable to make the network server 120a perform the processing of profile creation.

When the personal computer 110a outputs the scanner ICC profile D, the color table data G, and the print color data I to the network server 120a and asks for the creation of the profile, the network server 120a performs the processing corresponding to steps S2250 to S2270. In other words, it converts the color table data G into the standard color space coordinate data H by using this scanner ICC profile D and it also creates the printer ICC profile K. And the created printer ICC profile K is output to the personal computer 110a through the communication line. The personal computer 110a, as in the main example and the first modified example, uses the acquired printer ICC profile after building into the above-mentioned printer driver 115a, so that it becomes possible to perform subsequently printing with the ink-jet printer 140a in the state of adequate color management. In this way it is possible construct such that the network server 120a executes the prescribed operation processing without storing and holding the color character description data therein.

Moreover, in addition to the above-mentioned example, it is possible to realize various examples depending on the storage mode of the color character description data. For example, it is possible to construct such that the above-mentioned bit map data A is stored in the EEPROM 134 of the flatbed scanner 130a. In this case, the memory capacity necessary for the EEPROM 134 become large but the work to be done in the factory is reduced. Also, in the above-mentioned example, the standard color space coordinate data H is created by the network server 120a, however, the creation of this standard color space coordinate data is possible if the color table data G and the scanner ICC profile D are available, and hence it may be constructed such that the standard color space coordinate data H is created based on these data and the standard color space coordinate value H is output. In this case, it is necessary to store the color table data G and the scanner ICC profile D in the EEPROM of the flatbed scanner 130a. Also, the color conversion processing with the profile is necessary, but the color conversion processing with the profile is easy and the conversion with the driver's standard function is possible, and hence the processing load required in the personal computer 110a increases only slightly.

(15) Other Embodiments:

Moreover, in the above-mentioned embodiments and examples, the profile of the printing device is created by making the print color data correspond to the standard color space coordinate value by using the color character description data of the image input device. However, from the standpoint of creating the profile of the specific device by using the color character description data of the machine capable of creating the accurate profile, it is possible to apply further the present invention. For example, it is possible to construct such that the profile of the image input device is created by using the color character description data of the printing device.

Figure 50:
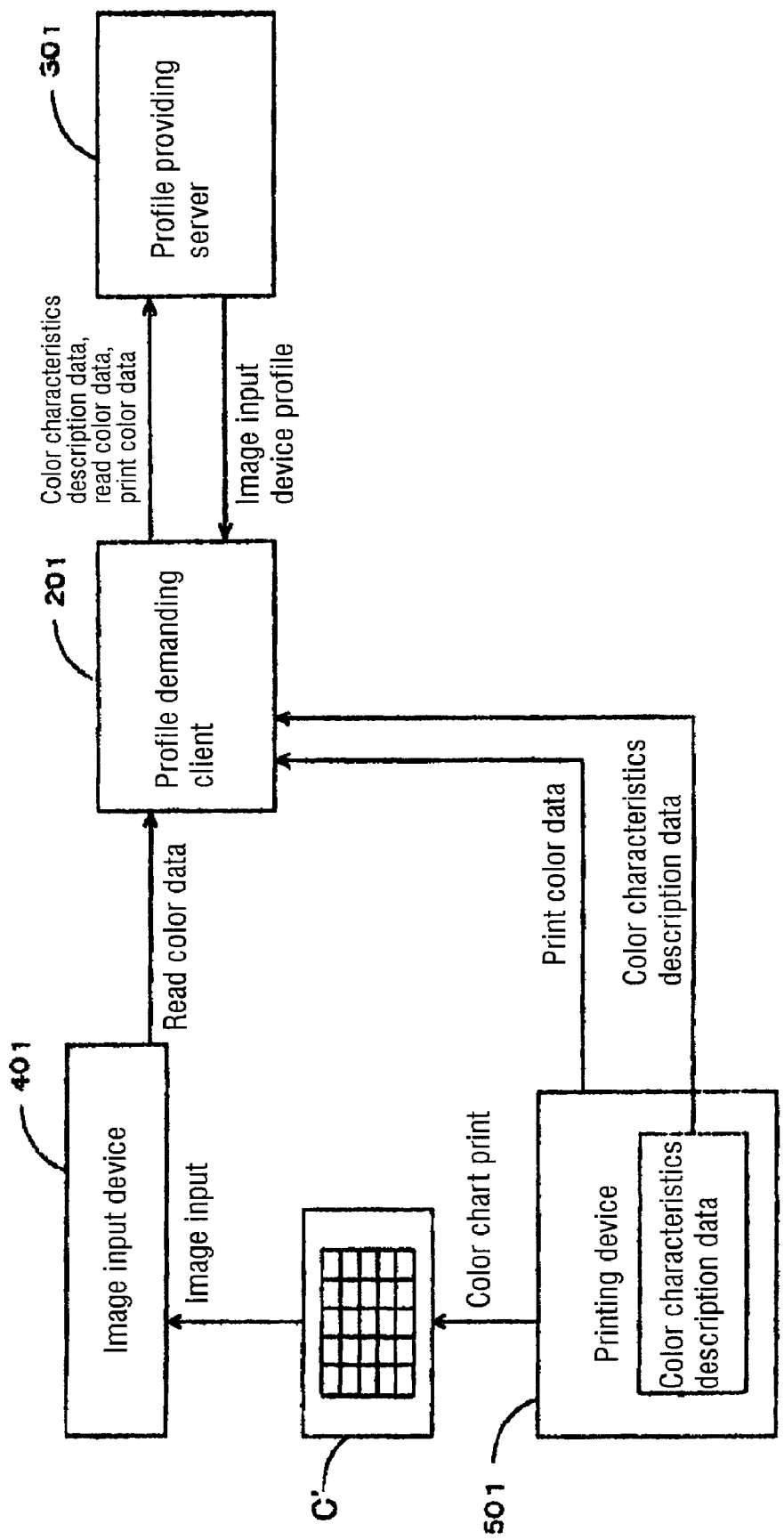
FIG. 50 is a block diagram showing the outline of the system to provide the profile.

FIG. 50 is a block diagram showing an outline of the system to provide the profile pertaining to such an embodiment. In this figure, the profile demanding client 201 is a client composed of the computer used by the user. In response to the operation which the user has performed on the profile demanding client 201, the external profile providing server 301 create the profile and sends it to the profile demanding client 201. The profile demanding client 201 controls the image input device 401 and the printing device 501. The profile demanding client 201 is a terminal which demands the creation of the image input device profile which makes the read color data used by the image input device 401 correspond to the standard color space coordinate value, and it is also a terminal which creates and sends the data which is necessary at the time of demanding creation.

In other words, the profile demanding client 201 causes the printing device 501 to print the color chart C' consisting of a plurality of color patches according to the prescribed print color data. And, the image input device 401 reads the actually printed color chart C' and acquires the read color data. Moreover, in the printing device 501 is stored the color character description data. The profile demanding client 201 sends to the profile providing server 301 the print color data, read color data, and color character description data and receives from the profile providing server 301 the profile of the image input device which the profile providing server 301 has created.

The color character description data is data which has been measured for each body of the device and it contains uncertain elements such as variation due to manufacturing of each body; it is data to make the print color data correspond to the standard color space coordinate value. Therefore, the print color data of the printing device 501 is capable of conversion into the standard color space coordinate value through the color character description data. The profile providing server 301 creates the profile of the image input device 401 by utilizing this conversion. In other words, each color of the color chart C' printed by the printing device 501 is capable of conversion into the standard color space coordinate value. Since standard color space coordinate value is the standard color space coordinate value of color chart C', it follows that the standard color space coordinate value of the read color data obtained upon reading by the above-mentioned printing device 501 is obtained. The profile providing server 301 creates the profile of the printing device 501 by utilizing this corresponding relationship.

Incidentally, the above-mentioned color characteristic description data is data to convert the print color data of the printing device 501 into the standard color space coordinate value, as in the above-mentioned embodiments, it is not always necessary that all the data necessary for conversion be stored in the above-mentioned printing device 501, but it is possible to store it partly in the printing device 501 and partly in the profile providing server 301. Also, it not always necessary that all of the necessary data be kept in the form of data but it is possible to keep part of it in data form and to obtain detailed data by calculations in the profile providing server 301 or the profile demanding client 201. The color character description data may be in various modes and various examples are realized according to such modes.

As mentioned above, in the present invention, one grasps the standard color space coordinate value of the color data for which the profile is created based on the color character description data of the specific equipment, thereby creating the profile of the object for which the profile is created. Here, the profile creation is accomplished by the computer which the user uses and the external server connected through the communication line. Therefore, it is not necessary for the user to get ready any dedicated software for profile creation but it is possible to obtain easily the profile data without reading by a colorimeter and it is possible to create the accurate profile of printing devices independent of difference between bodies.

We claim:

1. A print control system that includes: (a) a print control client for color conversion based on prescribed color matching information that permits reproduction of prescribed standard colors at the time of printing using color data at the time of conversion into color data corresponding to a plurality of printing colorants upon input of print data, and (b) a print control server which is connected for two-way communications to the print control client and which creates said color matching information and sends it to said print control client, wherein said print control client comprises:
a colorimetry image print controllor capable of controlling the printing of colorimetry images with a plurality of tones for each of said printing colorants:
a lightness data receiver/sender capable of receiving the input of the lightness data of said colorimetry image and sending it to said print control server; and
a color matching information acquisition component capable of acquiring said color matching information from said print control server;

wherein said print control server comprises:
a standard color lightness data storing region in which is stored the lightness data of said standard color;
a lightness data acquisition component capable of acquiring the lightness data of the colorimetry image for each of said printing colorants which is printed by said print control client;
a color matching information creating component capable of creating said color matching information based on the lightness data of the colorimetry image for each of said printing colorants and the lightness data of said standard colors conesponding to the printing colorants; and
a color matching information output component capable of outputting to said print control client the color matching information, wherein said print control client includes first and second print control clients,
said first print control client comprising a standard color lightness data sending component capable of receiving the input of the lightness data of said standard colors and sending to said print control server the lightness data of standard colors which has been entered;
said print control server comprising a standard color lightness data storing component capable of storing in said standard color lightness data storing region the lightness data of said standard colors which is entered from said first print control client; and
wherein said color matching information output component outputs to said second print control client said color matching information which has been created based on the lightness data of said standard colors entered from said first print control client, and wherein the standard color lightness data storing component of said print control server is capable of storing said lightness data entered from a plurality of said first print control clients for the first print control clients individually, said print control server has a list outputting component capable of creating a list of the first print control clients which entered the lightness data and outputting it to said second print control client;

said second print control client has a select input receiving component capable of selecting a specific first print control client based on the list output by said list output component, and a select result output component capable of sending data to the selected specific first print control client;

said color matching information creating component capable of specifying the lightness data of said standard colors based on said selected specific first print control client, thereby creating said color matching information corresponding to the lightness data of said second print control client; and said color matching information output component capable of outputting said color matching information to said second print control clients.

2. A print control system as defined in claim 1, wherein at least one of said first print control clients further includes an image data sending component capable of acquiring image data from an image capturing equipment to capture image data of an image for colorimetry and sending it to said print control server, and said lightness data acquisition component converts the image data entered from said print control client into the lightness data, thereby acquiring the lightness data of said image for colorimetry.

3. A print control system as defined in claim 2, wherein said image capturing equipment is a scanner.

4. A print control system as defined in claim 1, wherein said color matching information is a tone value correction table which makes the tone value of the color data converted from said print data correspond to the tone value for color reproduction to match said standard color with printing colorants corresponding to said color data.

5. A print control system as defined in claim 1, wherein said color matching information is provided in the form of color conversion table in which the relation between input and output is corrected.

6. A print control system as defined in claim 1, wherein said print control client has an identification information sending component capable of acquiring the identification information of the equipment which reproduces colors with said printing colorants and sending it to said print control server, and said color matching information creating component is capable of creating said color matching information based on the lightness data of said standard colors corresponding to the identification information entered from said print control client.

7. A print control method to be carried out by a print control server which is connected for two-way communications to a plurality of print control clients to perform conversion based on prescribed color matching information, said method comprising:

acquiring measured data of colorimetry images from a plurality of first print control clients, wherein the measured data associated with each of the plurality of first print control clients include tones for individual printing colorants which are printed by such print control client;

creating a list of the first print control clients and sending the list to a second print control client;

receiving a first print client selection from the second print control client, wherein the selected first print client is one of the first print control clients listed in the list of first print control clients;

creating color matching information based on the measured data associated with the selected first print client and measured data of standard colors corresponding to said printing colorants which have previously been obtained; and outputting the color matching information to said second print control client.

8. A computer readable medium storing therein a print control computer program code for a print control server for color conversion based on prescribed color matching information that permits reproduction of prescribed standard colors at the time of conversion into color data corresponding to a plurality of printing colorants upon input of print data, said computer readable medium comprising:

computer program code for acquiring measured data of colorimetry images from a plurality of first print control clients, wherein the measured data associated with each of the plurality of first print control clients include tones for individual printing colorants which are printed by said print control client;

computer code for creating a list of the first print control clients and sending the list to a second print control client;

computer code for receiving a first print client selection from the second print control client, wherein the selected firt print client is one of the first print control clients listed in the list of first print control clients;

computer program code for creating said color matching information based on the measured data associated with the selected first print client and measured data of said standard colors corresponding to said printing colorants which have previously been obtained; and computer program code for outputting the color matching information to the second print control client.

* * * * *